United States Patent
Huang et al.

(10) Patent No.: US 12,165,249 B2
(45) Date of Patent: Dec. 10, 2024

(54) DISPLAY METHOD AND ELECTRONIC DEVICE

(71) Applicant: Honor Device Co., Ltd., Shenzhen (CN)

(72) Inventors: Liwei Huang, Shenzhen (CN); Jie Ren, Shenzhen (CN); Kai Qian, Shenzhen (CN); Xia Wu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/793,741

(22) PCT Filed: Mar. 16, 2022

(86) PCT No.: PCT/CN2022/081228
§ 371 (c)(1),
(2) Date: Nov. 17, 2022

(87) PCT Pub. No.: WO2022/237308
PCT Pub. Date: Nov. 17, 2022

(65) Prior Publication Data
US 2024/0221274 A1 Jul. 4, 2024

(30) Foreign Application Priority Data
May 12, 2021 (CN) .......................... 202110519371.0

(51) Int. Cl.
*G06T 13/80* (2011.01)
*G06F 3/147* (2006.01)
*G06T 3/20* (2006.01)
*G06T 3/40* (2006.01)

(52) U.S. Cl.
CPC .............. *G06T 13/80* (2013.01); *G06F 3/147* (2013.01); *G06T 3/20* (2013.01); *G06T 3/40* (2013.01)

(58) Field of Classification Search
None
See application file for complete search history.

(56) References Cited

U.S. PATENT DOCUMENTS

| | | | |
|---|---|---|---|
| 10,853,979 B2 | 12/2020 | Lee et al. | |
| 2009/0204915 A1* | 8/2009 | Yamagami | G06F 9/451 715/764 |
| 2012/0254792 A1* | 10/2012 | Husoy | G06F 3/0481 715/800 |
| 2013/0081133 A1 | 3/2013 | Hetroy | |
| 2016/0328127 A1* | 11/2016 | Reckhow | G06F 3/0485 |

(Continued)

FOREIGN PATENT DOCUMENTS

| CN | 109739602 A | 5/2019 |
|---|---|---|
| CN | 110312985 A | 10/2019 |

(Continued)

*Primary Examiner* — Sultana M Zalalee
(74) *Attorney, Agent, or Firm* — Conley Rose, P.C.

(57) ABSTRACT

This application provides a display method and an electronic device. The method includes: in a process of displaying a first transition animation on a first screen of the electronic device, if the first transition animation displayed on the first screen is interrupted, continuing, by the electronic device, to play an unfinished part of the first transition animation on a switched-to second screen, allowing a transition animation of the electronic device to be applied to more scenarios to improve user experience.

20 Claims, 44 Drawing Sheets

Cropping  Resizing

Image frame 304

(56) References Cited

U.S. PATENT DOCUMENTS

| | | | | |
|---|---|---|---|---|
| 2018/0240260 | A1* | 8/2018 | Lee | G06F 3/0481 |
| 2019/0369862 | A1* | 12/2019 | de Vries | G06F 3/04883 |
| 2022/0248077 | A1* | 8/2022 | Chen | H04N 21/42222 |
| 2023/0161471 | A1* | 5/2023 | Yuan | H04N 21/4312 |
| | | | | 715/702 |
| 2023/0300403 | A1* | 9/2023 | Li | H04N 21/44016 |
| | | | | 725/43 |
| 2023/0326393 | A1* | 10/2023 | Huang | G06F 1/3265 |
| | | | | 345/55 |

FOREIGN PATENT DOCUMENTS

| | | |
|---|---|---|
| CN | 111580904 A | 8/2020 |
| CN | 112363785 A | 2/2021 |
| CN | 114244953 A | 3/2022 |
| CN | 114461120 A | 5/2022 |
| WO | 2022048401 A1 | 3/2022 |

* cited by examiner

DISPLAY METHOD AND ELECTRONIC DEVICE

CROSS-REFERENCE TO RELATED APPLICATIONS

This application is a U.S. National Stage of International Application No. PCT/CN2022/081228 filed on Mar. 16, 2022, which claims priority to Chinese Patent application Ser. No. 20/211,0519371.0, filed with China National Intellectual Property Administration on May 12, 2021, both of which are incorporated herein by reference in their entireties.

TECHNICAL FIELD

This application relates to the field of terminal devices, and in particular, to a display method and an electronic device.

BACKGROUND

A long-take transition animation, or referred to as transition animation, can be understood as an animation effect displayed when a terminal switches between different modes to improve visual experience of a user in using a mobile phone. However, transition animations are currently used in limited scenarios.

SUMMARY

To resolve the foregoing technical problems, this application provides a display method and an electronic device. In the method, the electronic device can display transition animations in different scenarios, allowing transition animations of the electronic device to be applied in more scenarios to improve user experience.

According to a first aspect, this application provides an electronic device. The electronic device includes a memory and a processor, the processor is coupled to the memory; and the memory stores program instructions, and when the program instructions are executed by the processor, the electronic device is caused to perform the following steps: displaying a first screen on a display of the electronic device in response to a received first user operation, and playing a first transition animation on the first screen; and switching from the first screen to a second screen on the display of the electronic device in response to a received second user operation when a first image frame of the first transition animation is played on the first screen; and playing all image frames between the first image frame and the last image frame of the first transition animation on the second screen, where the first image frame is any image frame between the initial image frame of the first transition animation and the last image frame of the first transition animation. In this way, when the electronic device in this application plays a transition animation corresponding to a current mode, if the transition animation is interrupted and switched to another screen, the electronic device can continue to play an unfinished part of the interrupted transition animation on the another screen. Such resumable play manner allows a transition animation of the electronic device to be applied in more scenarios, thereby improving user experience.

For example, before the electronic device enters a lock screen mode, the display may be first blacked out, and then a lock screen for the lock screen mode is displayed.

For example, when the electronic device is in a screen off mode, the display may further display text information such as time and date.

For example, after the electronic device enters the lock screen mode, the text information in the screen off mode disappears.

For example, while a transition animation in the lock screen mode is being played in a second display box of the electronic device, text information such as time and date may be displayed in the second display box of the electronic device.

According to the first aspect, when the program instructions are executed by the processor, the electronic device is caused to perform the following steps: switching from the second screen to a third screen on the display of the electronic device in response to a received third user operation when a second image frame between the first image frame and the last image frame of the first transition animation is played on the second screen; and playing all image frames between the second image frame and the last image frame of the first transition animation on the third screen, where the second image frame is any image frame between the first image frame and the last image frame of the first transition animation. In this way, when an unfinished transition animation on a screen off screen is being played on the second screen, for example, the lock screen, the transition animation is interrupted again and the electronic device switches to a desktop. The electronic device can continue to play the unfinished transition animation on the desktop.

According to the first aspect or any one of implementations of the first aspect, when the program instructions are executed by the processor, the electronic device is caused to perform the following step: continuing to play a second transition animation and a third transition animation when the last image frame of the first transition animation is played on the third screen. In this way, after the remaining transition animation in the screen off mode is played on the desktop, a transition animation corresponding to the lock screen mode and a transition animation corresponding to the desktop can continue to be played.

For example, the second transition animation is a transition animation in the lock screen mode, and the third transition animation is a transition animation in a desktop mode.

According to the first aspect or any one of implementations of the first aspect, the first transition animation, the second transition animation, and the third transition animation are continuous image frames.

According to the first aspect or any one of implementations of the first aspect, when the program instructions are executed by the processor, the electronic device is caused to perform the following step: continuing to play a second transition animation on the second screen when the last image frame of the first transition animation is played on the second screen. In this way, after finishing playing an unfinished transition animation of a previous screen on a switched-to screen, the electronic device may continue to play a transition animation corresponding to the current screen.

According to the first aspect or any one of implementations of the first aspect, when the program instructions are executed by the processor, the electronic device is caused to perform the following steps: displaying the third screen on the display of the electronic device in response to a received fourth user operation when a third image frame of the second transition animation is played on the second screen; and playing all image frames between the third image frame and the last image frame of the second transition animation on the third screen, and continuing to play the third transition animation after playing the last image frame of the second transition animation. In this way, when playing the transition animation corresponding to the second screen on the second screen is interrupted, the electronic device can continue to play an unfinished part of the second transition animation and a transition animation corresponding to the third screen on the switched-to third screen.

According to the first aspect or any one of implementations of the first aspect, the first screen is a screen off screen, the second screen is a lock screen, and the third screen is a desktop.

According to the first aspect or any one of implementations of the first aspect, the first screen is a screen off screen, and the second screen is a desktop.

According to the first aspect or any one of implementations of the first aspect, the first screen further includes one or more pieces of screen-off text information; and all parts on the first screen except the text information and a playing first sub-video are black.

According to the first aspect or any one of implementations of the first aspect, when the program instructions are executed by the processor, the electronic device is caused to perform the following step: continuing to play a second transition animation and a third transition animation on the second screen when the last image frame of the first transition animation is played on the second screen. For example, if the second screen is a desktop, that is, after switching from the screen off screen to the desktop, the electronic device can continue to play an unfinished part of the transition animation on the screen off screen on the desktop, and continue to play the transition animation of the lock screen and the transition animation of the desktop.

According to the first aspect or any one of implementations of the first aspect, the first screen is a lock screen, and the second screen is a desktop.

According to the first aspect or any one of implementations of the first aspect, the first screen includes a first display box, and an image frame of the first transition animation is played in the first display box; and when the program instructions are executed by the processor, the electronic device is caused to perform the following steps: switching from the first screen to the second screen on the display of the electronic device in response to the received second user operation when the first image frame of the first transition animation is played in the first display box, where the second screen includes a second display box, a size of the second display box is the same as that of the first display box, and a position of the second display box on the display is the same as that of the first display box on the display; and gradually enlarging and moving the second display box to a screen center of the display of the electronic device, where in a process of gradually enlarging and moving the second display box to the screen center of the display of the electronic device, all image frames between the first image frame and the last image frame of the first transition animation are played in the second display box. In this way, when the electronic device switches from the screen off mode to the lock screen mode, the transition animation in the screen off mode can be played in a gradually enlarged manner, to improve continuity of the transition animation from the screen off mode to the lock screen mode.

According to the first aspect or any one of implementations of the first aspect, when the program instructions are executed by the processor, the electronic device is caused to perform the following steps: switching from the second screen to a third screen on the display of the electronic device in response to a received fifth user operation when the second display box is enlarged to a first size and moves to a first position on the display, and a fourth image frame between the first image frame and the last image frame of the first transition animation is played in the second display box, where the third screen includes a third display box, a size of the third display box is the first size, and the third display box is at the first position on the display; and gradually enlarging and moving the third display box to a screen center of the display, where in a process of gradually enlarging and moving the third display box to the screen center of the display of the electronic device, all image frames between the fourth image frame and the last image frame of the first transition animation, a second transition animation, and a third transition animation are played in the third display box. In this way, the transition animation on the lock screen can be displayed on the lock screen in a gradually enlarged manner. For example, if the transition animation on the lock screen is interrupted in the gradual enlarging process, the electronic device continues to play the remaining transition animation on the lock screen on the desktop in a gradually enlarged manner to improve continuity of switching between modes.

According to the first aspect or any one of implementations of the first aspect, the first transition animation, the second transition animation, and the third transition animation are continuous image frames.

According to a second aspect, this application provides a display method. The method includes: displaying, by an electronic device, a first screen on a display of the electronic device in response to a received first user operation, and playing a first transition animation on the first screen; and switching, by an electronic device, from the first screen to a second screen on the display of the electronic device in response to a received second user operation when a first image frame of the first transition animation is played on the first screen; and playing all image frames between the first image frame and the last image frame of the first transition animation on the second screen, where the first image frame is any image frame between the initial image frame of the first transition animation and the last image frame of the first transition animation.

According to the second aspect or any one of implementations of the second aspect, the method further includes: switching from the second screen to a third screen on the display of the electronic device in response to a received third user operation when a second image frame between the first image frame and the last image frame of the first transition animation is played on the second screen; and playing all image frames between the second image frame and the last image frame of the first transition animation on the third screen, where the second image frame is any image frame between the first image frame and the last image frame of the first transition animation.

According to the second aspect or any one of implementations of the second aspect, the method further includes: continuing to play a second transition animation and a third transition animation when the last image frame of the first transition animation is played on the third screen.

According to the second aspect or any one of implementations of the second aspect, the first transition animation, the second transition animation, and the third transition animation are continuous image frames.

According to the second aspect or any one of implementations of the second aspect, the method further includes: continuing to play a second transition animation on the second screen when the last image frame of the first transition animation is played on the second screen.

According to the second aspect or any one of implementations of the second aspect, the method further includes: displaying a third screen on the display of the electronic device in response to a received fourth user operation when a third image frame of the second transition animation is played on the second screen; and playing the third image frame to the last image frame of the second transition animation on the third screen, and continuing to play the third transition animation after playing the last image frame of the second transition animation.

According to the second aspect or any one of implementations of the second aspect, the first screen is a screen off screen, the second screen is a lock screen, and the third screen is a desktop.

According to the second aspect or any one of implementations of the second aspect, the first screen is a screen off screen, and the second screen is a desktop.

According to the second aspect or any one of implementations of the second aspect, the first screen further includes one or more pieces of screen-off text information; and all parts on the first screen except the text information and a playing first sub-video are black.

According to the second aspect or any one of implementations of the second aspect, the method further includes: continuing to play a second transition animation and a third transition animation on the second screen when the last image frame of the first transition animation is played on the second screen.

According to the second aspect or any one of implementations of the second aspect, the first screen is a lock screen, and the second screen is a desktop.

According to the second aspect or any one of implementations of the second aspect, the first screen includes a first display box, and an image frame of the first transition animation is played in the first display box; and the switching, by the electronic device, from the first screen to a second screen on the display of the electronic device in response to a received second user operation when a first image frame of the first transition animation is played on the first screen includes: switching from the first screen to the second screen on the display of the electronic device in response to the received second user operation when the first image frame of the first transition animation is played in the first display box, where the second screen includes a second display box, a size of the second display box is the same as that of the first display box, and a position of the second display box on the display is the same as that of the first display box on the display, and gradually enlarging and moving the second display box to a screen center of the display of the electronic device, where in a process of gradually enlarging and moving the second display box to the screen center of the display of the electronic device, all the image frames between the first image frame and the last image frame of the first transition animation are played in the second display box.

According to the second aspect or any one of implementations of the second aspect, when the program instructions are executed by the processor, the electronic device is caused to perform the following steps: switching from the second screen to a third screen on the display of the electronic device in response to a received fifth user operation when the second display box is enlarged to a first size and moves to a first position on the display, and a fourth image frame between the first image frame and the last image frame of the first transition animation is played in the second display box, where the third screen includes a third display box, a size of the third display box is the first size, and the third display box is at the first position on the display; and gradually enlarging and moving the third display box to a screen center of the display, where in a process of gradually enlarging and moving the third display box to the screen center of the display of the electronic device, all image frames between the fourth image frame and the last image frame of the first transition animation, a second transition animation, and a third transition animation are played in the third display box.

According to the second aspect or any one of implementations of the second aspect, the first transition animation, the second transition animation, and the third transition animation are continuous image frames.

The second aspect and any one of implementations of the second aspect correspond to the first aspect and any one of implementations of the first aspect respectively. For technical effects corresponding to the second aspect and any one of implementations of the second aspect, refer to the technical effects corresponding to the first aspect and any one of implementations of the first aspect. Details are not described herein again.

According to a third aspect, this application provides a computer-readable medium, and is configured to store a computer program. The computer program includes instructions that are used to perform the method in the second aspect or any possible implementation of the second aspect.

According to a fourth aspect, this application provides a computer program. The computer program includes instructions that are used to perform the method in the second aspect or any possible implementation of the second aspect.

According to a fifth aspect, this application provides a chip. The chip includes a processing circuit and a transceiver pin. The transceiver pin and the processing circuit communicate with each other through an internal connection path, and the processing circuit performs the method in the second aspect or any one of possible implementations of the second aspect to control a receive pin to receive a signal and to control a transmit pin to transmit a signal.

DETAILED DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: presence of only A, presence of both A and B, and presence of only B.

In the specification of the embodiments and the claims of this application, the terms "first", "second", and so on are intended to distinguish between different objects but do not indicate a particular order of the objects. For example, a first target object, a second target object, and the like are used to distinguish different target objects, rather than describe a specific sequence of target objects.

In the embodiments of this application, the word such as "an example" or "for example" is used to represent giving an example, an instance, or an illustration. Any embodiment or design solution described as "an example" or "for example" in the embodiments of this application shall not be interpreted to be more preferential or advantageous than other embodiments or design solutions. To be precise, the terms such as "an example" or "for example" are intended to present a related concept in a specific manner.

In the descriptions of the embodiments of this application, "plurality" means two or more, unless otherwise specified. For example, a plurality of processing units means two or more processing units, and a plurality of systems means two or more systems.

Figure 1:
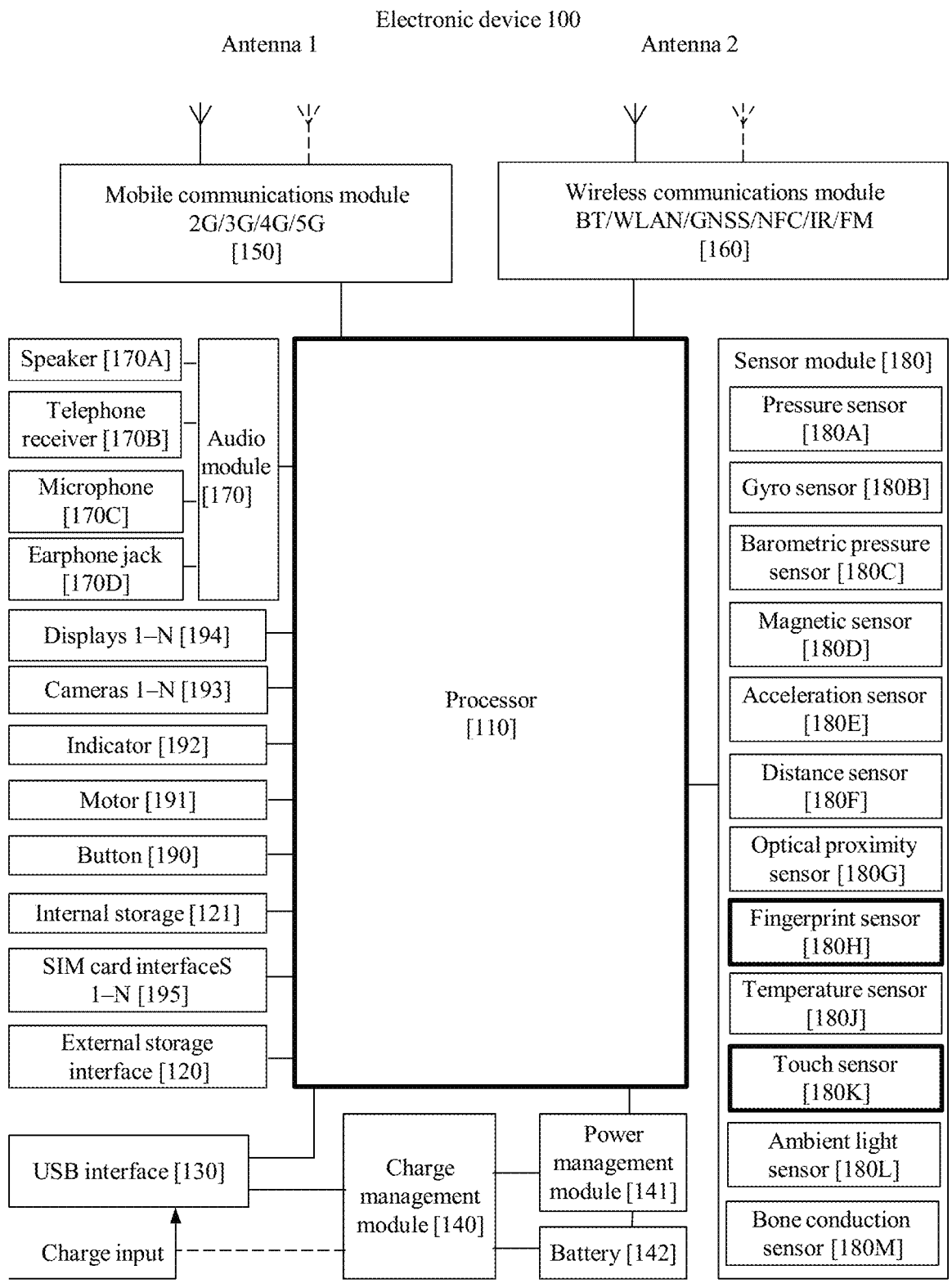
FIG. 1 illustrates a schematic diagram of a hardware structure of an electronic device.

FIG. 1 is a schematic structural diagram of an electronic device 100. It should be understood that, the electronic device 100 shown in FIG. 1 is merely an example, and the electronic device 100 may have more or fewer components than those shown in the figure, may combine two or more components, or may have different component configurations. Various components shown in FIG. 1 may be implemented by using hardware, software, or a combination of hardware and software including one or more signal processors and/or application-specific integrated circuits.

The electronic device 100 may include a processor 110, an external storage interface 120, an internal storage 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor. DSP), a baseband processor, a neural-network processing unit (neural-network processing unit, NPU), and/or the like. Different processing units may be separate devices or be integrated into one or more processors.

The controller may be a nerve center and command center of the electronic device 100. The controller may generate an operation control signal according to an instruction operation code and a timing signal, to complete control of instruction fetching and execution.

A memory may be further provided in the processor 110 to store instructions and data. In some embodiments, the memory in the processor 110 is a cache. The memory may store instructions or data that the processor 110 has just used or used repeatedly. If the processor 110 needs to use the instructions or the data again, the processor 110 may directly call the instructions or the data from the memory, thereby avoiding repeated access, reducing waiting time of the processor 110, and improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules illustrated in the embodiments of this application is merely an example for description, and constitutes no limitation on the structure of the electronic device 100. In some other embodiments of this application, the electronic device 100 may alternatively use an interface connection manner different from that in the foregoing embodiments, or a combination of a plurality of interface connection manners.

The charge management module 140 is configured to receive charge input from a charger. The charger may be a wireless charger or a wired charger. In some wired charge embodiments, the charge management module 140 may receive charge input from a wired charger by using the USB interface 130. In some wireless charge embodiments, the charge management module 140 may receive wireless charge input through a wireless charge coil of the electronic device 100. The charge management module 140 may also supply power to the electronic device through the power management module 141 while charging the battery 142.

The power management module 141 is configured to connect the battery 142, the charge management module 140, and the processor 110. The power management module 141 receives input from the battery 142 and/or the charge management module 140, to supply power to the processor 110, the internal storage 121, an external storage, the display 194, the camera 193, the wireless communications module 160, and the like. The power management module 141 may also be configured to monitor parameters such as capacity of a battery, a cycle count of the battery, and a state of health (leakage and impedance) of the battery. In some other embodiments, the power management module 141 may alternatively be provided in the processor 110. In some other embodiments, the power management module 141 and the charge management module 140 may alternatively be provided in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the electronic device 100 may be configured to cover one or more communication bands. Different antennas may be reused to improve antenna utilization. For example, the antenna 1 may be reused as a diversity antenna of a wireless local area network. In some other embodiments, the antenna may be used in combination with a tuning switch.

The mobile communications module 150 may provide wireless communication solutions including 2G, 3G, 4G, 5G, and the like for application to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert the signal into an electromagnetic wave through the antenna 1 for transmission. In some embodiments, at least some functional modules of the mobile communications module 150 may be provided in the processor 110. In some embodiments, at least some functional modules of the mobile communications module 150 and at least some modules of the processor 110 may be provided in a same device.

The modem processor may include a modulator and a demodulator. The modulator is configured to modulate a to-be-transmitted low frequency baseband signal into a medium or high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transferred to the application processor. The application processor outputs a sound signal through an audio device (not limited to the speaker 170A, the telephone receiver 170B, and the like), or displays an image or a video through the display 194. In some embodiments, the modem processor may be a separate device. In some other embodiments, the modem processor may be separate from the processor 110 and provided in a same device together with the mobile communications module 150 or another functional module.

The wireless communications module 160 may provide wireless communication solutions for application to the electronic device 100, which include wireless local area networks (wireless local area networks, WLAN) (for example, wireless fidelity (wireless fidelity, Wi-Fi) network), bluetooth (bluetooth, BT), global navigation satellite systems (global navigation satellite system, GNSS), frequency modulation (frequency modulation, FM), near field communication (near field communication, NFC), infrared (infrared, IR) technology, and the like. The wireless communications module 160 may be one or more devices integrating at least one communication processing module. The wireless communications module 160 receives an electromagnetic wave through the antenna 2, performs frequency modulation and filtering processing on the electromagnetic wave signal, and transmits the processed signal to the processor 110. The wireless communications module 160 may also receive a to-be-transmitted signal from the processor 110, perform frequency modulation and amplification on the signal, and transmit the signal as an electromagnetic wave through the antenna 2.

The electronic device 100 implements a display function by using the GPU, the display 194, the application processor, and the like. The GPU is an image processing microprocessor, and is connected to the display 194 and the application processor. The GPU is configured to perform mathematical and geometrical computing for graphics rendering. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), organic light-emitting diode (organic light-emitting diode, OLED), active-matrix organic light emitting diode or active-matrix organic light emitting diode (active-matrix organic light emitting diode, AMOLED), flexible light-emitting diode (flex light-emitting diode, FLED), Miniled, MicroLed, Micro-oLed, quantum dot light emitting diodes (quantum dot light emitting diodes, QLED), or the like. In some embodiments, the electronic device 100 may include one or N displays 194, where N is a positive integer greater than 1.

The electronic device 100 may implement a shooting function by using the ISP, the camera 193, the video codec, the GPU, the display 194, the application processor, and the like.

The camera 193 is configured to capture a static image or a video. An optical image is generated for an object by using a lens, and is projected onto a photosensitive element. The photosensitive element may be a charge coupled device (charge coupled device, CCD) or a complementary metaloxide-semiconductor (complementary metal-oxide-semiconductor, CMOS) phototransistor. The photosensitive element converts an optical signal into an electrical signal, and then transfers the electrical signal to the ISP which converts the signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process digital signals, and is able to process not only digital image signals but also other digital signals. For example, when the electronic device 100 selects a frequency, the digital signal processor is configured to perform Fourier transform and the like on frequency energy.

The video codec is configured to compress or decompress a digital video. The electronic device 100 may support one or more types of video codecs, so that the electronic device 100 can play or record videos in a plurality of coding formats such as moving picture experts group (moving picture experts group, MPEG) 1, MPEG2, MPEG3, and MPEG4.

The external storage interface 120 may be configured to connect an external storage card, for example, a Micro SD card, to expand a storage capacity of the electronic device 100. The external storage card communicates with the processor 110 through the external storage interface 120, to implement a data storage function, for example, storing files such as music and video files in the external storage card.

The internal storage 121 may be configured to store computer-executable program code, and the executable program code includes an instruction. The processor 110 runs the instruction stored in the internal storage 121, to implement various function applications and data processing of the electronic device 100. The internal storage 121 may include a storage program area and a storage data area. The storage program area may store an operating system, an application program required by at least one function (for example, a sound play function and an image play function), and the like. The data storage area may store data (such as audio data and contacts) created during use of the electronic device 100, and the like. In addition, the internal storage 121 may include a high-speed random access memory, or may include a non-volatile memory such as at least one magnetic disk storage device, a flash memory device, and a universal flash storage (universal flash storage, UFS). For example, in the embodiments of this application, the processor 110 runs the instruction stored in the internal storage 121, to implement a display mode of a transition animation from a screen off mode to a lock screen mode, from a lock screen mode to a desktop mode, and from a desktop mode or a lock screen mode to a screen off mode in the embodiments of this application.

The electronic device 100 may use the audio module 170, the speaker 170A, the telephone receiver 170B, the microphone 170C, the earphone jack 170D, the application processor, and the like to implement an audio function, for example, music playing and sound recording.

The audio module 170 is configured to convert digital audio information into an analog audio signal output, and is also configured to convert an analog audio input into a digital audio signal. The audio module 170 may be further configured to encode and decode audio signals. In some embodiments, the audio module 170 may be provided in the processor 110, or some functional modules of the audio module 170 may be provided in the processor 110.

The pressure sensor 180A is configured to sense a pressure signal, and can convert the pressure signal into an electrical signal. In some embodiments, the pressure sensor 180A may be provided in the display 194. There are various types of pressure sensors 180A, for example, resistive pressure sensor, inductive pressure sensor, and capacitive pressure sensor. The capacitive pressure sensor may include at least two parallel plates made of a conductive material. When a force is applied to the pressure sensor 180A, capacitance between electrodes changes. The electronic device 100 determines pressure intensity based on a capacitance change. When a touch operation is performed on the display 194, the electronic device 100 detects strength of the touch operation by using the pressure sensor 180A. The electronic device 100 may also calculate a touch position based on a detection signal of the pressure sensor 180A. In some embodiments, touch operations that are applied to a same touch position but have different touch operation strength may correspond to different operation instructions. For example, when a touch operation whose touch operation strength is less than a first pressure threshold is applied to a messaging application icon, an instruction for displaying messages is executed. When a touch operation whose touch operation strength is greater than or equal to the first pressure threshold is applied to the messaging application icon, an instruction for creating a new message is executed.

The fingerprint sensor 180H is configured to collect fingerprints. The electronic device 100 may implement fingerprint unlock, application access lock, fingerprint-based photographing, fingerprint-based call answering, and the like by using characteristics of the collected fingerprint. For example, in the embodiments of this application, the fingerprint sensor 180H may collect a fingerprint of a user when a touchscreen is touched, and transmit the collected fingerprint to the processor 110. For example, the processor 110 may unlock the electronic device 100 based on fingerprint information input by the fingerprint sensor 180H.

The touch sensor 180K is also referred to as a "touch panel". The touch sensor 180K may be disposed on the display 194, and the touch sensor 180K and the display 194 form a touchscreen, also referred to as a "touch screen". The touch sensor 180K is configured to detect a touch operation applied on or near the touch sensor 180K. The touch sensor may transfer the detected touch operation to the application processor for determining a touch event type, and may provide a visual output related to the touch operation through the display 194. In some other embodiments, the touch sensor 180K may alternatively be disposed on a surface of the electronic device 100 at a location different from that of the display 194.

The button 190 includes a power on/off button, a volume button, and the like. The button 190 may be a mechanical button or a touch button. The electronic device 100 may receive a button-based input, and generate a key signal input related to user setting and function control of the electronic device 100. For example, in the embodiments of this application, when the electronic device 100 is in a screen off mode, the user presses the power on/off button. The electronic device 100 may enter a lock screen mode from the screen off mode in response to the received operation of pressing the power on/off button by the user. For example, when the electronic device is in the lock screen mode or a desktop mode, if the electronic device 100 receives an operation of pressing the power on/off button by the user, the electronic device 100 enters the screen off mode from the lock screen mode or the desktop mode.

For example, a software system of the electronic device 100 may use a layered architecture, an event-driven architecture, a microkernel architecture, a microservice architecture, or a cloud architecture. In the embodiments of this application, a software structure of the electronic device 100 is described by using an Android system with a layered architecture as an example.

Figure 2:
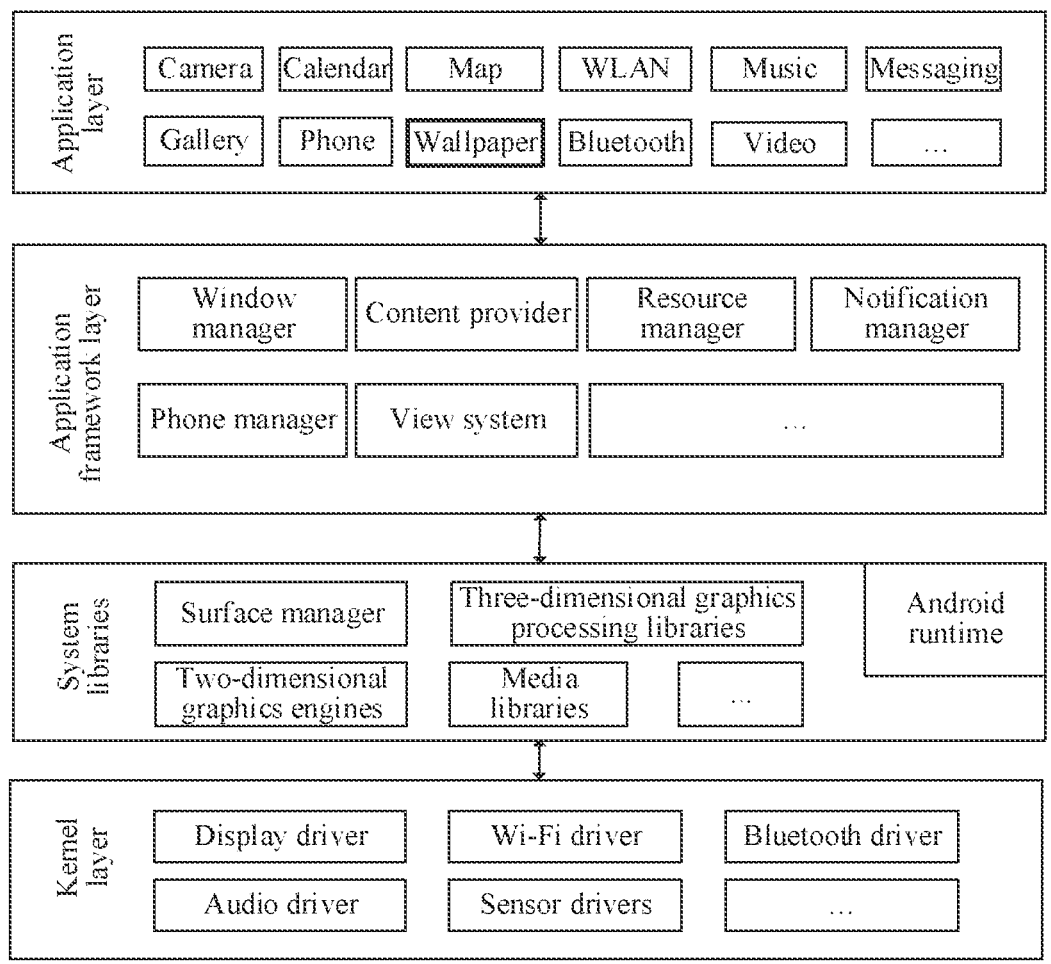
FIG. 2 illustrates a schematic diagram of a software structure of an electronic device.

FIG. 2 is a structural block diagram of software of an electronic device 100 according to an embodiment of this application.

In a layered architecture of the electronic device 100, software is divided into several layers, and each layer has clear roles and responsibilities. The layers communicate with each other through software interfaces. In some embodiments, an Android system is divided into four layers: an application layer, an application framework layer, Android runtime (Android runtime) and system libraries, and a kernel layer from top to bottom.

The application layer may include a series of application program packages.

As shown in FIG. 2, the application program packages may include application programs such as camera, gallery, calendar, phone, map, navigation, WLAN, Bluetooth, music, video, messaging, and wallpaper. For example, the wallpaper application program may implement display modes of wallpaper or transition animations in the embodiments of this application. For example, the wallpaper application program may provide a user interface for a user to change wallpaper or a video displayed in a transition animation.

The application framework layer provides application programming interfaces (application programming interface, API) and a programming framework for application programs at the application layer. The application framework layer includes some predefined functions.

As shown in FIG. 2, the application framework layer may include a window manager, a content provider, a view system, a phone manager, a resource manager, a notification manager, and the like.

The window manager is used to manage window programs. The window manager can, for example, obtain a display size, determine whether a status bar is present, lock the screen, and take a screenshot.

The content provider is used to store and retrieve data, and makes the data accessible by applications. The data may include videos, images, audio, phone calls made and received, browse history, bookmarks, contacts, and the like.

The view system includes visual controls, for example, controls with text displayed and controls with a picture displayed. The view system may be used for building application programs. A display screen may include one or more views. For example, a display screen including a messaging notification icon may include a view displaying text and a view displaying a picture.

The phone manager is used for providing a communication function of the electronic device 100, for example, management of call status (including answering or disconnecting calls).

The resource manager provides various resources for application programs, for example, localized strings, icons, pictures, layout files, and video files.

The notification manager enables an application program to display notification information in a status bar, and may be used to convey messages of a notification type that may disappear automatically after a short stay without user interaction. For example, the notification manager is used to notify that download is completed and alert about a message. Alternatively, the notification manager may be a notification that appears in a top status bar of a system in a form of a chart or scroll bar text, for example, a notification of an application program running in the background, or may be a notification that appears on a screen in a form of a dialog box. For example, text information is provided in a status bar, an alert sound is played, an electronic device vibrates, or an indicator blinks.

The Android runtime includes core libraries and a virtual machine. The Android runtime is responsible for scheduling and managing an Android system.

The core libraries include functional functions that the java language needs to call and core libraries of Android.

The application layer and the application framework layer run on the virtual machine. The virtual machine executes java files of the application layer and the application framework layer as binary files. The virtual machine is used to perform functions such as object lifecycle management, stack management, thread management, security and exception management, and garbage collection.

The system libraries may include a plurality of functional modules, for example, a surface manager (surface manager), media libraries (media libraries), a three-dimensional graphics processing libraries (for example, OpenGL ES), and 2D graphics engines (for example, SGL).

The surface manager is used to manage a display subsystem and provide fusion of 2D and 3D graphic layers for a plurality of application programs.

The media libraries support playback and recording of audio and videos in a plurality of commonly used formats as well as static image files. The media libraries can support a plurality of audio and video coding formats such as MPEG4, H.264, MP3, AAC, AMR, JPG, and PNG.

The three-dimensional graphics processing libraries are used to implement three-dimensional graphics drawing, image rendering and composition, graphic layer processing, and the like.

The 2D graphics engines are drawing engines for 2D graphics.

The kernel layer is a layer between hardware and software. The kernel layer includes at least a display driver, a camera driver, an audio driver, and sensor drivers.

It may be understood that components included in the system framework layer and the system libraries and runtime layer shown in FIG. 2 do not constitute any limitation on the electronic device 100. In some other embodiments of this application, the electronic device 100 may include more or fewer components than shown in the figure, or combine some components, or split some components, or have a different component arrangement.

For example, an embodiment of this application provides a display mode of a transition animation, allowing the transition animation to be displayed more smoothly and continuously, to improve user experience. To enable a person skilled in the art to better understand the display mode of the transition animation in this embodiment of this application, the following briefly describes the transition animation. FIG. 3*a* to FIG. 3*f* illustrate a display mode of a transition animation.

Figure 3A:
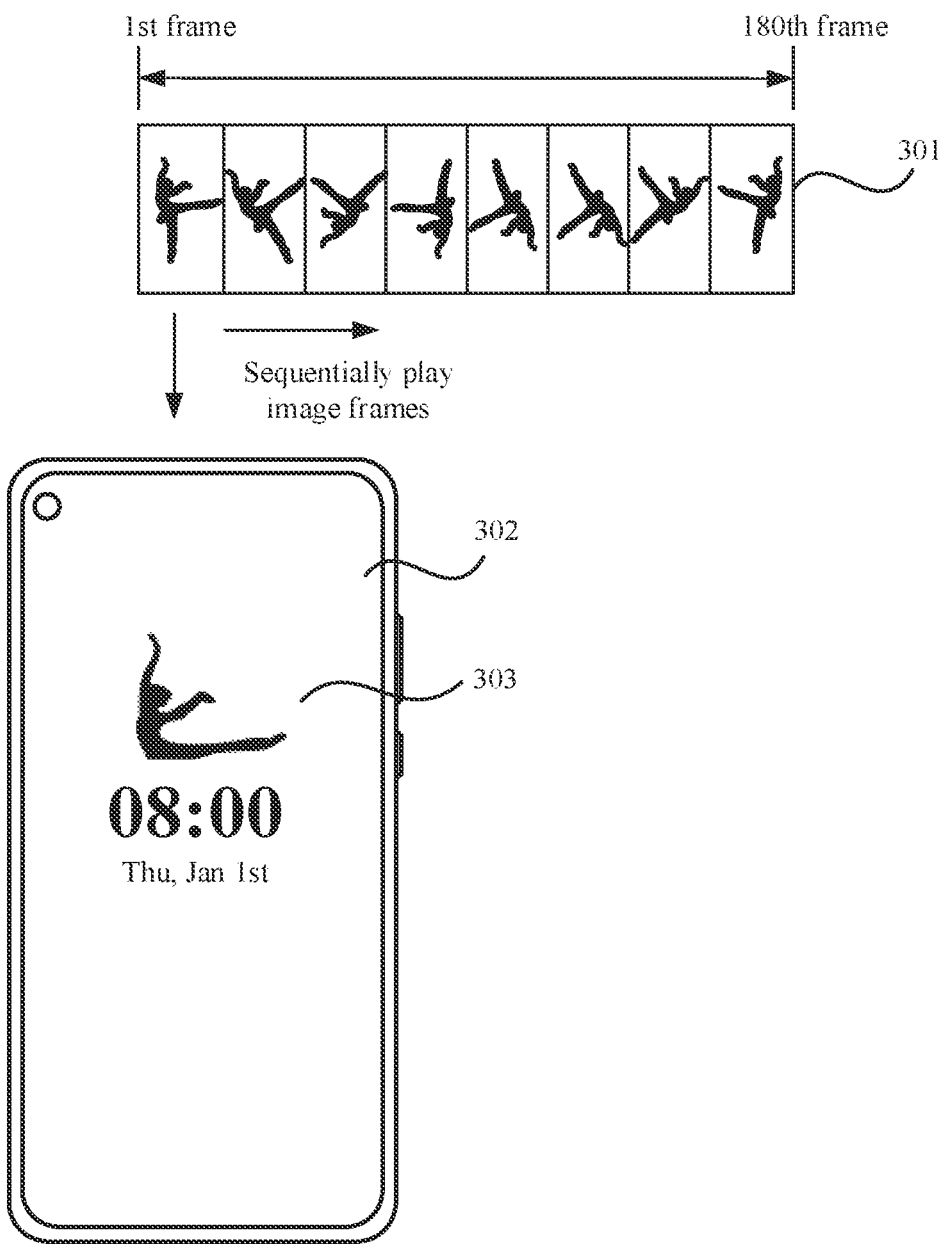
FIG. 3a to FIG. 3f illustrates a display mode of a transition animation.

Referring to FIG. 3*a*, for example, a video segment 301 corresponding to the transition animation (which may also be referred to as a transition animation effect, a transition effect, and the like) includes 180 image frames (which may also be referred to as video frames, and the like). It should be noted that the transition animation mentioned in the embodiments of this application may be understood as an animation effect used in a process of switching between different modes. The modes in the embodiments of this application include, but are not limited to, a screen off mode, a lock screen mode, and a desktop mode. For example, a transition animation in the screen off mode in the following embodiments of this application is optionally an animation effect played on a display when an electronic device switches from the desktop mode to the screen off mode. A transition animation in the lock screen mode is optionally an animation effect played on a display when an electronic device switches from the screen off mode to the lock screen mode. A transition animation in the desktop mode is optionally an animation effect played on a display when an electronic device switches from the lock screen mode to the desktop mode. Optionally, the desktop mode may also be referred to as an unlock mode. This is not limited in this application.

For example, the screen off mode is optionally a mode that the electronic device enters after receiving an operation of pressing a power on/off button by a user. The electronic device turns off the display, and displays the transition animation in the screen off mode on the turned-off display.

For example, the lock screen mode is optionally a mode in which the screen of the electronic device is locked. For example, in the screen off mode, the user performs an operation such as touching or pressing a button on a mobile phone, optionally causing the electronic device to enter the lock screen mode. For example, the screen is locked in the lock screen mode, and needs to be unlocked by the user before the electronic device can enter the desktop mode. For example, some functions that can be used without unlocking, such as a camera function and widgets, may be provided in the lock screen mode. In other words, in the lock screen mode, the user can perform a corresponding operation on the electronic device, while in the screen off mode, when the user triggers the electronic device, the electronic device will enter the lock screen mode.

For example, the desktop mode is a mode that the electronic device enters after unlock. For example, the user may perform an operation on the electronic device in the desktop mode to use corresponding functions provided by the electronic device. For example, the user may use a chat application, a video application, and the like.

It should be noted that mode switching in the embodiments of this application includes, for example, switching from the screen off mode to the lock screen mode, switching from the lock screen mode to the desktop mode, or switching from the desktop mode (or the lock screen mode) to the screen off mode, and is optionally screen switching. For example, switching from the screen off mode to the lock screen mode is optionally switching from a screen off screen displayed on a display of the mobile phone to a lock screen. Each screen (including the screen off screen, the lock screen, and the desktop mode) in the embodiments of this application is a display in full screen mode. In other words, when the display switches from one screen (for example, the screen off screen) to another screen (for example, the lock screen), the previous screen (that is, the screen off screen) is not displayed, and the switched-to screen (that is, the lock screen) is displayed on the display in full screen mode.

It should be further noted that the quantity of image frames included in the transition animation in the embodiments of this application is only an illustrative example. This is not limited in this application. For example, when the mobile phone is in the lock screen mode or the desktop mode, the user presses the power on/off button. In response to the received operation, the mobile phone enters the screen off mode.

Still referring to FIG. 3a, for example, a screen off screen 302 of the mobile phone includes a transition animation display box 303, a time control, and the like. A first image frame in the video segment 301 is displayed in the transition animation display box 303.

Figure 3B:
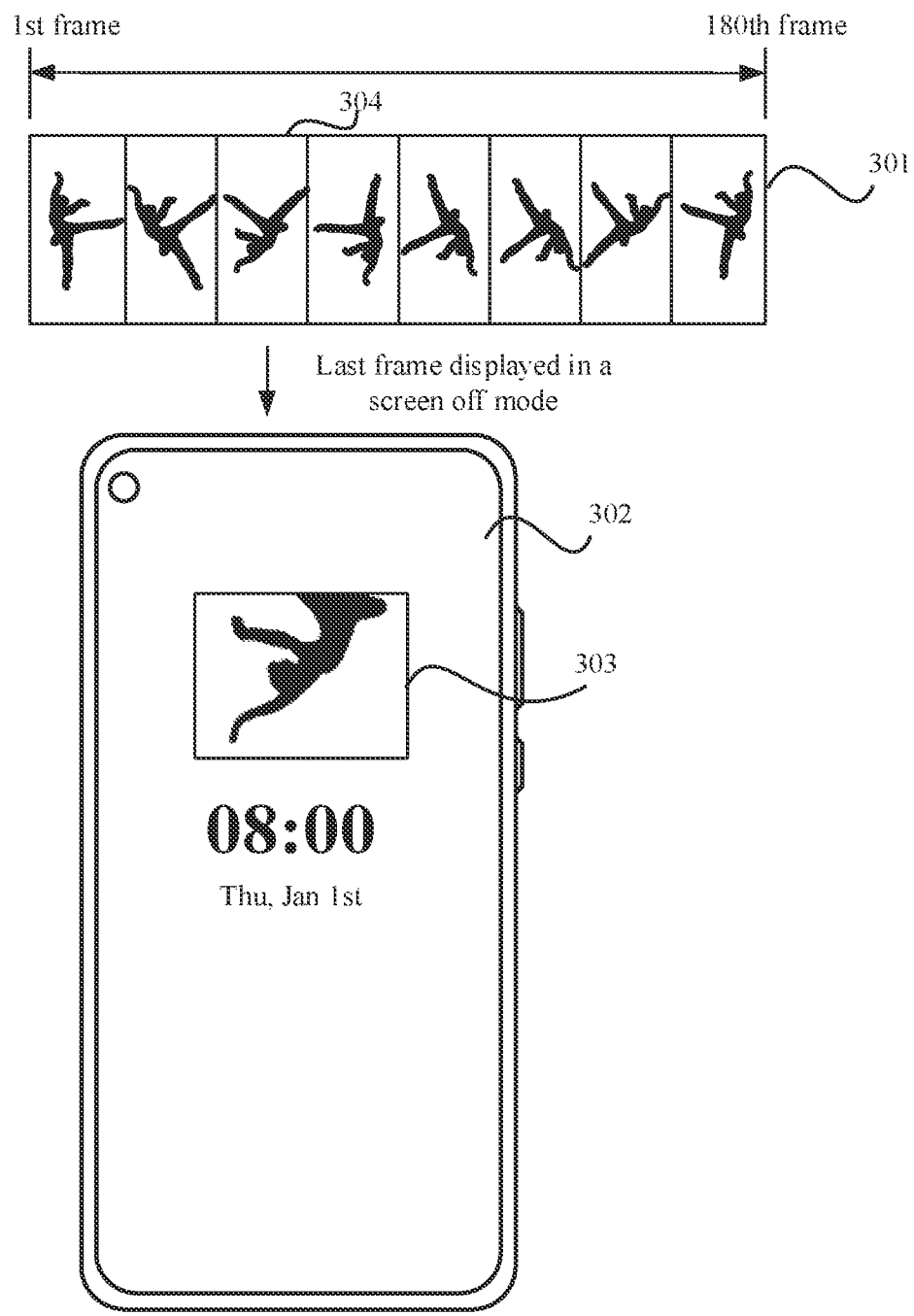

For example, the mobile phone may sequentially play the image frames in the video segment 301 in the transition animation display box 303. Referring to FIG. 3b, for example, the mobile phone presets a key frame of the screen off mode. The key frame is optionally the last image frame played in a current mode. For example, the key frame of the screen off mode is an image frame 304 in the video segment 301. For example, the image frames in the video segment 301 are sequentially played in the transition animation display box 303 of the mobile phone until the image frame 304 is played. The image frame 304 stays as an image displayed in the transition animation display box 303. It can be understood that the image frame 304 is frozen as a picture in the transition animation display box 303 on the screen off screen 302, while other controls (for example, the time control) run normally.

Figure 4:
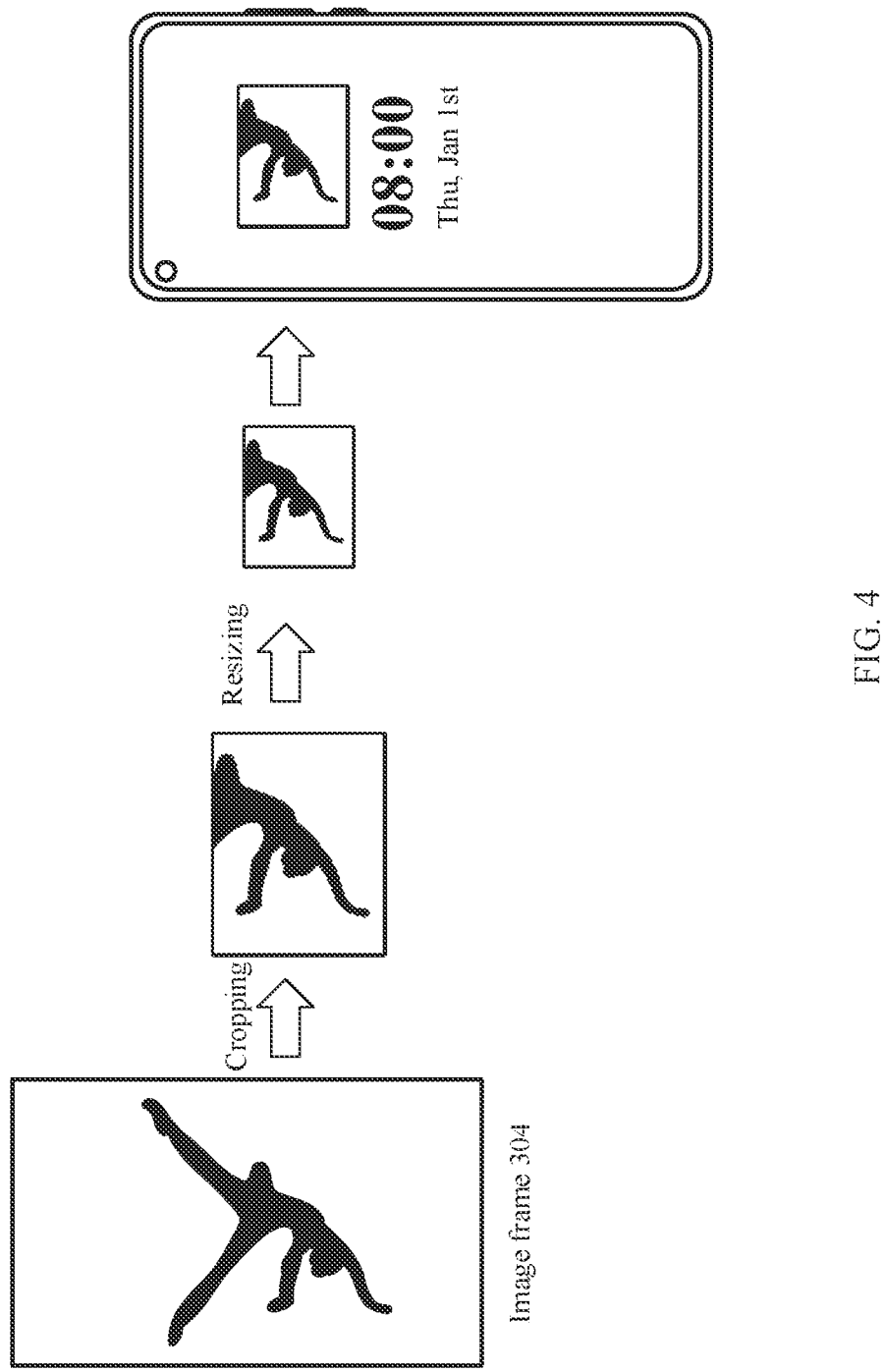
FIG. 4 illustrates a schematic diagram of processing an image frame played in a screen off mode.

It should be noted that the mobile phone may perform corresponding processing on image frames in the transition animation corresponding to the screen off mode, so that all the image frames meet a size requirement of the transition animation display box 303. For example, as shown in FIG. 4, the mobile phone performs grayscale processing on the image frame 304. The mobile phone selects one or more main body parts in the grayscale-processed image frame 304 according to a given size (for example, 1440*800, which is not limited in this application). Each main body part is of the given size. Optionally, a plurality of main body parts may partially overlap. A terminal can calculate a difference value of an individual pixel in each main body part. A difference value of an individual pixel is a difference value between the pixel and surrounding pixels. The mobile phone can obtain a sum of difference values of pixels in a main body part as a difference value of the main body part. The mobile phone can crop a main body part with a largest difference value from the image frame 304. The cropped main body part is resized in specific proportion (for example, zoomed out by 50%) to obtain the resized main body part. The mobile phone adds a mask of a specific shape to the resized main body part. For example, the mask of a specific shape may be a rectangular mask, a circular mask, a triangular mask, and the like. This is not limited in this application. The processed image frame is an image displayed in the transition animation display box 303. It should be noted that, in this embodiment of this application, only the rectangular mask is used as an example of the mask of a specific shape for description. In other embodiments, if a circular mask is used in the processing, the transition animation display box 303 may be round, triangular, or of other shapes. This is not limited in this application.

Figure 3C:
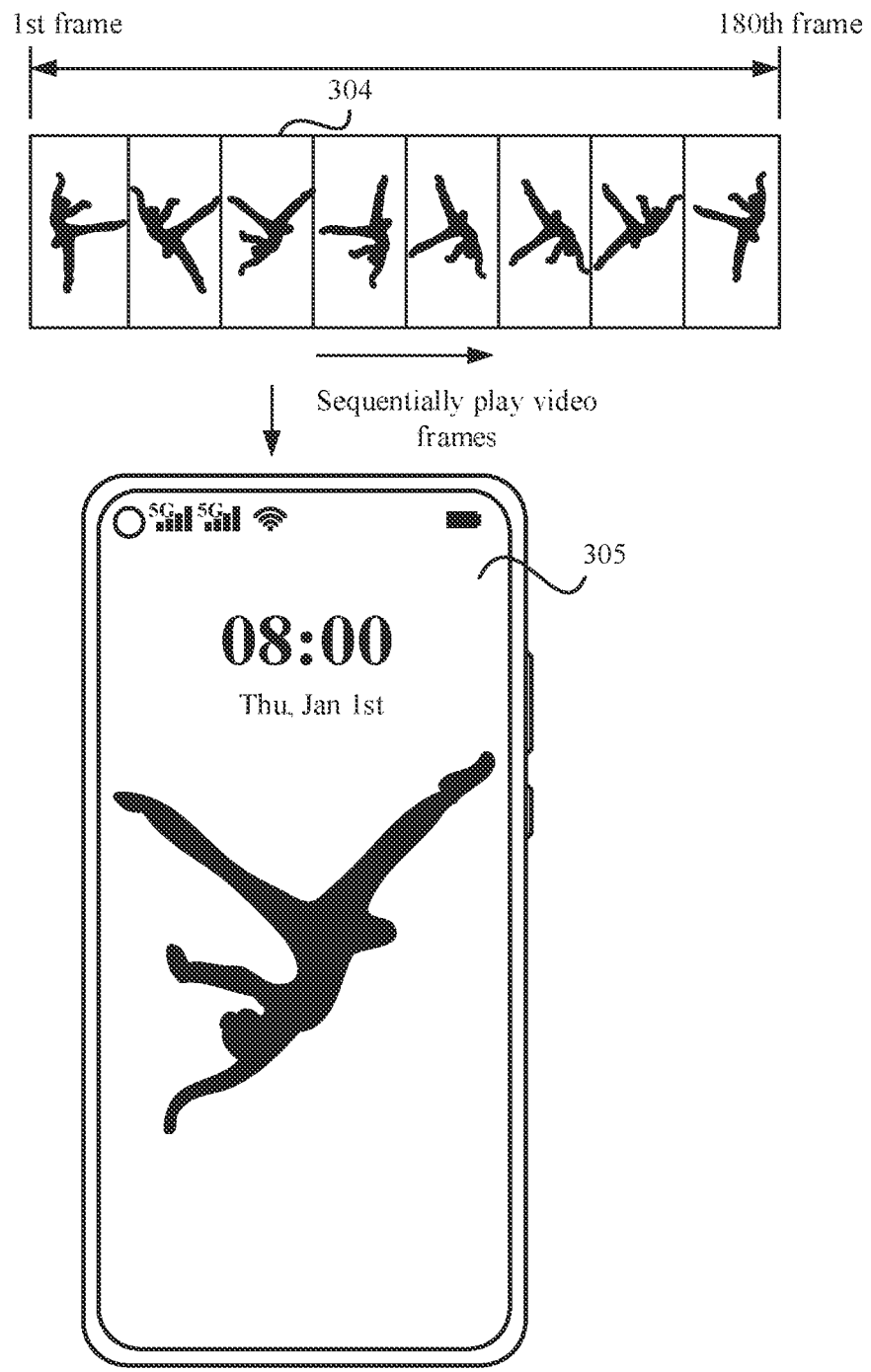

Still referring to FIG. 3b, for example, the user can make the mobile phone enter the lock screen mode by touching the power on/off button, the screen, or the like on the screen off screen 302. Referring to FIG. 3c, for example, the mobile phone enters the lock screen mode. Image frames of a transition animation in the lock screen mode are sequentially played on a lock screen 305 of the mobile phone. For example, the first image frame of the transition animation in the lock screen mode is optionally the last image frame of the transition animation in the screen off mode, that is, the key frame in the screen off mode (for example, the image frame 304).

For example, the lock screen 305 may further include one or more controls such as a time control, a network control, and a battery control. For example, the one or more controls displayed on the lock screen 305 may alternatively be displayed when the transition animation in the lock screen mode is played to any frame. Optionally, the one or more controls may be displayed in a fly-in or fade-in manner. This is not limited in this application.

Figure 3D:
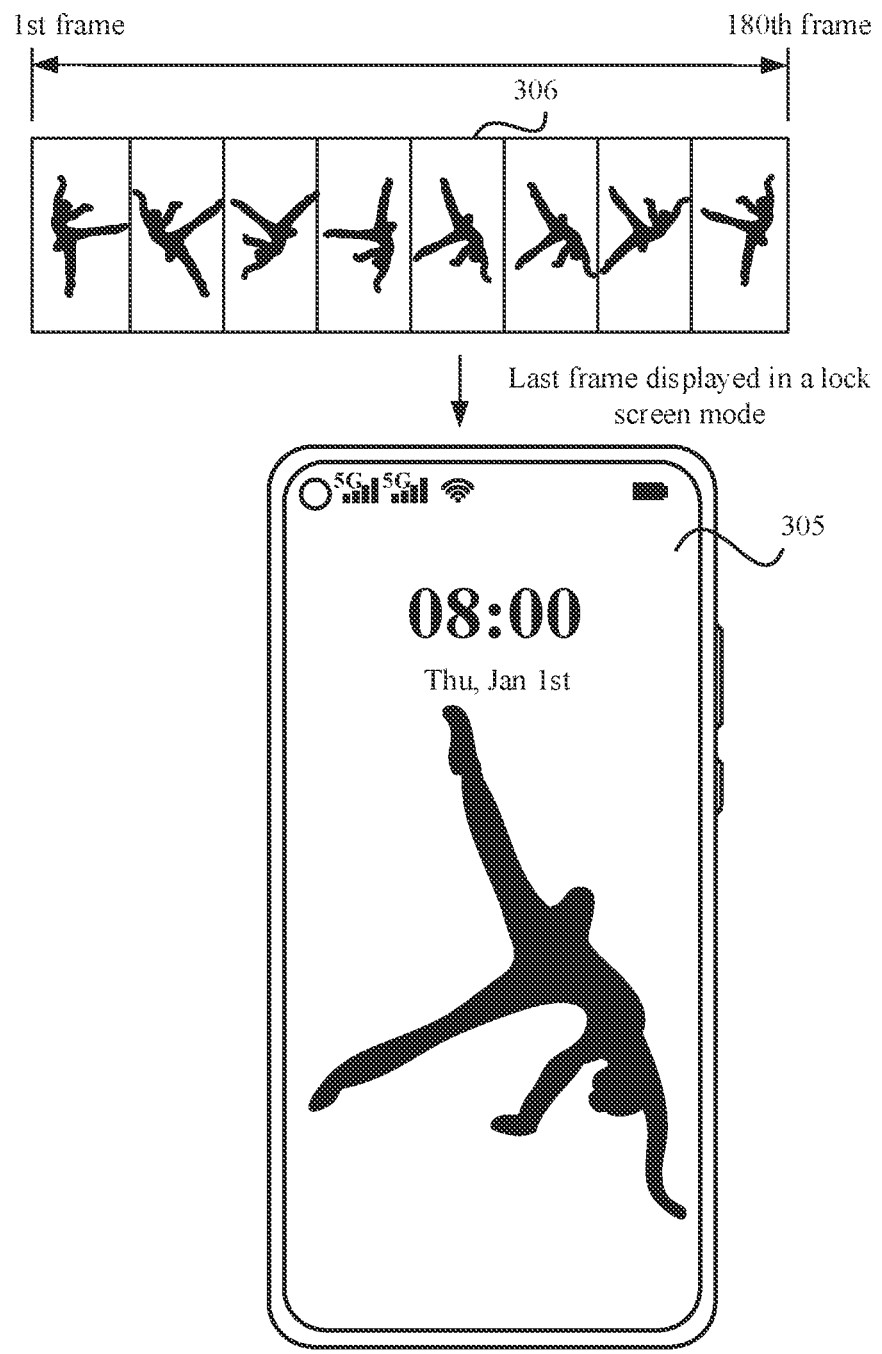

Referring to FIG. 3d, for example, similar to the screen off mode, the transition animation played on the lock screen 303 is played to a key frame in the lock screen mode. For example, an image frame 306 is the key frame in the lock screen mode. Correspondingly, the transition animation stops after the image frame 306 is played on the lock screen 303. In other words, before the mobile phone unlocks the screen or re-enters the screen off mode, an image displayed on the lock screen 305 is always the image frame 306. For example, the user can unlock the screen through sliding unlock, fingerprint unlock, or the like. In response to the received user operation, the mobile phone enters the desktop mode (or referred to as the unlock mode).

Figure 3E:
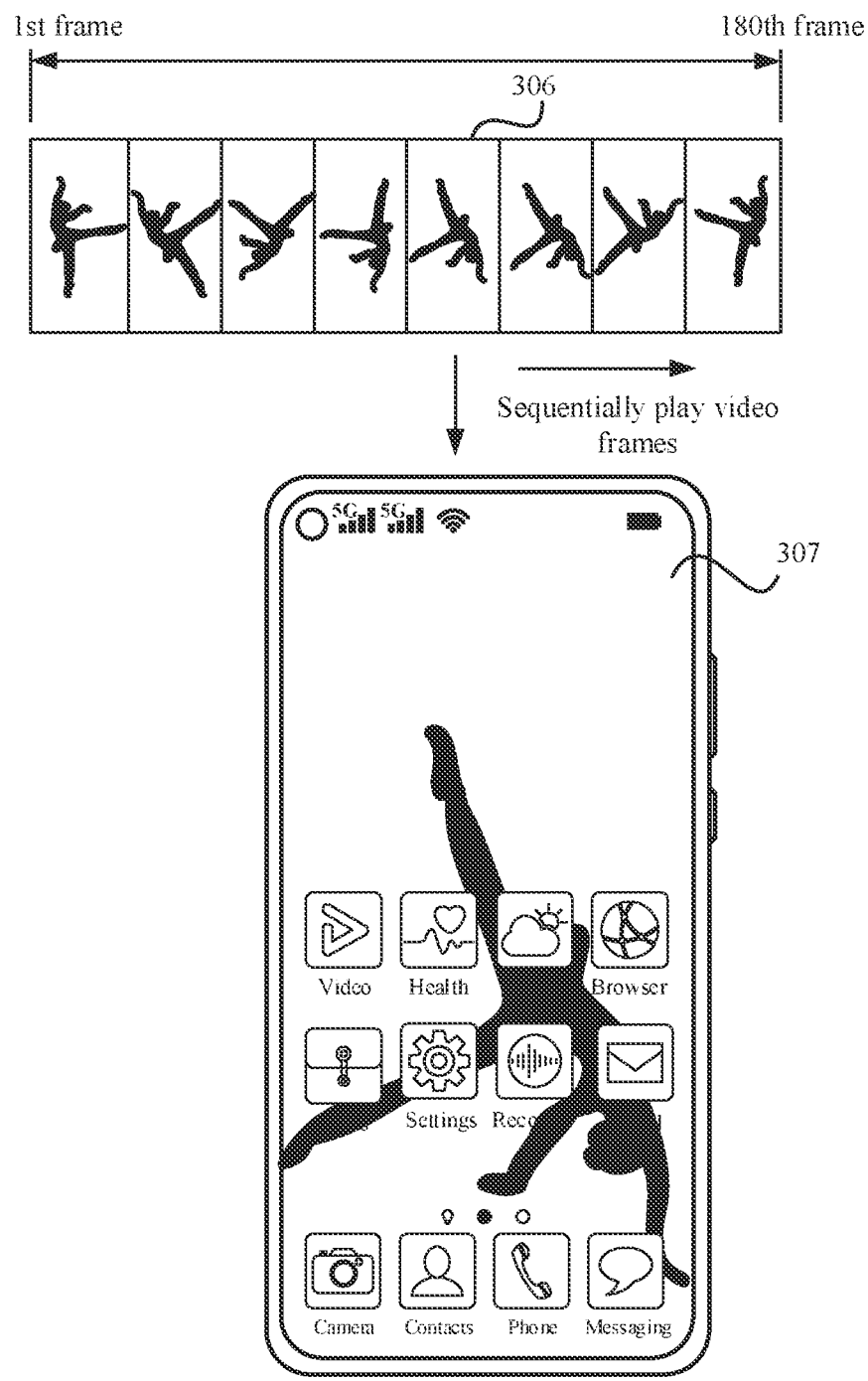

Referring to FIG. 3e, for example, the mobile phone enters the desktop mode. Image frames of a transition animation in the desktop mode are sequentially played on a desktop (or referred to as mobile phone display screen) 307. For example, the first image frame of the transition animation in the desktop mode is optionally the last image frame of the transition animation in the lock screen mode, that is, the key frame in the lock screen mode (for example, the image frame 306).

Optionally, the image frames of the transition animation in the desktop mode may be displayed on the desktop 307 in a manner of tiling, stretching, or the like. For example, the desktop 307 may also include one or more controls such as a time control, a network control, a battery control, and an application icon control. For example, the one or more controls displayed on the desktop 307 may alternatively be displayed when the transition animation in the desktop mode is played to any frame. Optionally, the one or more controls may be displayed in a fly-in or fade-in manner. This is not limited in this application. It should be noted that, in this embodiment of this application, that the mobile phone enters the desktop after unlock from the lock screen mode is used as an example for description. In other embodiments, the mobile phone may enter a screen, for example, a web page, displayed before the screen of the mobile phone is turned off.

Figure 3F:
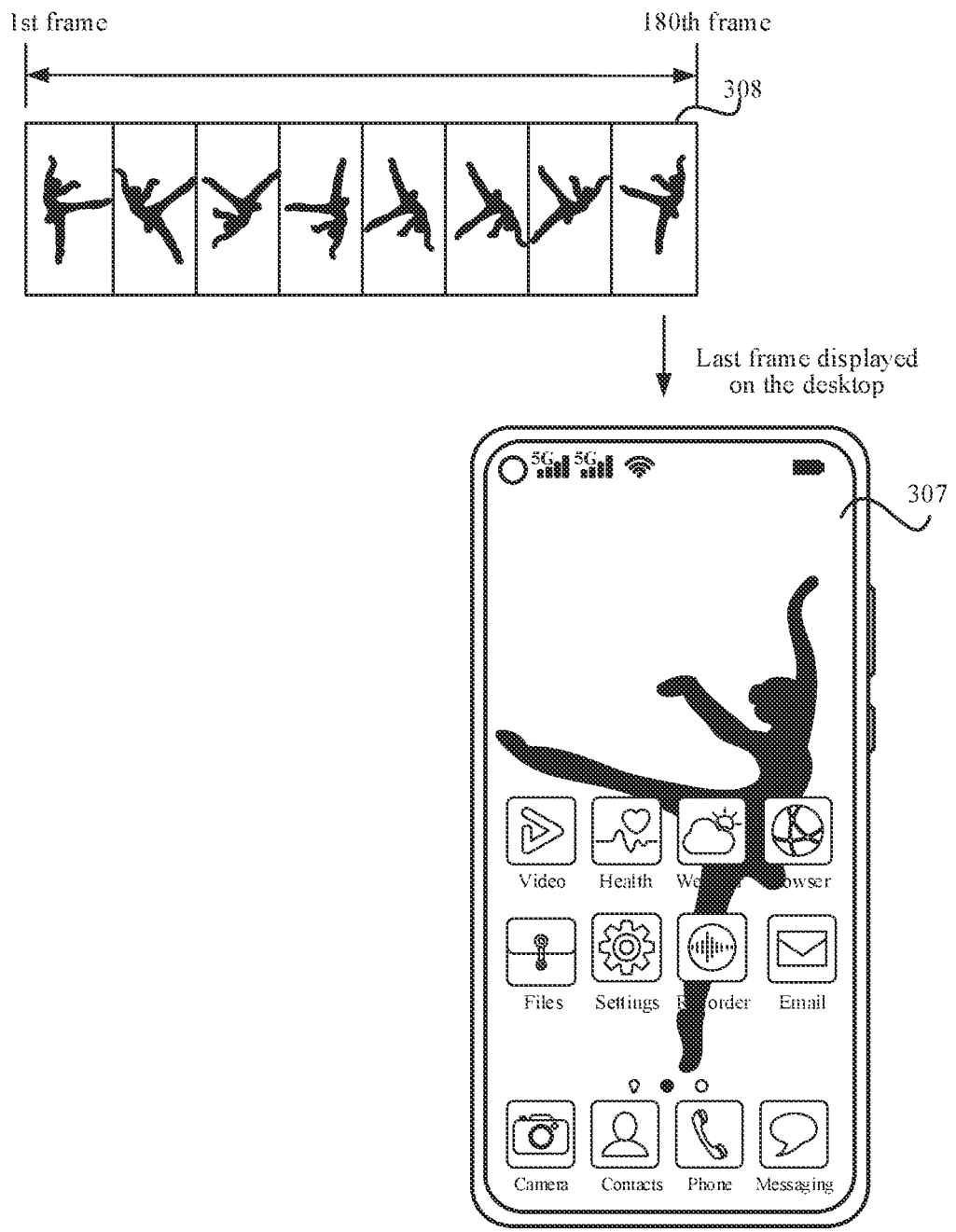

Referring to FIG. 3f, for example, the transition animation played on the desktop 307 is played to a key frame in the desktop mode, for example, an image frame 308. Correspondingly, the transition animation played on the desktop 307 stops after being played to the image frame 308.

An embodiment of this application provides a display mode of a transition animation from a screen off mode to a lock screen mode, allowing the transition animation to be displayed more smoothly and continuously from the screen off mode to the lock screen mode. FIG. 5a to FIG. 5d illustrate a display mode of a transition animation from a screen off mode to a lock screen mode. Referring to (1) of FIG. 5a, for example, after a mobile phone enters the screen off mode, a transition animation in the screen off mode is played in a transition animation display box 502 in the screen off mode, and is frozen at the last frame in the screen off mode (that is, a key frame in the screen off mode), for example, the image frame 304 in FIG. 3b. For other descriptions, refer to FIG. 3a and FIG. 3b. Details are not described herein again.

For example, when the mobile phone receives an operation of triggering a power on/off button by a user, the mobile phone enters the lock screen mode. Referring to (2) of FIG. 5a, for example, the mobile phone displays a lock screen 503. Optionally, a time control and the like on a screen off screen 502 disappear. The mobile phone starts playing the transition animation on the lock screen 503. Optionally, before the mobile phone switches from the screen off mode to the lock screen mode, a screen may be black. After the screen is black, the lock screen 503 is displayed.

Figure 5A:
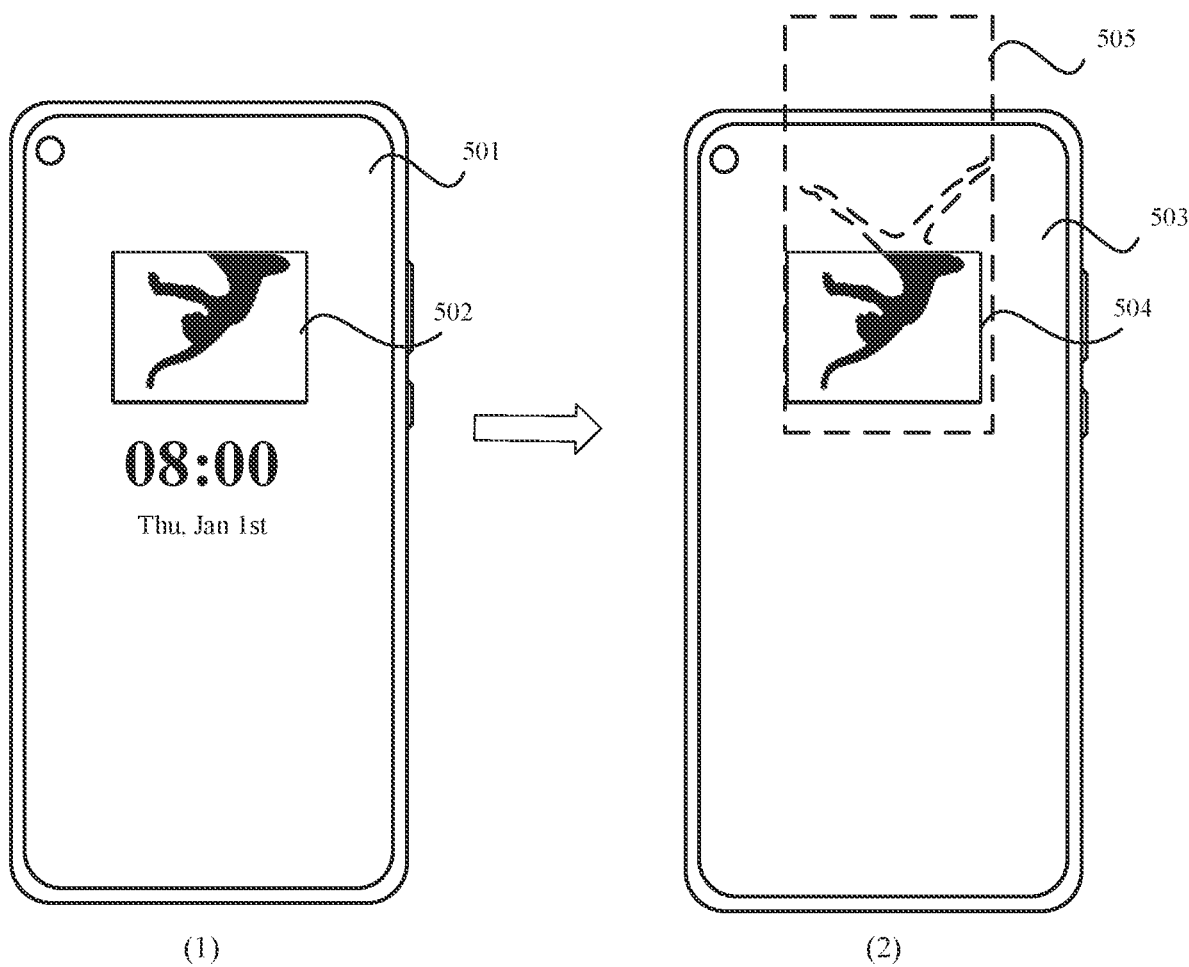
FIG. 5a to FIG. 5d illustrate a display mode of a transition animation from a screen off mode to a lock screen mode.

Still referring to (2) of FIG. 5a, for example, the lock screen 503 includes a field of view box 504 and a schematic image box 505. For example, a position of a center point of the field of view box 504 on the lock screen 503 is the same as that of a center point of the transition animation display box 502 on the screen off screen 501 in (1) of FIG. 5a. The center point is a geometric center of the field of view box or the transition animation display box (this also applies in the following descriptions, and details are not repeated).

Optionally, in this embodiment of this application, a rectangular box is used as an example of the field of view box 504 for description. In other embodiments, the field of view box 504 may be round, triangular, or of other shapes. This is not limited in this application.

For example, in this embodiment of this application, a size and a position of the field of view box 504 on the lock screen 503 are the same as those of the transition animation display box 502 on the screen off screen 501. For example, in this embodiment of this application, that the center point of the field of view box 504 and a center point of the lock screen 503 are on a same vertical line and the center point of the transition animation display box 502 and a center point of the screen off screen 501 are on a same vertical line is used as an example for description.

In this embodiment of this application, the field of view box 504 is used to display a part of the schematic image box 505 on which the field of view box 504 is superimposed. It should be noted that parts other than the field of view box 504 are optionally black. In other words, from a user's point of view, currently, an image is displayed only in the field of view box 504 on the lock screen 503, and all parts on the lock screen 503 except the field of view box 504 are black.

For example, the schematic image box 505 includes the first image frame of a transition animation in the lock screen mode, that is, the last frame in the screen off mode (that is, the key frame in the screen off mode). In other words, in this embodiment of this application, in a process of switching from the screen off mode to the lock screen mode, the first image frame displayed in the lock screen mode and the last frame in the screen off mode are one image frame, so that transition between the lock screen mode and the screen off mode is more smooth, improving user experience.

For example, as described above, an image displayed in the transition animation display box 502 has been cropped and resized. Correspondingly, a size of an image displayed in the schematic image box 505 is corresponding to a size of the resized image. For example, as described in FIG. 4, the mobile phone reduces a main body part by 50% in a preset scale. In (2) of FIG. 5a, the size of the image in the schematic image box 505 is obtained by reducing an original image (for example, the image frame 304 in FIG. 3d) by 50%. The foregoing size is only an illustrative example. This is not limited in this application.

For example, as described above, the field of view box 504 is used to display an image, to improve displaying continuity during switching from the screen off mode to the lock screen mode. In this embodiment of this application, the image displayed in the field of view box 504 is consistent with the image displayed in the transition animation display box 502. For example, to make the image displayed in the field of view box 504 consistent with the image displayed in the transition animation display box 502, a part of the field of view box 504 superimposed on the schematic image box 505 needs to be consistent with the image displayed in the transition animation display box 502. In other words, the superimposed part is the resized main body part in FIG. 4. Correspondingly, according to the above rules, the mobile phone can add the schematic image box 505 under the field of view box 504 based on a current position of the field of view box 504, so that the superimposed part of the field of view box 504 and the schematic image box 505 is the cropped main body part in FIG. 4.

For example, in this embodiment of this application, the field of view box 504 and the schematic image box 505 are gradually enlarged, and move to the center of the lock screen 503 in the enlarging process. It should be noted that, in this embodiment of this application, that the field of view box 504 and the schematic image box 505 are proportionally enlarged and move to the center of the lock screen 503 with a same speed and different moving tracks is used as an example for description. In other embodiments, an enlarging proportion of the field of view box 504 may be different from that of the schematic image box 505, and/or a moving speed of the field of view box 504 to the center of the lock screen 503 may be different from that of the schematic image box 505 to the center of the lock screen 503, and/or a moving track of the field of view box 504 to the center of the lock screen 503 may be different from that of the schematic image box 505. This is not limited in this application.

It should be noted that, in this embodiment of this application, the size of the image in the schematic image box 505 is consistent with the size of the schematic image box 505. In other words, while the size and position of the schematic image box 505 are changing, the size of the image in the schematic image box 505 keeps consistent with the size of the schematic image box.

It should be further noted that the schematic image box 505 in this embodiment of this application is only used to describe a superposition mode and a display mode of the image and the field of view box, and the schematic image box 505 is not displayed on the lock screen 503. Certainly, the part of the schematic image box 505 beyond the lock screen 503 is only used to better describe the size and position of the schematic image box 505. Details are not described in the following again. In other words, from a user's point of view, the user can only see the image displayed in the field of view box 504 on the lock screen 503, and other parts on the lock screen 503 are all black.

For example, as described above, in (1) of FIG. 5a, the center of the field of view box 504 and the center of the lock screen 503 are on a same vertical line, while a center of the schematic image box 505 and the center of the lock screen 503 are not on a same vertical line. For example, when moving to the center of the lock screen 503, the field of view box 504 only needs to move downward vertically. However, when moving to the center of the lock screen 503, the schematic image box 505 needs to move to the lower left to approach the center of the lock screen 503. In addition, as mentioned above, the field of view box 504 and the lock screen schematic image box 505 are proportionally enlarged. According to the foregoing enlarging and moving manners, moved-to positions of the enlarged schematic image box 505 and field of view box 504 are shown in (1) of FIG. 5b.

Figure 5B:
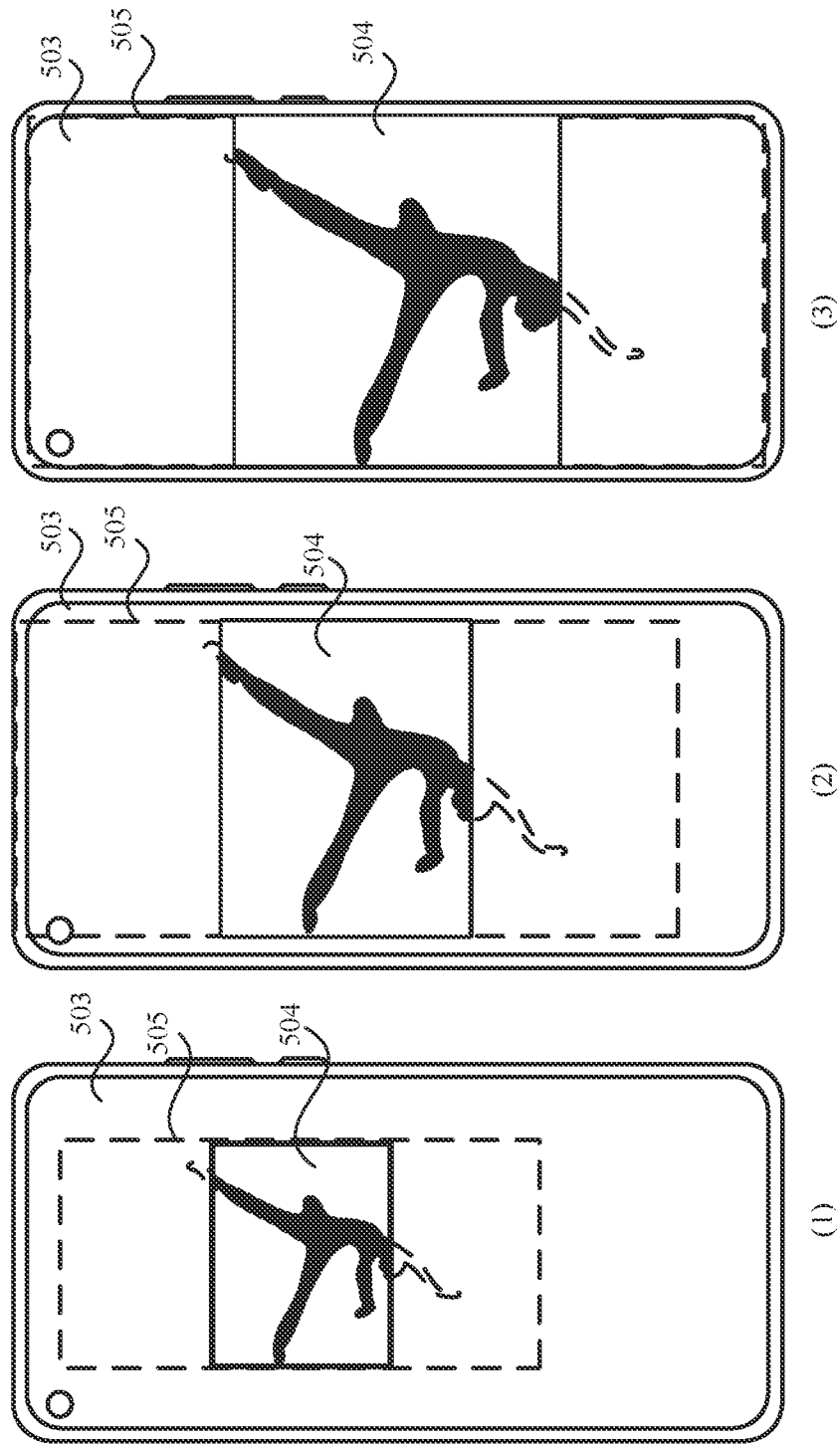

Referring to (1) of FIG. 5b, for example, a part that is of the field of view box 504 and that is superimposed on the schematic image box 505 is an image currently displayed in the field of view box 504. It should be noted that parts other than the field of view box 504 in the lock screen schematic image box 505 are still black.

It should be noted that, in this embodiment of this application, as shown in FIG. 3c, the transition animation from the screen off mode to the lock screen mode includes a plurality of image frames between the first frame (for example, the image frame 304) in the lock screen mode and the last frame (for example, the image frame 306) in the lock screen mode. For example, 60 image frames may be included. It should be noted that the image frames included in the video segment 301 shown in FIG. 3a to FIG. 3e are only folded image frames. For example, the unfolded image frame 304 may optionally include 20 image frames (which is only an illustrative example, and is not limited in this application). Correspondingly, to realize an animation effect from the screen off mode to the lock screen mode, in a process of gradually displaying the image in the lock screen mode according to FIG. 5a to FIG. 5d, the image frames in the video segment 301 are still sequentially played on the lock screen 503. In other words, the image in the schematic image box 505 changes with the image frames in the video segment.

For example, the unfolded image frame 304 includes an image frame 1, an image frame 2, . . . , and an image frame 20. In (2) of FIG. 5a, the image included in the schematic image box 505 is the image frame 1, and correspondingly, a part superimposed on the image frame 1 is displayed in the field of view box 504. As described above, the schematic image box 505 and the field of view box 504 are gradually enlarged and move, and at the same time, the schematic image box 505 sequentially includes the image frames of the unfolded image frame 304. When the schematic image box 505 and the field of view box 504 are enlarged and move, as shown in (1) of FIG. 5b, the image included in the schematic image box 505 is the image frame 5, and correspondingly, a part superimposed on the image frame 5 is displayed in the field of view box 504. The schematic image box 505 and the field of view box 504 continue to be enlarged and move to an extent as shown in (2) of FIG. 5b. Referring to (2) of FIG. 5b, for example, the image included in the schematic image box 505 is the image frame 13, and correspondingly, a part superimposed on the image frame 13 is displayed in the field of view box 504. It can be understood that, in the process of gradually enlarging and moving the field of view box 504, an image displayed in the field of view box 504 also changes dynamically. For example, there is a dancing girl in the video segment. In (2) of FIG. 5a, the field of view box 504 is flipping downward, and as the field of view box 504 is gradually enlarged and moves, and the image frames are sequentially played, the dancing girl displayed in the field of view box 504 continues to flip downward. This is the same case in the following descriptions, and details are not repeated.

For example, in the process of enlarging and moving the schematic image box 505, if all side lines of the schematic image box 505 are on or beyond corresponding side lines of the lock screen 503, the schematic image box 505 stops being enlarged. It should be noted that, in this embodiment of this application, that all side lines of the schematic image box 505 are on the corresponding side lines of the lock screen 503 is only used to illustrate a positional relationship between the side lines. In practice, in the process of enlarging and moving the schematic image box 505, the electronic device can obtain a distance between each side line of the schematic image box 505 and a corresponding side line of the lock screen 503. The corresponding side line is a side line that is parallel and closest to the schematic image box 505. For example, in a case that a left side line of the schematic image box 505 is parallel to a left side line and a right side line of the lock screen 503 and is closest to the left side line, the left side line of the lock screen 503 is a side line corresponding to the left side line of the schematic image box 505. In a case that a distance between each side line of the schematic image box 505 and a corresponding side line is 0, the schematic image box 505 overlaps the corresponding side lines, equivalent that the side lines of the schematic image box 505 are on the corresponding side lines in this embodiment of this application. This is the same case in the following descriptions, and details are not repeated.

As shown in (3) of FIG. 5b, four side lines of the schematic image box 505 are all on corresponding side lines of the lock screen 503, and the schematic image box 505 stops being enlarged. It should be noted that, in this embodiment of this application, that the center of the schematic image box 505 just coincides with the center of the lock screen 503 when the image display box 505 stops being enlarged is used as an example for description. In other embodiments, if the four side lines of the schematic image box 505 are all on or beyond the corresponding side lines of the lock screen 503, but the center of the schematic image box 505 still does not coincide with the center of the lock screen 503, the schematic image box 505 continues to be enlarged, continues to move to the center of the lock screen 503 until reaching the center of the lock screen 503, and then stops being enlarged. Optionally, if the center of the schematic image box 505 coincides with the center of the lock screen 503, and at least one side line of the schematic image box 505 is within a frame of the lock screen 503, the schematic image box 505 stops moving and continues to be enlarged until all side lines are on or beyond the corresponding side lines of the lock screen 503.

For example, in this embodiment of this application, if the four side lines of the field of view box 504 are all on or beyond the corresponding side lines of the lock screen 503, the field of view box 504 stops moving and stops being enlarged. If the center of the field of view box 504 coincides with the center of the lock screen 503, and at least one side line of the field of view box 504 is within the lock screen 503, the center of the field of view box 504 remains unchanged and the field of view box 504 continues to be enlarged. For example, still referring to (3) of FIG. 5b, the schematic image box 505 stops being enlarged and stops moving, the center of the field of view box 504 coincides with the center of the lock screen 503, and left and right side lines of the field of view box 504 are respectively on left and right side lines of the lock screen 503, but upper and lower side lines of the field of view box 504 are still respectively within the frame of the lock screen 503. In other words, a part between the upper side line of the field of view box 504 and an upper side line of the lock screen 505 and a part between the lower side line of the field of view box 504 and a lower side line of the lock screen 505 are still black. Correspondingly, the field of view box 504 still needs to be enlarged until all the four side lines are on or beyond the corresponding side lines of the lock screen 503. Referring to (1) of FIG. 5c, for example, the center of the field of view box 504 remains unchanged and the field of view box 504 continues to be enlarged. The image in the schematic image box 505 still changes according to an order of the image frames, and the position and size of the schematic image box 505 remain unchanged. For example, referring to (2) of FIG. 5c, when the upper side line of the field of view box 504 is on the upper side line of the lock screen 503, the lower side line of the field of view box 504 is on the lower side line of the lock screen 503, and the left and right side lines of the field of view box 504 are respectively beyond the left and right side lines of the lock screen 503, the field of view box 504 stops being enlarged. In this case, an overlapping part between the field of view box 504 and the image in the schematic image box 505 is displayed on the lock screen 503, that is, the full image in the schematic image box 505.

Figure 5C:
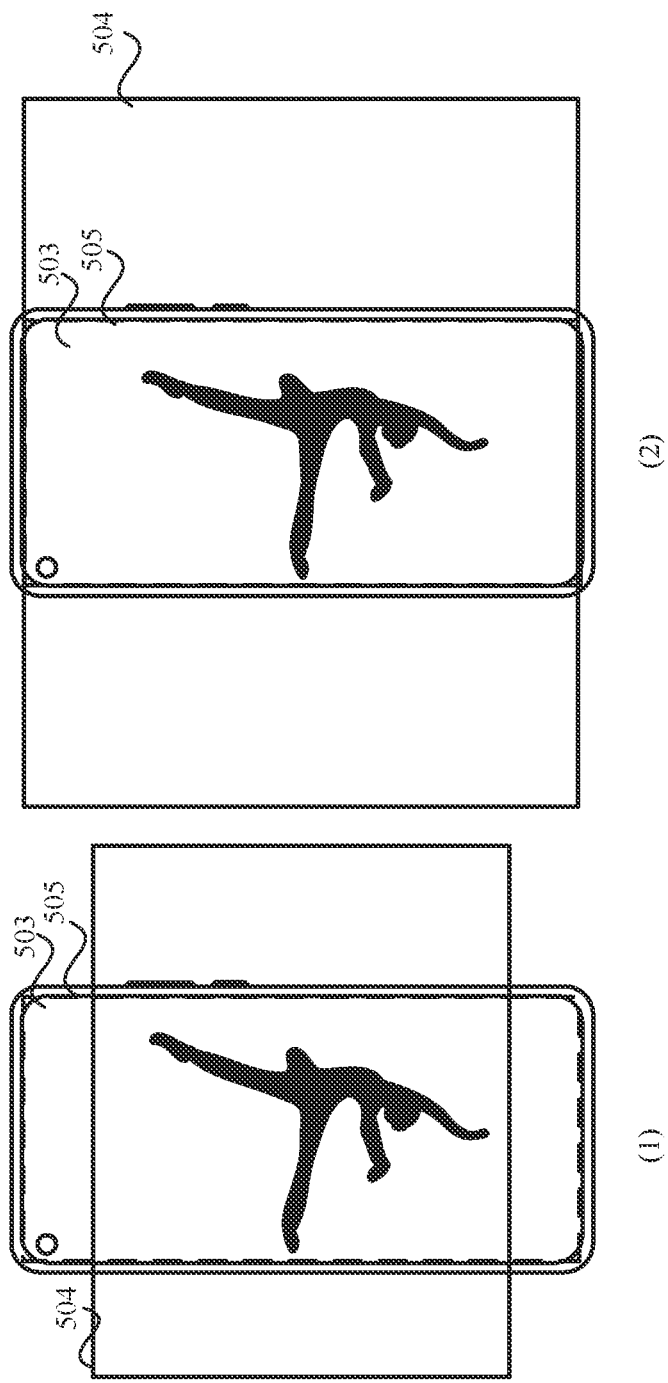
Figure 5D:
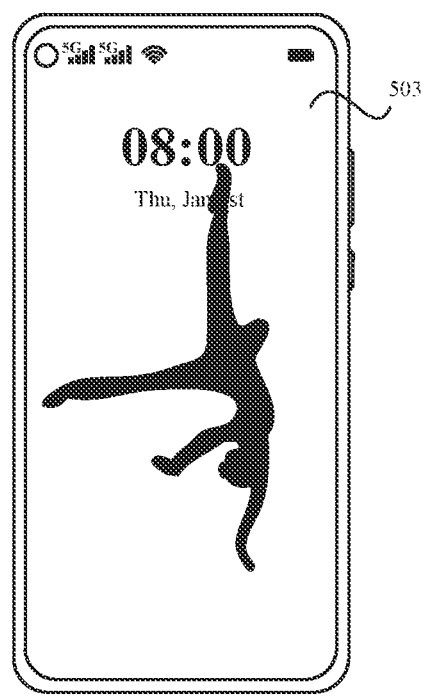

Referring to FIG. 5d, for example, after the field of view box 504 stops being enlarged, one or more other controls may be displayed on the lock screen 503, such as a time control, a network control, and a battery control. It should be noted that, if the image displayed on the lock screen 503 in FIG. 5d is a key frame in the lock screen mode (for example, the image frame 306 in FIG. 3d), this image frame is frozen as a picture displayed on the lock screen 503. For example, if the image displayed on the lock screen 503 in FIG. 5d is a frame before the key frame in the lock screen mode, all subsequent image frames continue to be played on the lock screen 503 until the key frame in the lock screen mode is played.

Figure 6A:
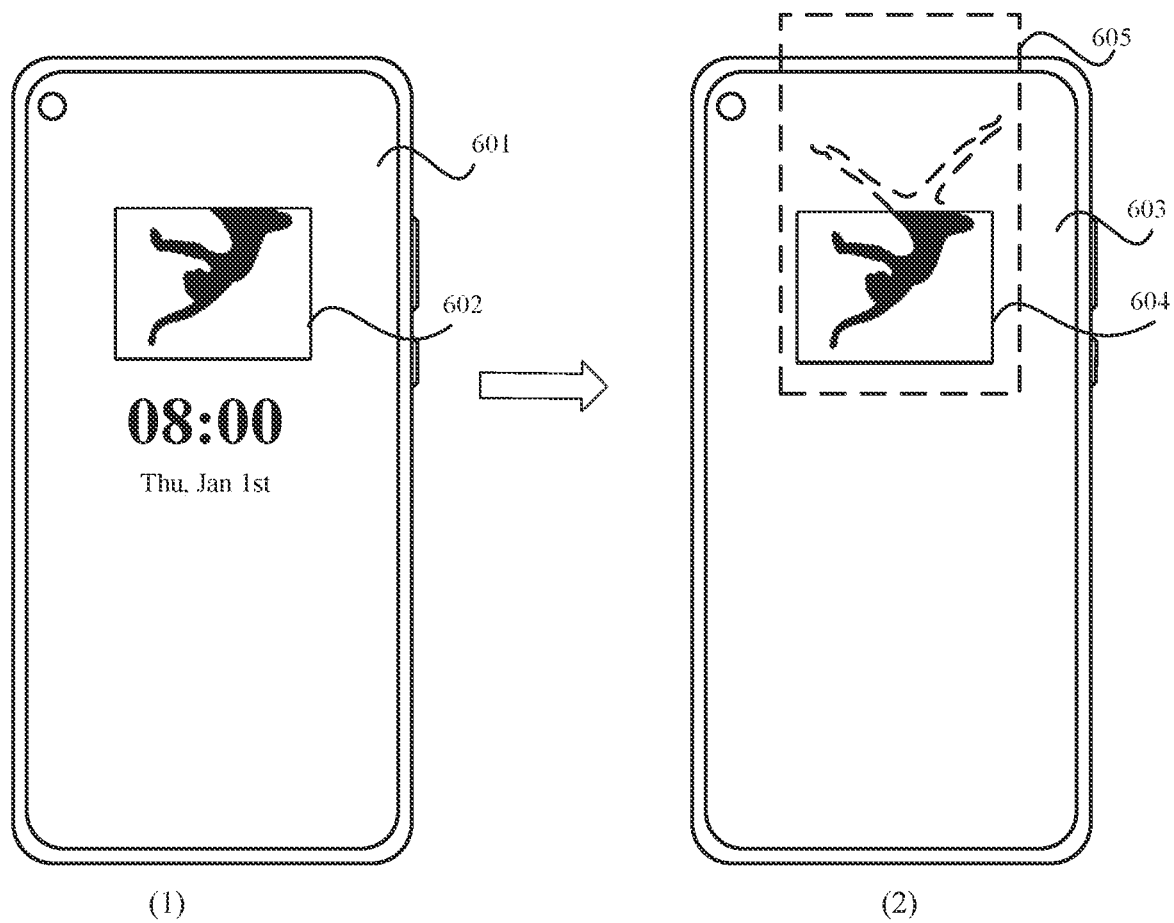
FIG. 6a to FIG. 6d illustrate a display mode of a transition animation from a screen off mode to a lock screen mode.
Figure 6B:
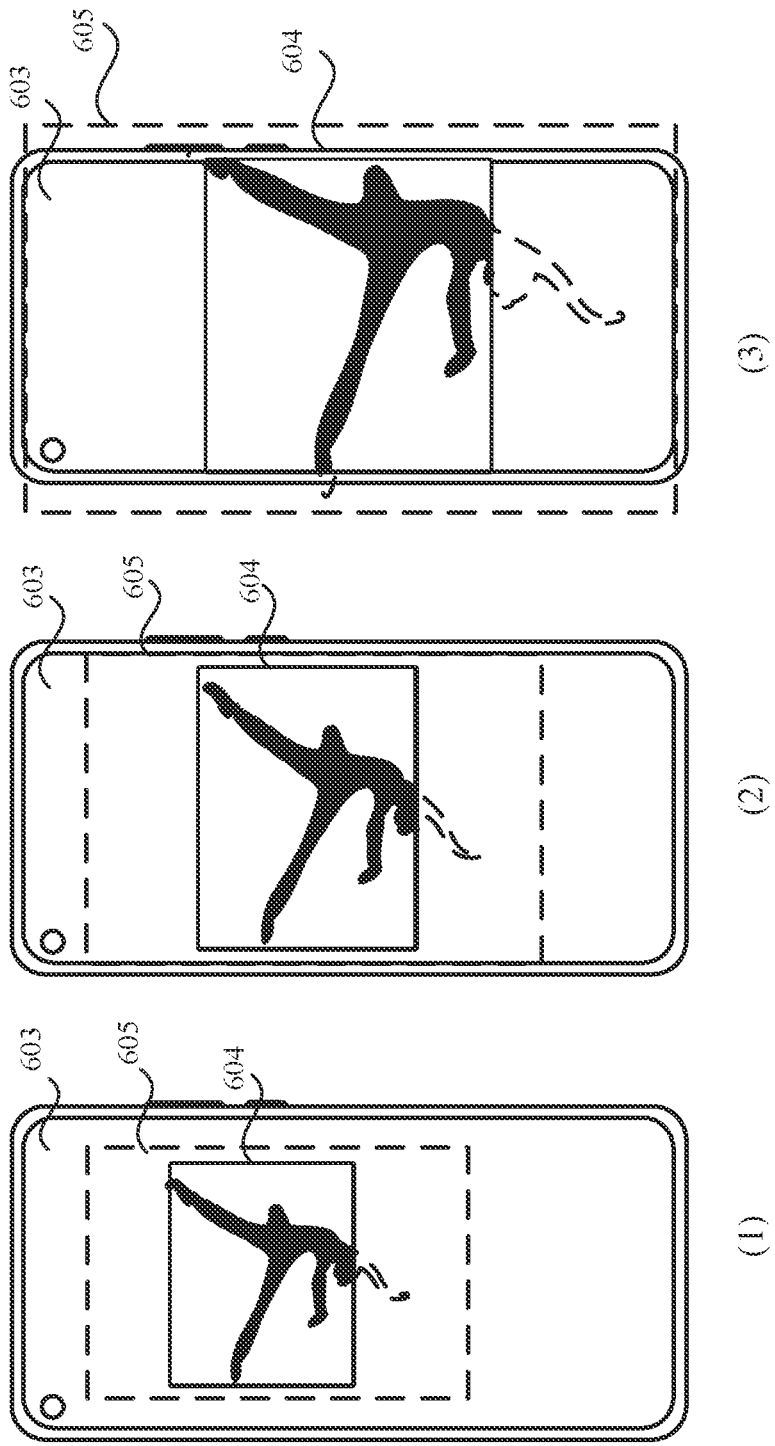
Figure 6C:
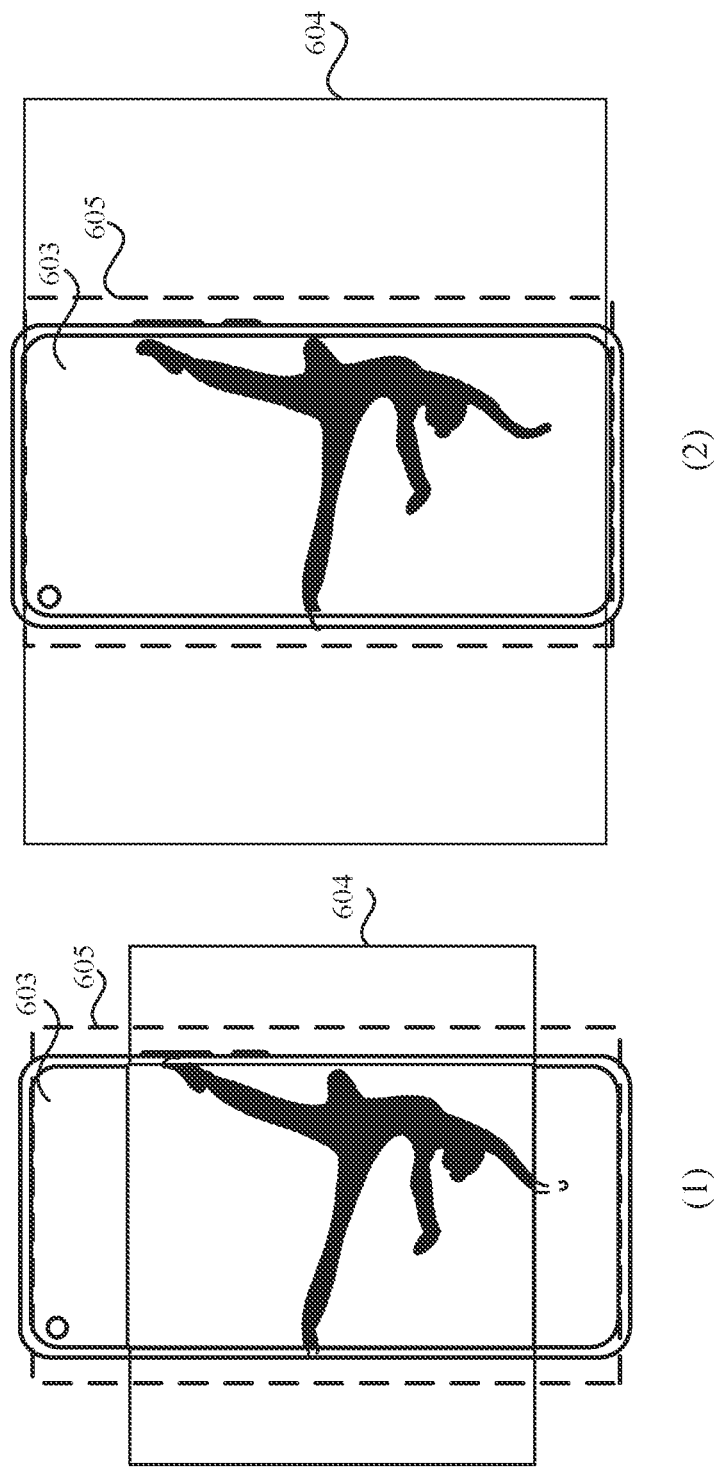

In the display mode of the transition animation shown in FIG. 5a to FIG. 5c, an aspect ratio of an original image frame is the same as that of the lock screen. In other words, when the center of the schematic image box 505 coincides with the center of the lock screen 503, the four side lines of the schematic image box 505 (that is, the original image frame) are exactly on the corresponding side lines of the lock screen 503. With reference to FIG. 6a to FIG. 6c, the following describes a display mode of a transition animation when an aspect ratio of an original image frame is different from that of a lock screen. Referring to FIG. 6a, for example, for a screen off screen 601 shown in (1) of FIG. 6a, refer to the related descriptions in (1) of FIG. 5a. Details are not described herein again. For example, a mobile phone enters a lock screen mode in response to a received user operation. A lock screen is shown in (2) of FIG. 6a. The lock screen 603 includes a field of view box 604 and a schematic image box 605. For specific descriptions, refer to (2) of FIG. 5a. Details are not described herein again. It should be noted that an aspect ratio of an image in the schematic image box 605 is different from that of the image in the schematic image box 505.

For example, similar to (1) of FIG. 5b, (1) of FIG. 6b illustratively shows enlarging and moving manners of the schematic image box 605 and the field of view box 604. For specific descriptions, refer to (1) of FIG. 5b. Details are not described herein again.

Referring to (2) of FIG. 6b, for example, in the process of enlarging and moving the schematic image box 605 and the field of view box 604, in this embodiment, left and right side lines of the schematic image box 605 are respectively on left and right side lines of the lock screen 603, while upper and lower side lines of the schematic image box 605 are still respectively within upper and lower side lines of a view screen 603. Then, the schematic image box 605 continues to move to a center and is still enlarged in proportion. The field of view box 604 is still enlarged and moves in its own way, which does not interfere with enlarging and moving of the schematic image box 605.

Referring to (3) of FIG. 6b, for example, when a center of the schematic image box 605 coincides with a center of the lock screen 603, the upper and lower side lines of the schematic image box 605 are respectively on the upper and lower side lines of the lock screen 603, and the left and right side lines of the schematic image box 605 are respectively beyond the left and right side lines of the lock screen 603. Correspondingly, as shown in (3) of FIG. 6*b*, part of the image in the schematic image box 605 (for example, part of the left foot and part of the right foot of a dancing girl) are outside the lock screen 603. These parts are not displayed on the lock screen 603. For descriptions of the field of view box 604, refer to (3) of FIG. 5*b*. Details are not described herein again.

Referring to (1) of FIG. 6*c*, for example, in a case that the schematic image box 605 is no longer moving or resized, the center of the field of view box 604 remains unchanged and the field of view box 604 continues to be enlarged. It should be noted that, as shown in (1) of FIG. 6*c*, the left and right side lines of the field of view box 604 are respectively beyond the left and right side lines of the lock screen 603, but a picture displayed on the lock screen 603 is only a part that is on the lock screen 603 and that is in an overlapping part between the field of view box 603 and the image in the schematic image box 605. In other words, even if being within the field of view box 604, part of the right foot and part of the left foot of the dancing girl are not displayed on the lock screen 603.

Referring to (2) of FIG. 6*c*, for example, when the left and right side lines of the field of view box 604 are respectively beyond the left and right side lines of the lock screen 603, the upper and lower side lines of the field of view box 604 are respectively on the upper and lower side lines of the lock screen 603, the field of view box 603 stops being enlarged. In this case, the part that is on the lock screen 603 and that is in the overlapping part between the field of view box 604 and the image in the schematic image box 605 is displayed on the lock screen 603. It should be noted that, as described above, in the process of moving and enlarging the schematic image box 605, the image in the schematic image box 605 changes with image frames in a video segment. Therefore, because the dancing girl is flipping downward, part of the left foot of the dancing girl is outside the lock screen 603, and the right foot of the dancing girl is within the lock screen 603, as shown in (2) of FIG. 6*c*.

Figure 6D:
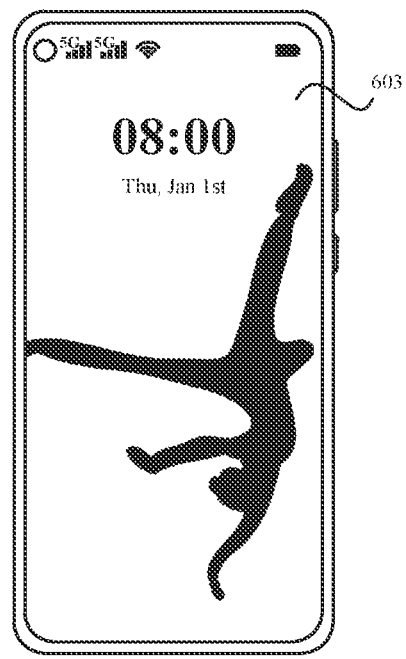

Referring to FIG. 6*d*, for example, the image frames in the video segment 301 may continue to be played on the lock screen 603 until a key frame in the lock screen mode is played. One or more other controls are also displayed on the lock screen 603. For specific descriptions, refer to FIG. 5*d*. Details are not described herein again. It should be noted that, because the aspect ratio of the image frame is different from that of the lock screen, the image frames played on the lock screen 603 may always have some pictures outside the lock screen 603.

Figure 7A:
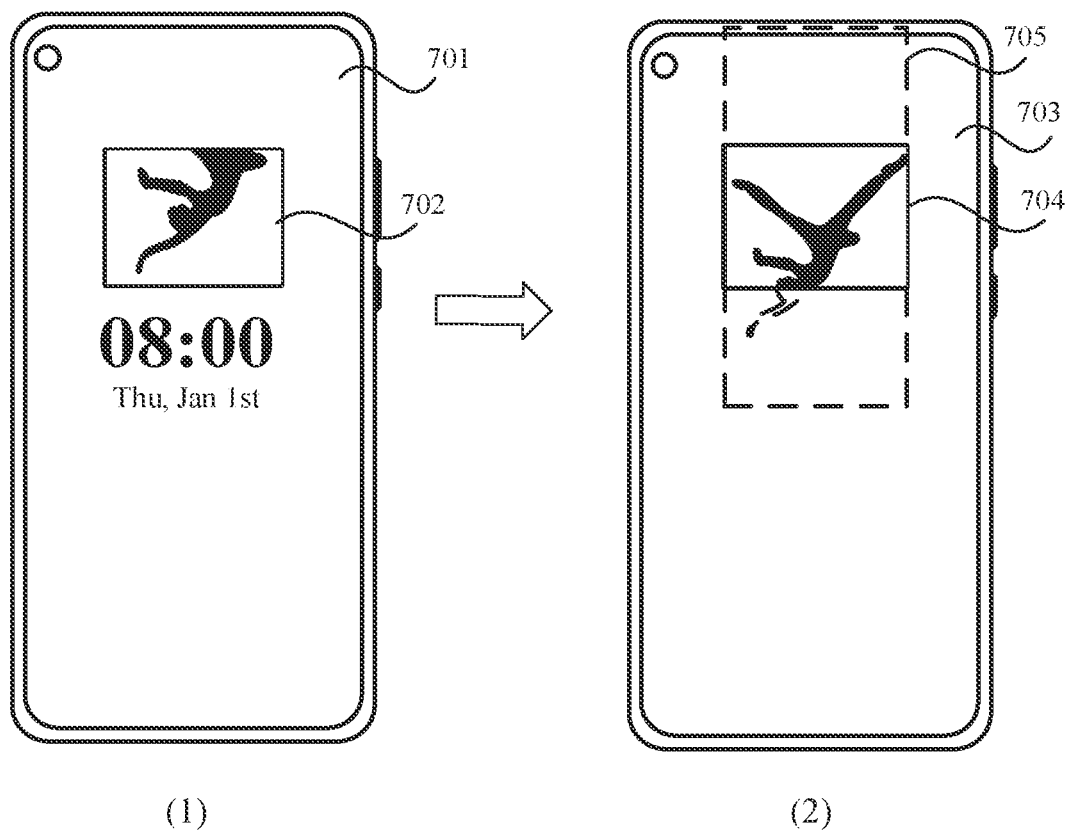
FIG. 7a and FIG. 7b illustrate a display mode of a transition animation from a screen off mode to a lock screen mode.
Figure 7B:
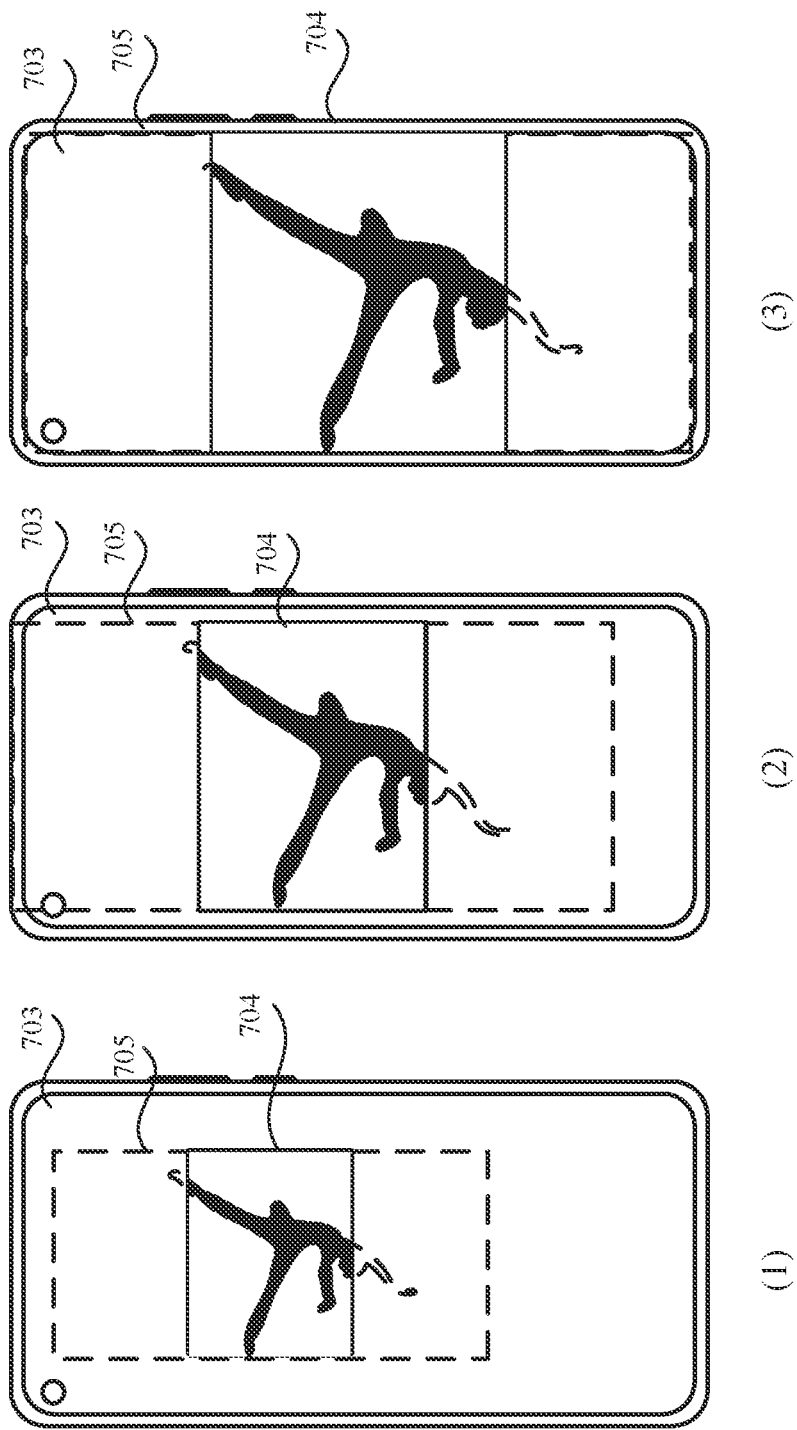

FIG. 7*a* and FIG. 7*b* illustrate another display mode of a transition animation from a screen off mode to a lock screen mode. Referring to (1) of FIG. 7*a*, a screen off screen 701 includes a transition animation display box 702 and other controls. For specific descriptions, refer to the descriptions in FIG. 5*a*. Details are not described herein again. Referring to (2) of FIG. 7*a*, for example, different from (2) of FIG. 5*a*, in (2) of FIG. 7*a*, a center of a schematic image box 705, a center of a field of view box 704, and a center of a lock screen 703 are on a same vertical line. Optionally, the center of the schematic image box 705 may coincide with the center of the field of view box 704. In other words, in the process of enlarging and moving, the schematic image box 705 and the field of view box 704 can move vertically to the center of the lock screen 703 simultaneously. For example, because a position of the schematic image box 705 in (2) of FIG. 7*a* is different from that of the schematic image box 505 in (2) of FIG. 5*a*, an image displayed in the field of view box 704 is also different from that displayed in the field of view box 504. As shown in (2) of FIG. 7*a*, the field of view box 704 is located in the middle of the schematic image box 705, and an image displayed in the field of view box 704 is an overlapping part between the field of view box 704 and an image in the schematic image box 705, for example, the lower body of a dancing girl.

For example, while being enlarged, the schematic image box 705 and the field of view box 704 move vertically to the center of the lock screen 703, as shown in (1) of FIG. 7*b*. Referring to (1) of FIG. 7*b*, for example, the schematic image box 705 and the field of view box 704 simultaneously move downward, and are proportionally enlarged. The overlapping part between the field of view box 704 and the image in the schematic image box 705 is displayed in the field of view box 704. For other descriptions and specific descriptions in (2) of FIG. 7*b*, refer to the related descriptions of FIG. 5*b*. Details are not described herein again. For example, referring to (3) of FIG. 7*b*, which is the same as (3) of FIG. 5*b*, four side lines of the schematic image box 705 are on the lock screen 703, and the position and size of the schematic image box 705 remain unchanged. For example, the left and right side lines of the field of view box 704 are on the lock screen 703, while the upper and lower side lines are still within the lock screen 703. Correspondingly, the field of view box 704 can continue to be enlarged. For details, refer to the related content in (3) of FIG. 5*b*. Details are not described herein again.

Figure 8A:
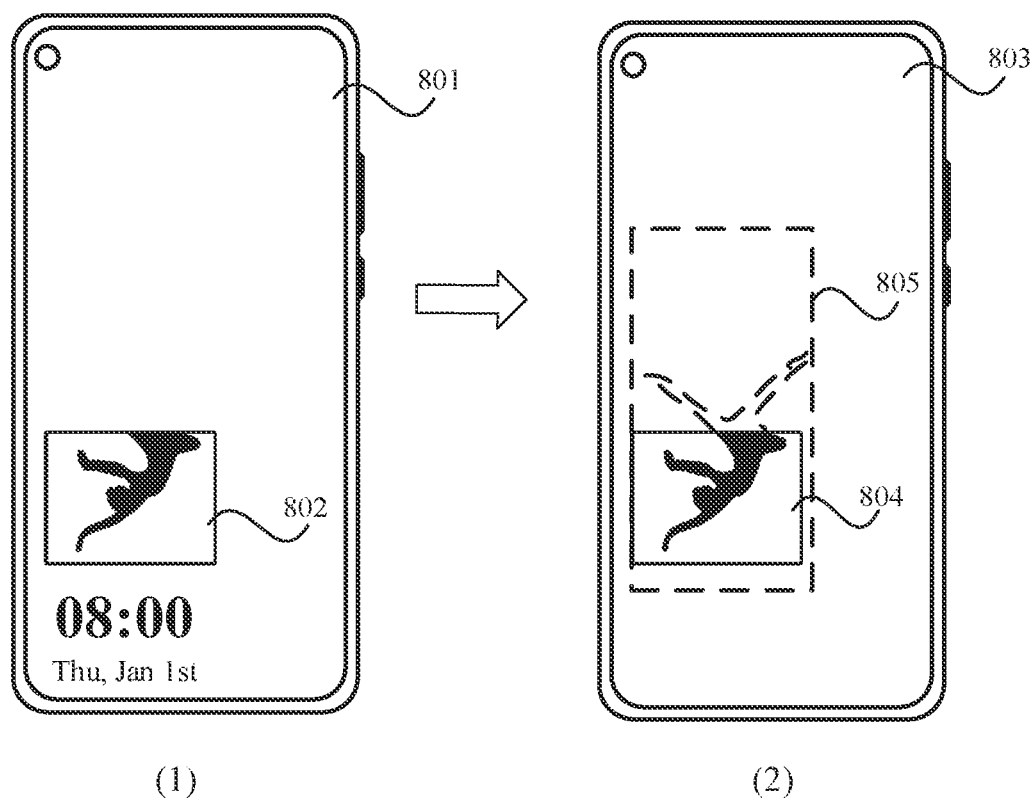
FIG. 8a and FIG. 8b illustrate a display mode of a transition animation from a screen off mode to a lock screen mode.
Figure 8B:
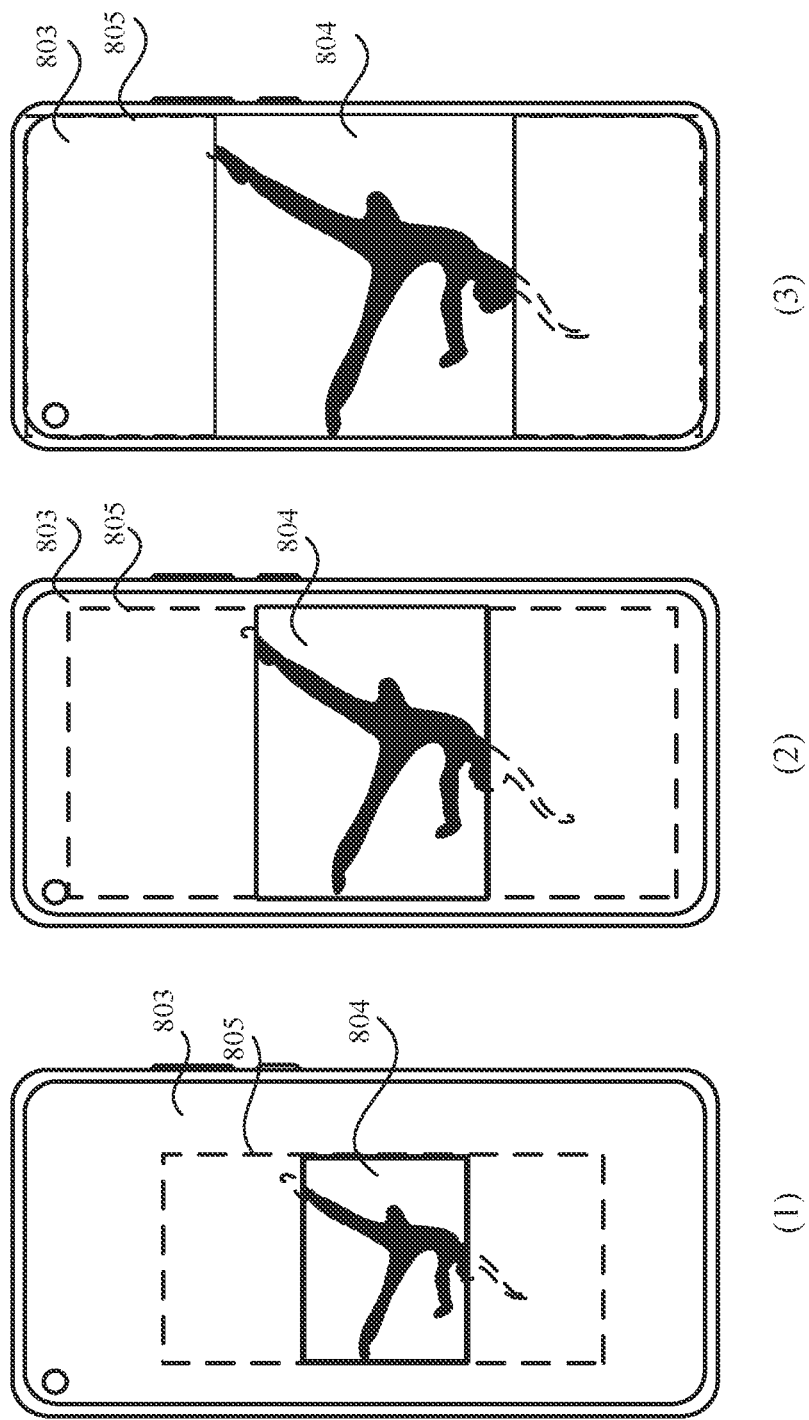

FIG. 8*a* and FIG. 8*b* illustrate another display mode of a transition animation from a screen off mode to a lock screen mode. Referring to (1) of FIG. 8*a*, for example, a screen off screen 801 includes a transition animation display box 802 and other controls (for example, a time control). In this embodiment of this application, when a mobile phone is in the screen off mode, for example, the transition animation display box 802 and the time control may be displayed at a designated position on the screen off screen 801 and remain unchanged. The designated position may be any position on a lock screen 801, for example, a position shown in (1) of FIG. 5*a* or a position shown in (1) of FIG. 8*a*. For another example, the transition animation display box 802 and the time control may be displayed altogether at different positions on the screen off screen 801 sequentially. For example, at a current moment, the position of the transition animation display box 802 and the time control may be as shown in (1) of FIG. 5*a*, and at a next moment, the position of the transition animation display box 802 and the time control may be as shown in (1) of FIG. 8*a*. This is not limited in this application.

Still referring to (1) of FIG. 8*a*, for example, in this embodiment of this application, that the position of the transition animation display box 802 and the time control is in the lower left of the screen off screen 801 is used as an example for description. In a case that the transition animation display box 802 and the time control are on the screen off screen 801, for displaying of a transition animation in the lock screen mode, refer to FIG. 8*a* and FIG. 8*b*. Details are not described in this application.

For example, the mobile phone enters the lock screen mode in response to a received user operation (for example, pressing a power on/off button). Referring to (2) of FIG. 8*a*, for example, a lock screen 803 includes a field of view box 804 and a schematic image box 805. For example, a size and a position of the field of view box 804 on the lock screen 803 are the same as those of the transition animation display box

802 on the screen off screen 801. Correspondingly, the schematic image box 805 may be displayed at a corresponding position on the lock screen 803 based on a currently displayed position of the field of view box 804, so that an overlapping part between the field of view box 804 and an image in the schematic image box 805 is the same as the image displayed in the transition animation display box 802. For other descriptions, refer to the related content in (2) of FIG. 5a. Details are not described herein again.

For example, the schematic image box 804 is gradually enlarged, and moves from the lower left corner of the lock screen 803 to a center of the lock screen 803. At the same time, the field of view box 804 is gradually enlarged, and moves from the lower left corner of the lock screen 803 to the center of the lock screen 803. Referring to (1) of FIG. 8b, the schematic image box 804 and the field of view box 804 are enlarged and move to positions shown in (1) of FIG. 8b. An overlapping part between the field of view box 804 and the image in the schematic image box 805 is displayed in the field of view box 804. For example, the schematic image box 805 and the field of view box 804 continue to be enlarged, and move to the center of the lock screen 803, as shown in (2) of FIG. 8b and (3) of FIG. 8b. For content not described, refer to FIG. 5b to FIG. 5d. Details are not described herein again.

Figure 9A:
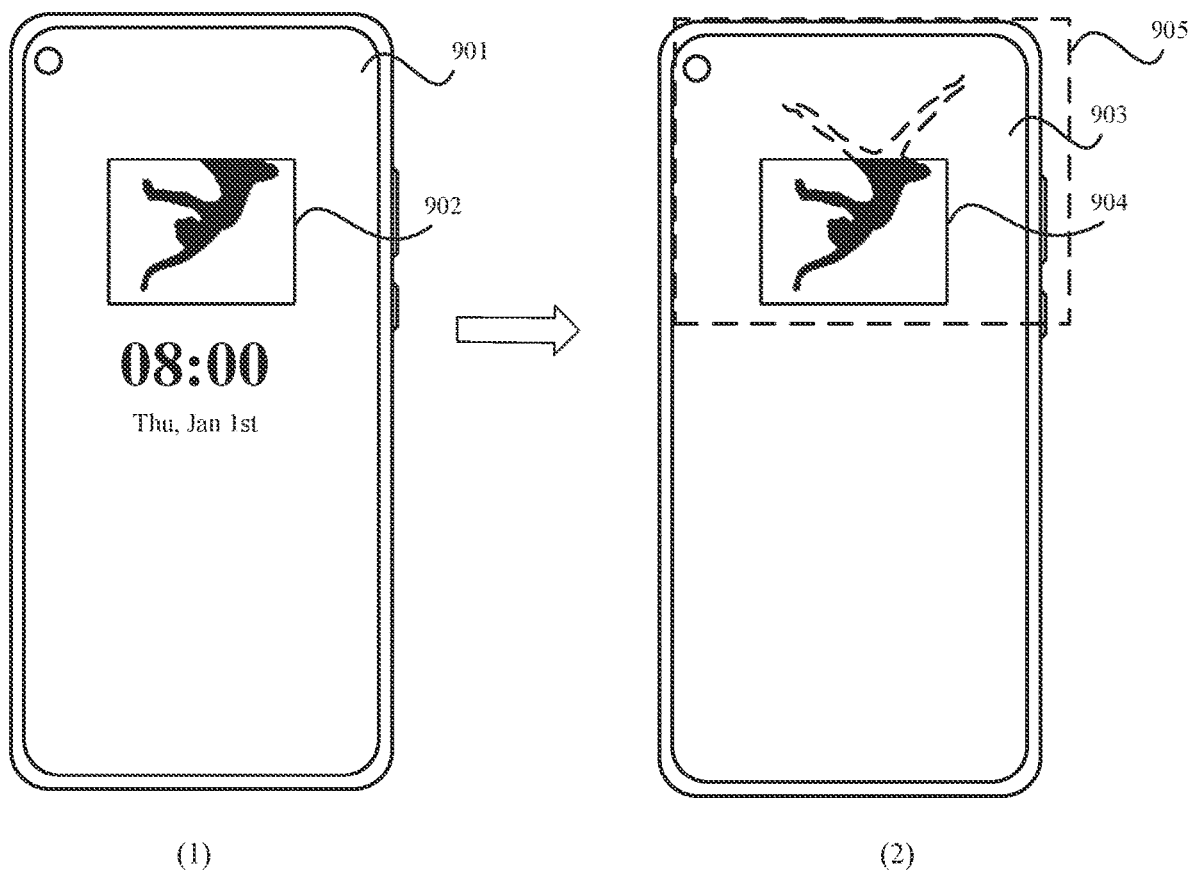
FIG. 9a to FIG. 9c illustrate a display mode of a transition animation from a screen off mode to a lock screen mode.
Figure 9B:
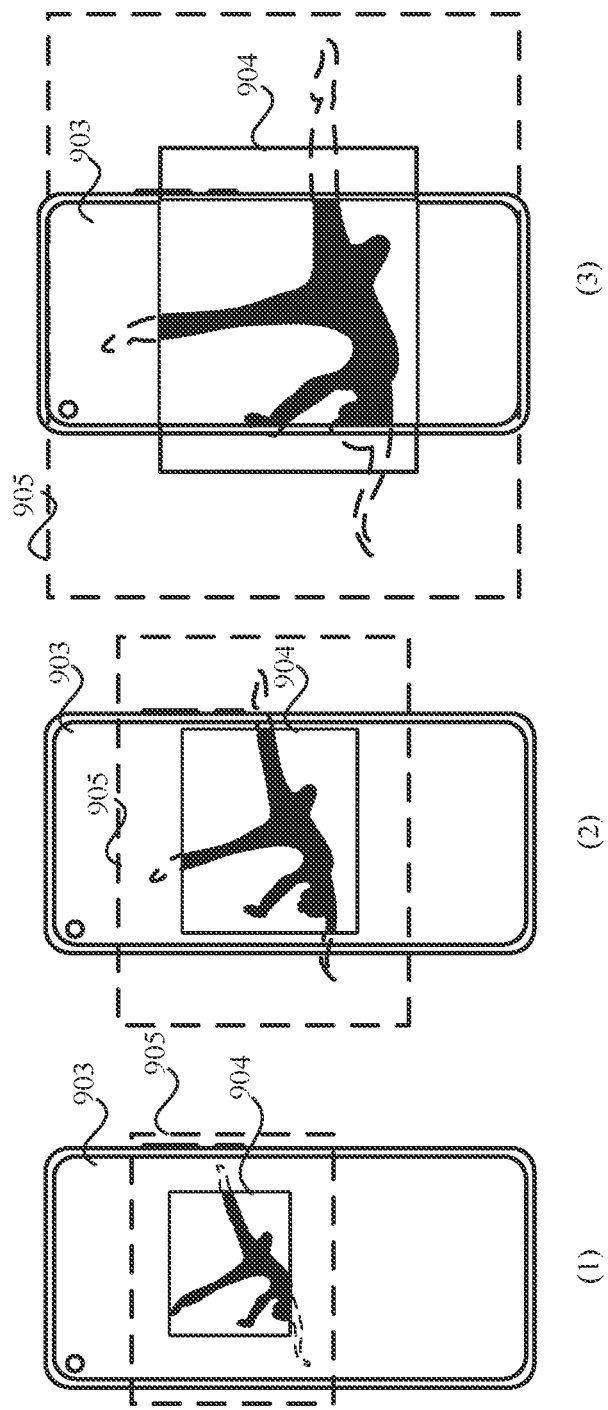
Figure 9C:
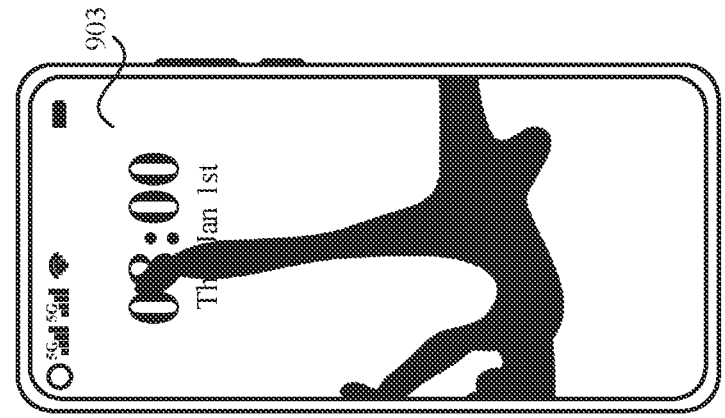
Figure 9C:
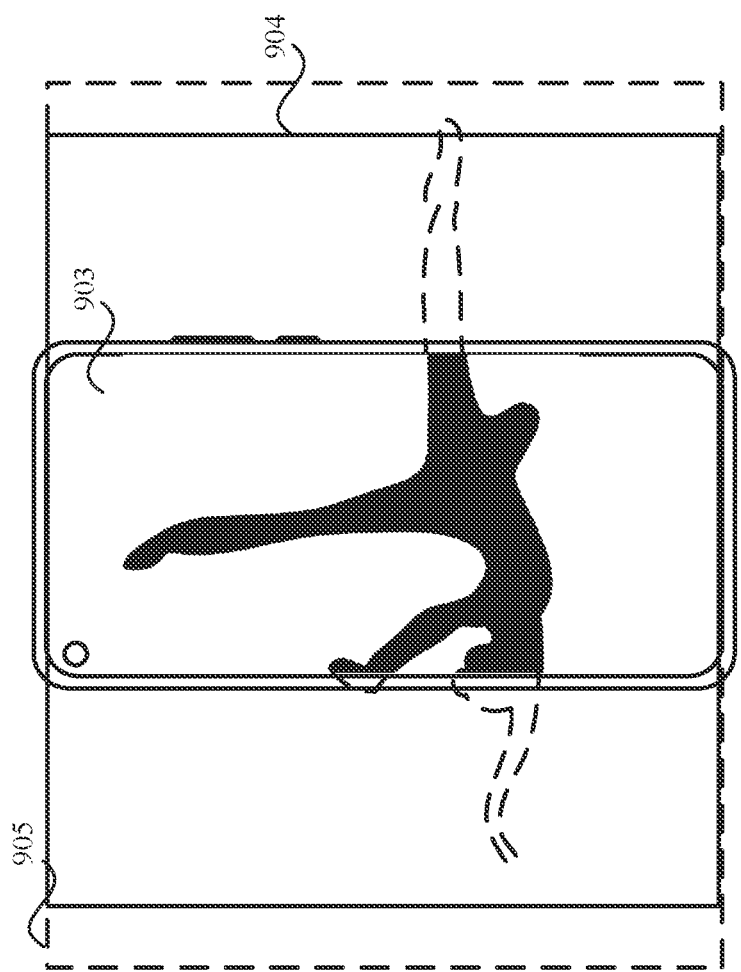

FIG. 9a to FIG. 9c illustrate still another display mode of a transition animation from a screen off mode to a lock screen mode. For example, referring to (1) of FIG. 9a, a screen off screen 901 includes a transition animation display box 902, a time control, and the like. For other descriptions, refer to (1) of FIG. 5a. Details are not described herein again.

For example, a mobile phone enters the lock screen mode in response to a received user operation. Referring to (2) of FIG. 9a, a lock screen 903 includes, but is not limited to, a field of view box 904 and a schematic image box 905. For descriptions of the field of view box 904, refer to the related descriptions in FIG. 5a. Details are not described herein again. For example, in this embodiment, image frames in a video segment are all landscape images. For example, an aspect ratio of the landscape image may be 16:9. This ratio is only an example, and is not limited in this application.

For example, similar to (2) of FIG. 5a, an image m the schematic image box 905 is obtained by zooming out an original landscape image frame in a preset proportion (for example, 50%). For the specific implementation, refer to the foregoing description. Details are not described herein again. For example, the schematic image box 905 is displayed at a corresponding position on the lock screen 903 based on a position of the field of view box 904, so that an image displayed in the field of view box 904 is the same as that in the transition animation display box 902.

For example, the schematic image box 904 is gradually enlarged, and the schematic image box 904 gradually moves to a center of the lock screen 903. At the same time, the field of view box 904 is gradually enlarged, and the field of view box 904 gradually moves to the center of the lock screen 903.

Referring to (1) of FIG. 9b, the schematic image box 904 and the field of view box 904 are enlarged and move to positions shown in (1) of FIG. 9b. An overlapping part between the field of view box 904 and the image in the schematic image box 905 is displayed in the field of view box 904. For example, the schematic image box 905 and the field of view box 904 continue to be enlarged and move to the center of the lock screen 903, as shown in (2) of FIG. 8b.

For content not described, refer to the related descriptions in (2) of FIG. 5b. Details are not described herein again.

Referring to (3) of FIG. 9b, for example, in the enlarging and moving process of the schematic image box 904, because an aspect ratio of the schematic image box 904 is 16:9, when upper and lower side lines of the schematic image box 904 are respectively on upper and lower side lines of the lock screen 903, left and right side lines of the schematic image box 904 are already outside the lock screen 903. Correspondingly, part of the image in the schematic image box 904 is outside the lock screen 903. Therefore, even if left and right side lines of the field of view box 904 have respectively exceeded corresponding side lines of the lock screen 903, an image displayed on the lock screen 903 is still a part that is of the field of view box 904 and that is within the lock screen 903. For other descriptions, refer to (3) of FIG. 5b. Details are not described herein again.

Referring to (1) of FIG. 9c, for example, a size and a position of the schematic image box 905 remain unchanged, a center point of the field of view box 904 remains unchanged, and the field of view box 904 continues to be enlarged until upper and lower side lines of the field of view box 904 respectively overlap the corresponding side lines of the lock screen 903. Referring to (2) of FIG. 9c, for example, image frames in a transition animation in the lock screen mode can continue to be played on the lock screen 903. In addition, one or more other controls are displayed on the lock screen 903, such as a time control, a network control, and a battery control. For example, because an aspect ratio of the image frame is different from that of the lock screen 903, the image displayed on the lock screen 903 is only part of the image frame.

It should be noted that, for an image frame whose aspect ratio is different from that of the lock screen, to enable an important part of the image, such as a portrait or an object, in the image frame to be fully displayed on the lock screen, the mobile phone can obtain, through image processing such as image recognition, cropping, and resizing, an image frame that has a same aspect ratio as the lock screen and that includes the important part of the image, and apply the image frame to the transition animation.

Figure 10A:
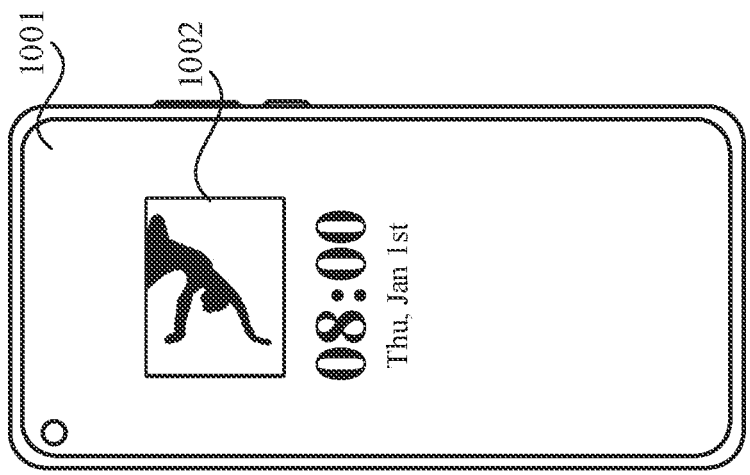
FIG. 10a and FIG. 10b illustrate a display mode of a transition animation from a screen off mode to a lock screen mode.
Figure 10A:
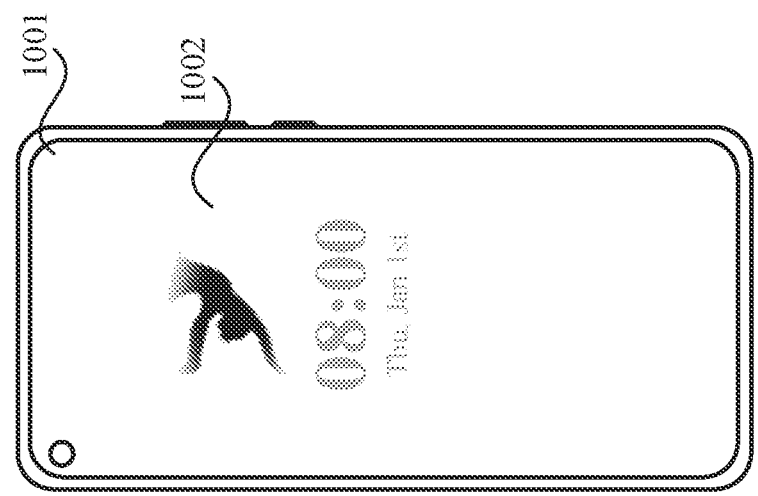
Figure 10A:
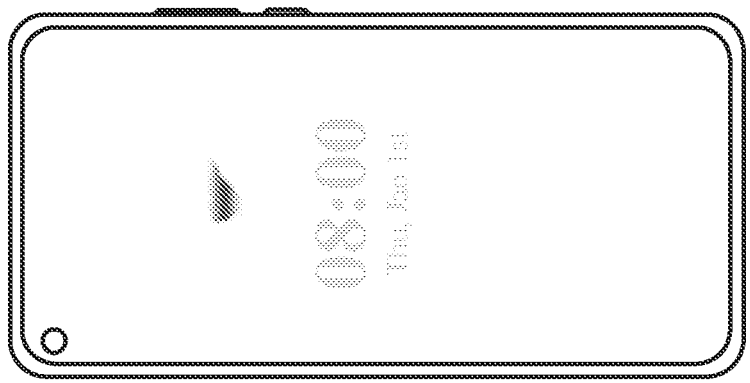
Figure 10B:
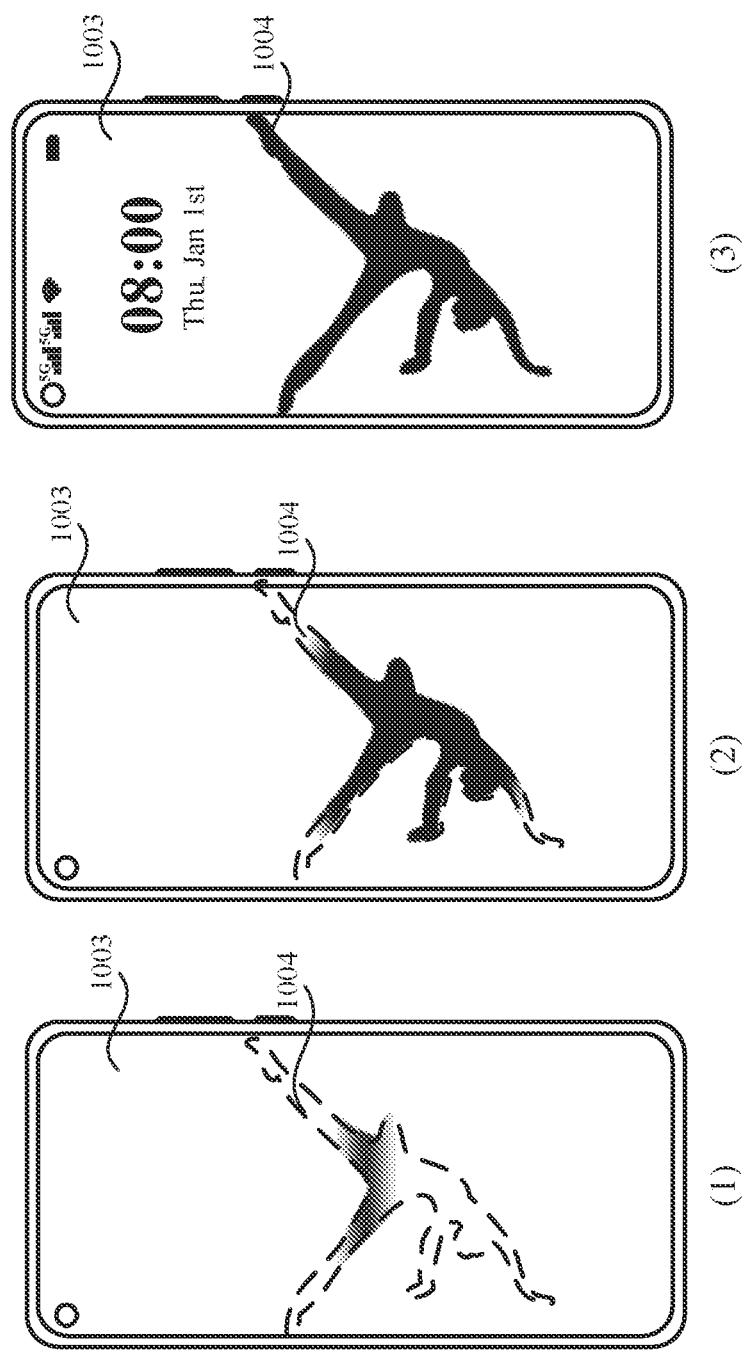

FIG. 10a to FIG. 10c illustrate still another display mode of a transition animation from a screen off mode to a lock screen mode. Referring to (1) of FIG. 10a, for example, a screen off screen 1001 includes a transition animation display box 1002, a time control, and the like. A mobile phone enters the lock screen mode in response to a received user operation. Referring to (2) of FIG. 10a, for example, the display mode of the transition animation in this embodiment simulates a blinking process. A field of view box 1002 on the screen off screen 1001 can be added with a layer of oval (or other shapes, which is not limited in this application) mask with blurred edges, and the mask is longitudinally compressed until the transition animation display box 1002 disappears, as shown in (3) of FIG. 10a. At the same time, other controls (for example, the time control) on the screen off screen 1001 also gradually disappear.

Referring to (1) of FIG. 10b, for example, the mobile phone displays a lock screen 1003, and the lock screen 1003 includes a schematic image box 1004. For example, the mask described above may be unfolded from the middle of the schematic image box 1004 to gradually display an image in the schematic image box 1004. As described above, image frames in a video segment are subsequently displayed in the schematic image box 1004. It should be noted that a dotted line part is only used to describe a position of the dancing girl in the schematic image box 1004, and the part outside the mask is actually not displayed. Referring to (2) of FIG. 10b, for example, the mask continues to be unfolded to display other parts of the image in the schematic image box 1004 until the mask is unfolded to a size the same as that of the lock screen 1003, that is, all parts of the image in the schematic image box 1004 are displayed on the lock screen 1003. Referring to (3) of FIG. 10b, for example, other image frames in the transition animation are optionally played on the lock screen 1003. In addition, other controls are also displayed, such as a time control, a network control, and a battery control.

FIG. 11 to FIG. 13b illustrate display modes of a transition animation in different application scenarios. Referring to (1) of FIG. 11, for example, in this scenario, a mobile phone is in a screen off mode, a screen off screen 1101 includes a transition animation display box 1102 and other controls (for example, a time control), and image frames in a video segment are sequentially played in the transition animation display box 1102 until a key frame in the screen off mode, for example, an image frame 1103, is played. For example, a user may touch the screen off screen 1101 to trigger fingerprint unlocking. In response to the received user operation, the mobile phone unlocks the screen and directly enters a desktop mode from the screen off mode.

Figure 11:
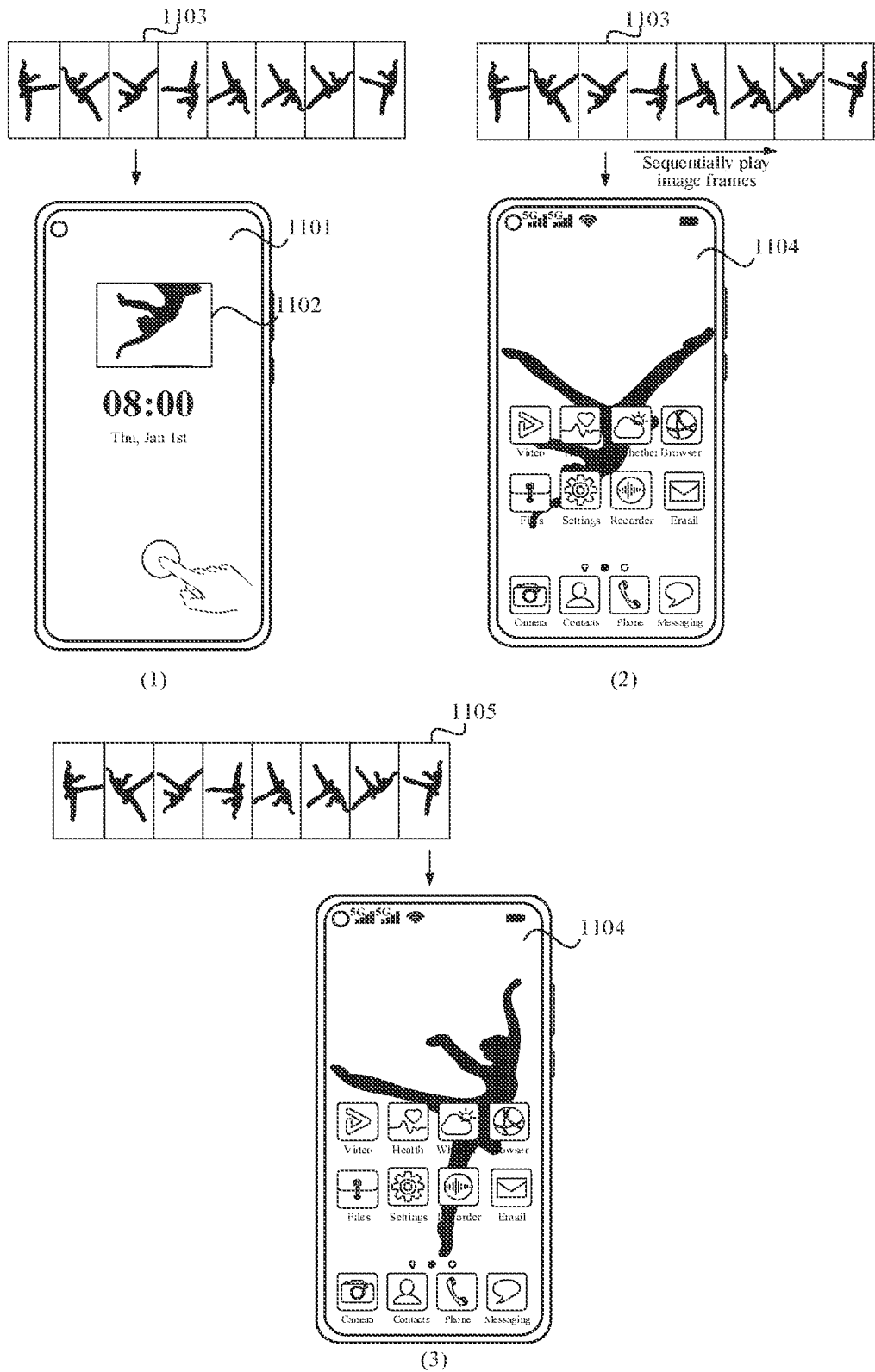
FIG. 11 illustrates display modes of a transition animation in different application scenarios.

Referring to (2) in FIG. 11, for example, the mobile phone skips a lock screen mode and directly enters the desktop mode from the screen off mode. Optionally; before the mobile phone enters the desktop mode, a screen may be blacked out first. This is the same case in the following descriptions, and details are not repeated. For example, a transition animation is displayed on a desktop 1104. Because the mobile phone skips the lock screen mode, a first image frame of the transition animation displayed on the desktop 1104 is the last frame in the screen off mode, that is, a key frame in the screen off mode (for example, the image frame 1103). For example, for a manner in which the image frame 1103 is displayed on the desktop 1104, refer to any display mode in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For example, image frames in a video segment are sequentially played on the desktop 1104 until the last frame, for example, an image frame 1105, is played. Optionally, other controls on the desktop 1104, such as an application icon control, a network control, and a battery control, may gradually appear while the transition animation is being played on the desktop 1104, or may appear when the transition animation on the desktop 1104 is frozen at the last frame (for example, the image frame 1105). This is not limited in this application.

Figure 12A:
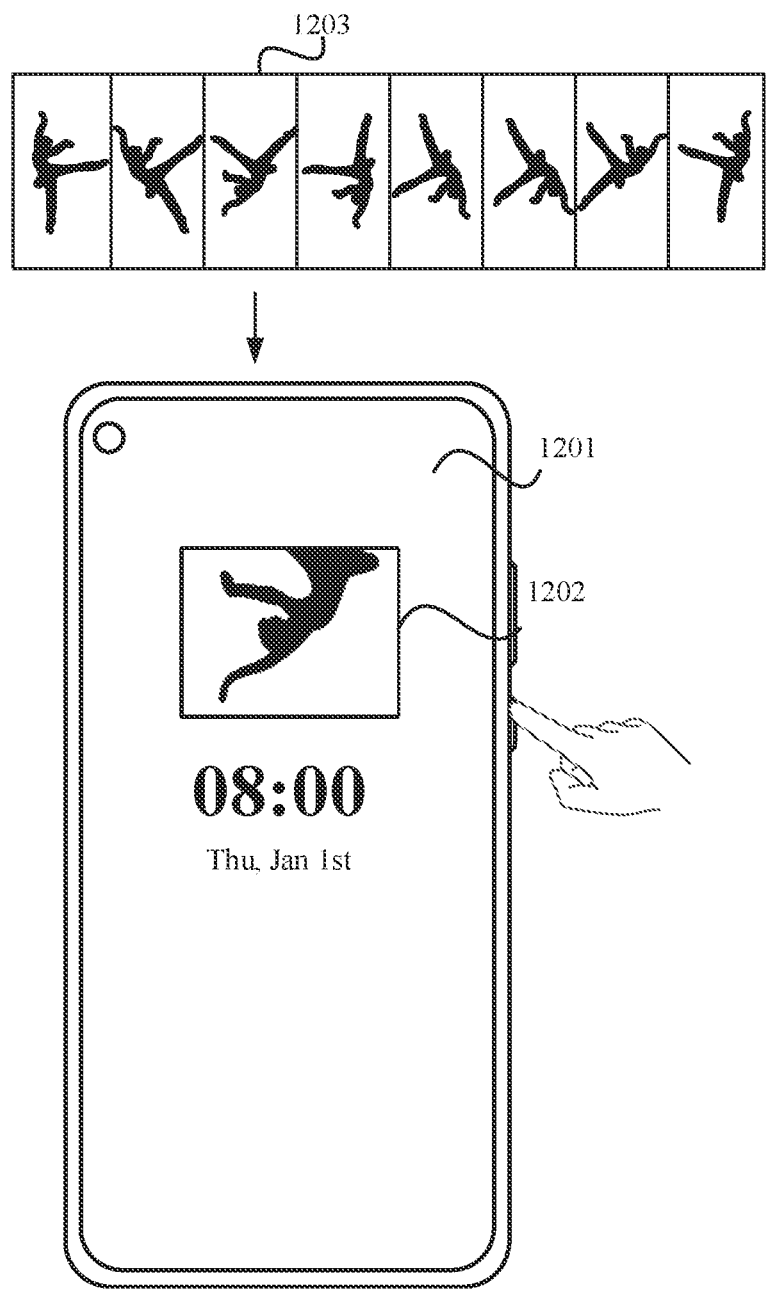
FIG. 12a to FIG. 12e illustrate a display mode of a transition animation from a screen off mode to a lock screen mode and from the lock screen mode to a desktop mode.

FIG. 12a to FIG. 12e illustrate a display mode of a transition animation from a screen off mode to a lock screen mode, and from the lock screen mode to a desktop mode. Referring to FIG. 12a, for example, a screen off screen 1201 includes a transition animation display box 1202 and other controls. For example, an image frame 1203 is frozen in the transition animation display box 1202. For specific descriptions, refer to the foregoing description. Details are not described herein again. For example, a user may press a power on/off button. A mobile phone enters the lock screen mode in response to the received user operation.

Figure 12B:
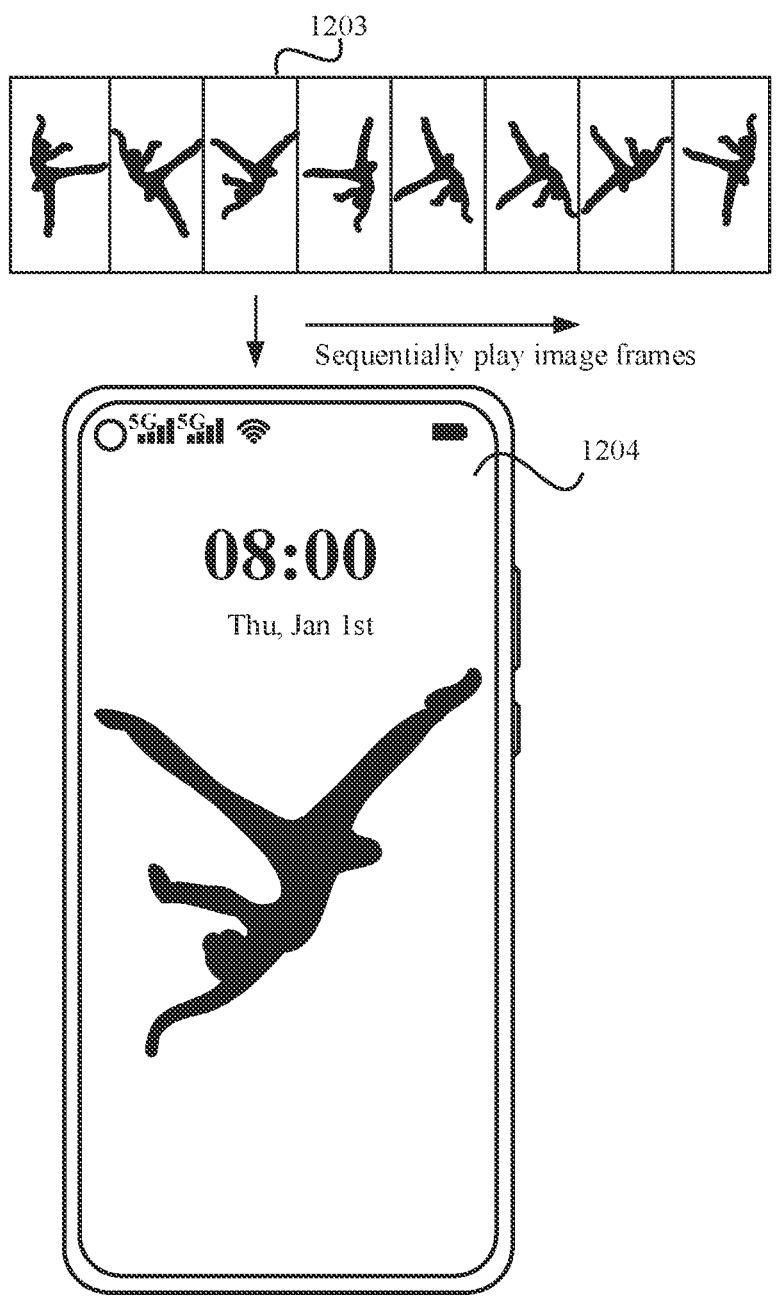
Figure 12C:
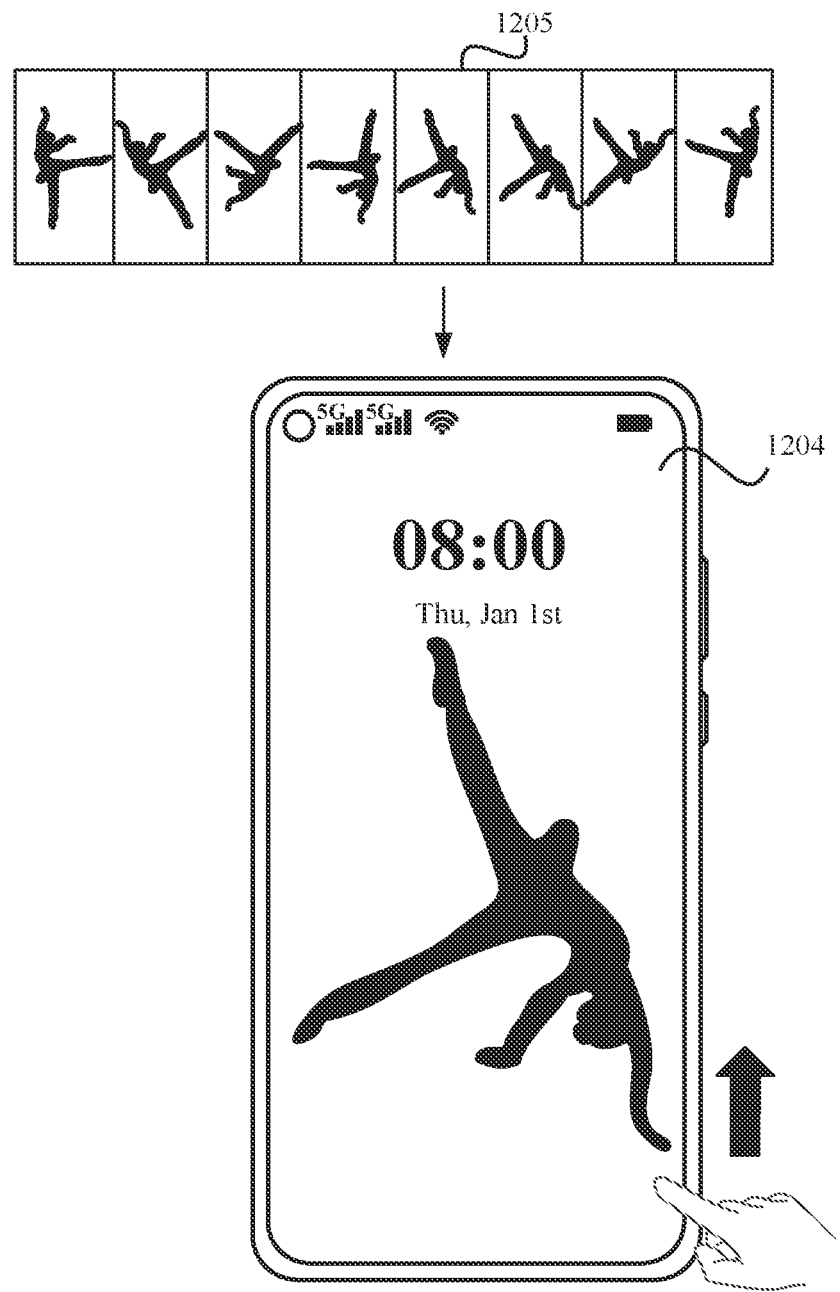
Figure 12D:
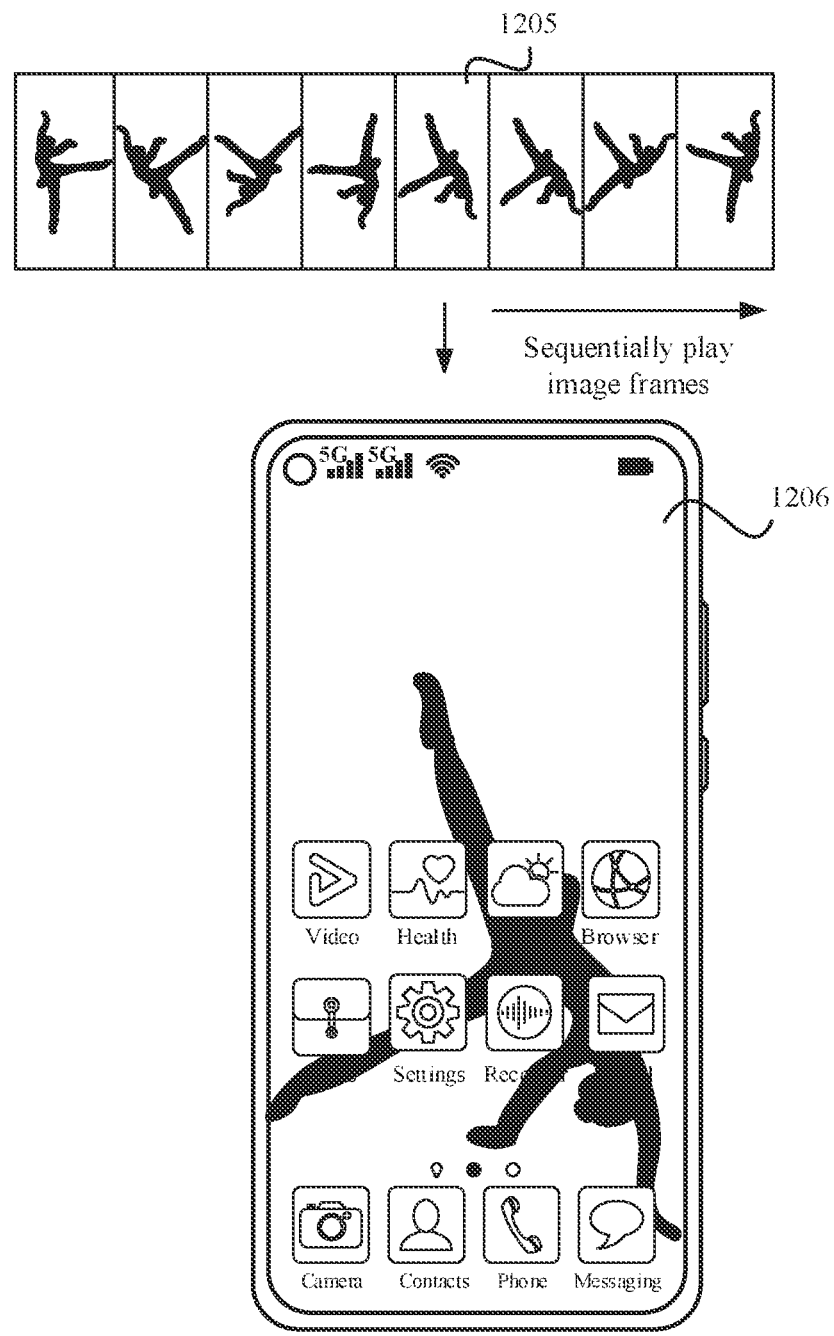
Figure 12E:
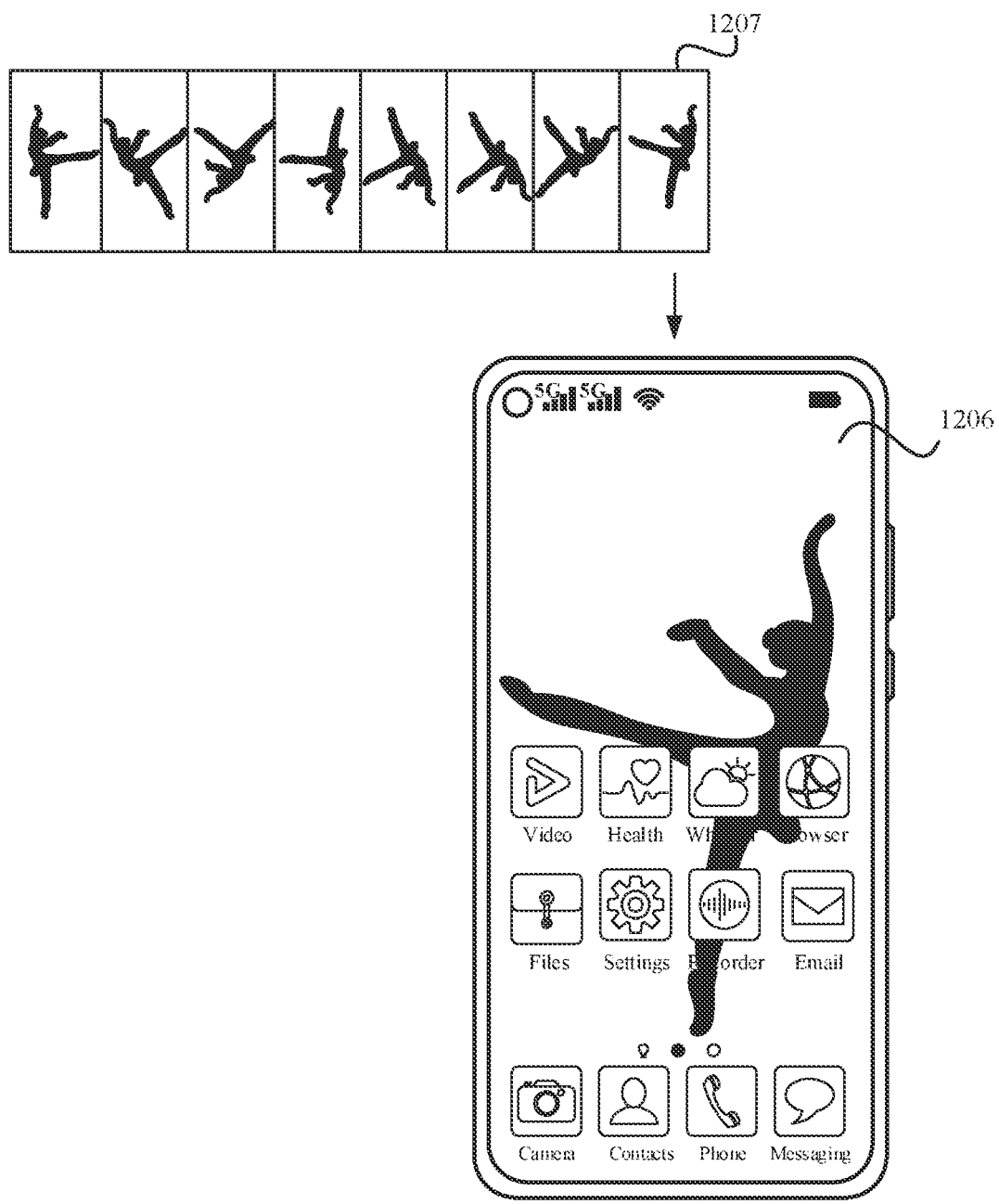

Referring to FIG. 12b, for example, the last frame in the screen off mode (for example, the image frame 1203) is displayed on a lock screen 1204. For example, for a manner in which the image frame is displayed on the lock screen 1204, refer to any display mode in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For example, image frames in a video segment are sequentially played on the lock screen 1204. Referring to FIG. 12c, for example, a key frame in the lock screen mode (for example, an image frame 1205) is played and frozen on the lock screen 1204. The user can unlock the mobile phone through sliding unlock, fingerprint unlock, face unlock, or the like. For example, the mobile phone enters the desktop mode in response to the received user operation. Referring to FIG. 12d, starting from the key frame in the lock screen mode (for example, the image frame 1105), the image frames in the video segment are sequentially played on a desktop 1206 until a key frame in the desktop mode, for example, an image frame 1107 in FIG. 12e, is played.

FIG. 13a to FIG. 13d illustrate a display mode of a transition animation from a screen off mode to a lock screen mode, and from the lock screen mode to a desktop mode. Referring to (1) of FIG. 13a, a screen off screen 1301 includes a transition animation display box 1302 and other controls. A key frame in the screen off mode, for example, an image frame 1303, is displayed in the transition animation display box 1302. For content not described, refer to the foregoing description. Details are not described herein again.

For example, a user presses a power on/off button. A mobile phone enters the lock screen mode in response to the received user operation. Referring to (2) of FIG. 13a, the last frame in the screen off mode (for example, the image frame 1303) is displayed on a lock screen 1304. For example, for a manner in which the image frame is displayed on the lock screen 1304, refer to any display mode in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For example, image frames in a video segment are sequentially played on the lock screen 1304.

Figure 13A:
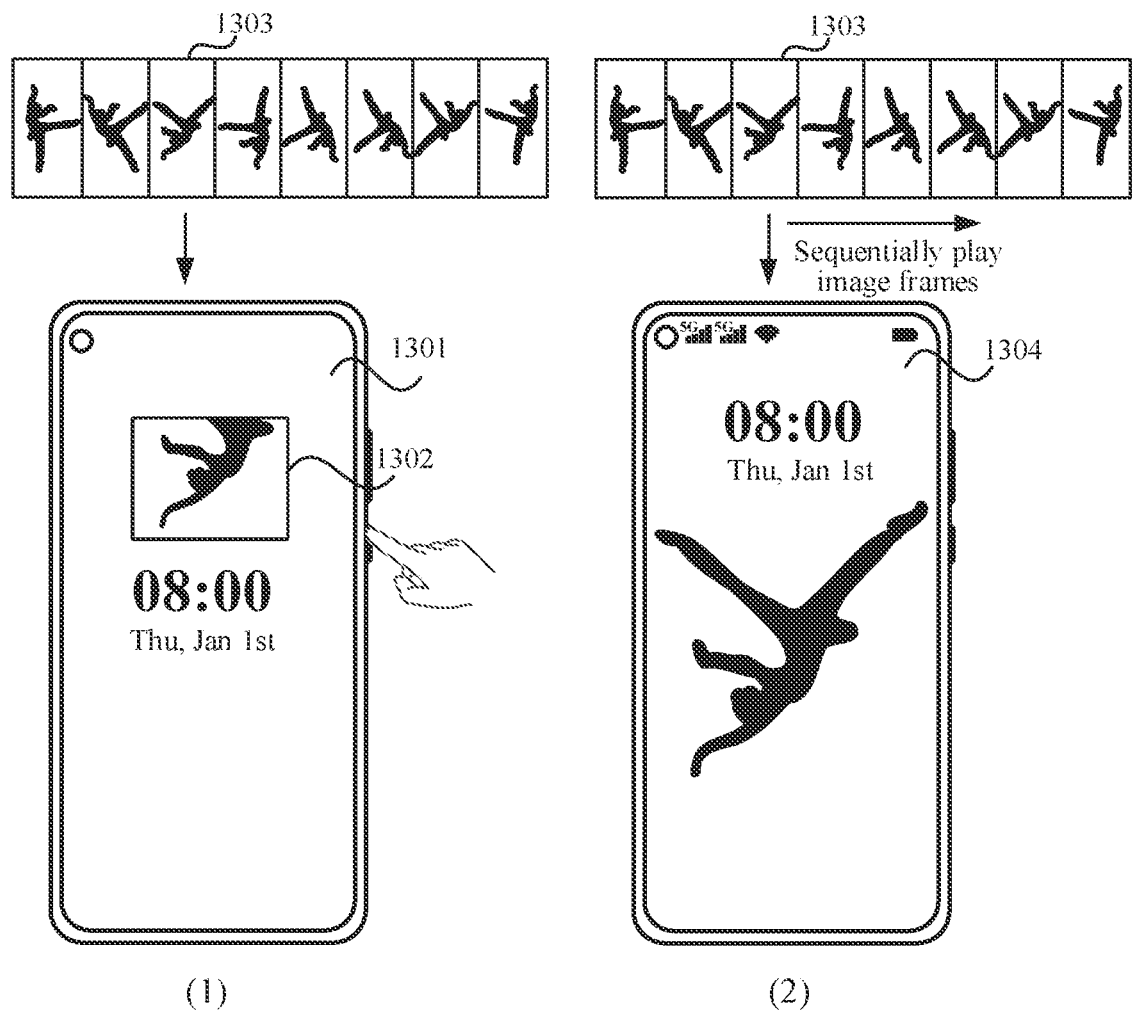
FIG. 13a to FIG. 13d illustrate a display mode of a transition animation from a screen off mode to a lock screen mode and from the lock screen mode to a desktop mode.
Figure 13B:
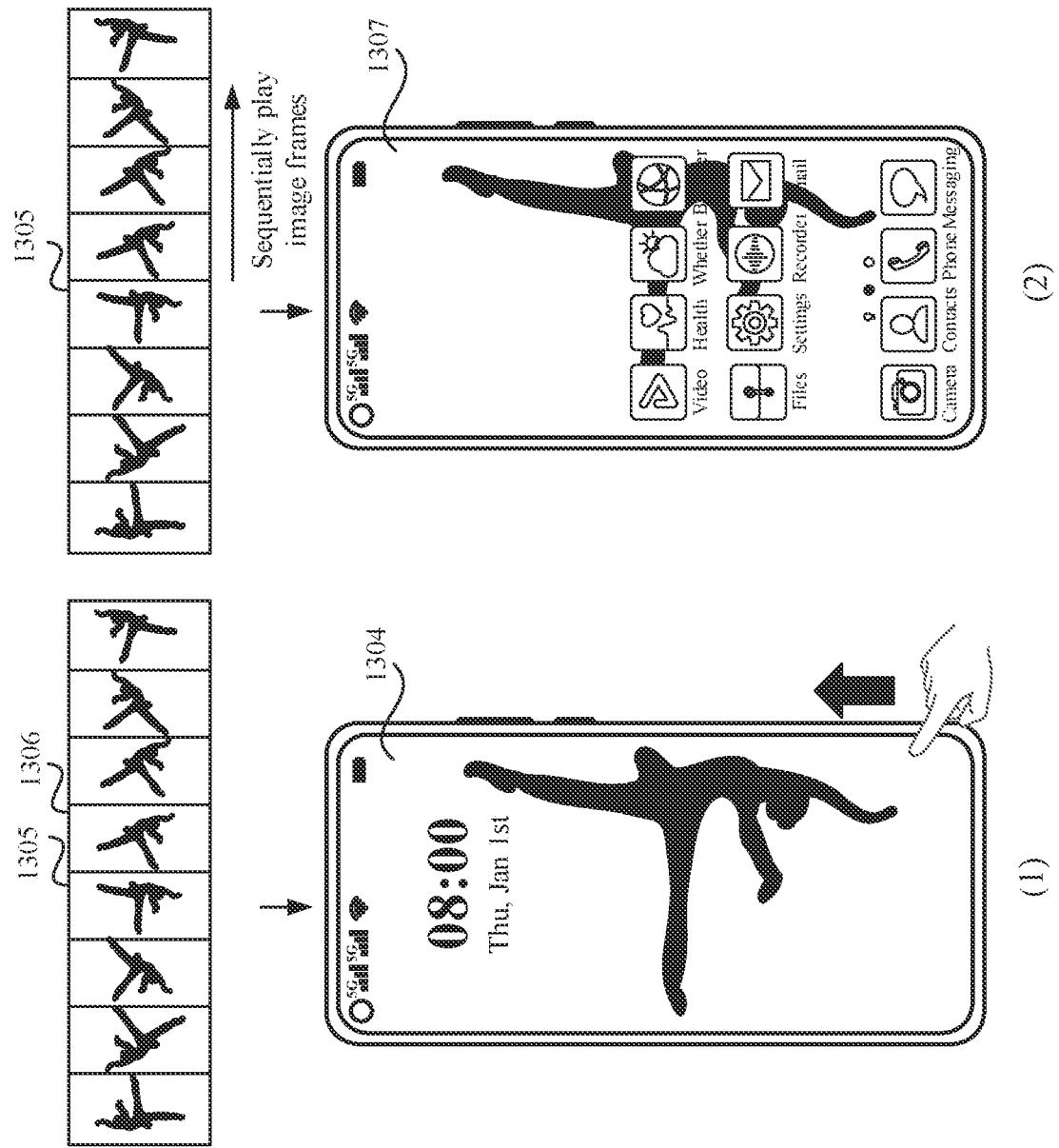

Referring to (1) of FIG. 13b, for example, when a transition animation on the lock screen 1304 is played to any frame before a key frame in the lock screen mode (such as an image frame 1306), for example, played to an image frame 1305, the user unlocks the mobile phone through sliding unlock, fingerprint unlock, face unlock, password unlock, or the like. The mobile phone enters the desktop mode in response to the received user operation. In other words, before a transition animation in the lock screen mode finishes playing, the transition animation in the lock screen mode is interrupted, and the mobile phone enters the desktop mode. Referring to (2) of FIG. 13b, for example, staring from the image frame 1305, the image frames in the video segment are sequentially played on a desktop 1307 until a key frame in the desktop mode is played. For other content not described, refer to the foregoing description. Details are not described herein again.

It should be noted that, as mentioned above, the transition animation played on the lock screen is actually played in a gradually unfolding manner, as shown in FIG. 5a to FIG. 10b. In this embodiment of this application, there are two gradual unfolding manners. In the first manner, during the gradual unfolding process of the transition animation in the lock screen mode, image frames in the transition animation are sequentially played; and if playing is not interrupted, when the transition animation in the lock screen mode is unfolded to full screen, that is, when a field of view box is unfolded to a size the same as that of the lock screen, an image frame played in the field of view box is exactly the last image frame of the transition animation in the lock screen mode. In the second gradual unfolding manner, some of image frames in the transition animation in the lock screen mode can be played in the gradual unfolding process, and the remaining image frames are played in full screen mode when a field of view box is unfolded to full screen. For example, the transition animation in the lock screen mode includes 180 frames. When the field of view box is unfolded to full screen, an image frame displayed in the field of view box is the 90$^{th}$ image frame among the 180 image frames. Starting from the 91$^{st}$ image frame, image frames between the 91$^{st}$ frame and the 180$^{th}$ frame are displayed in full screen in the lock screen mode.

Figure 13C:
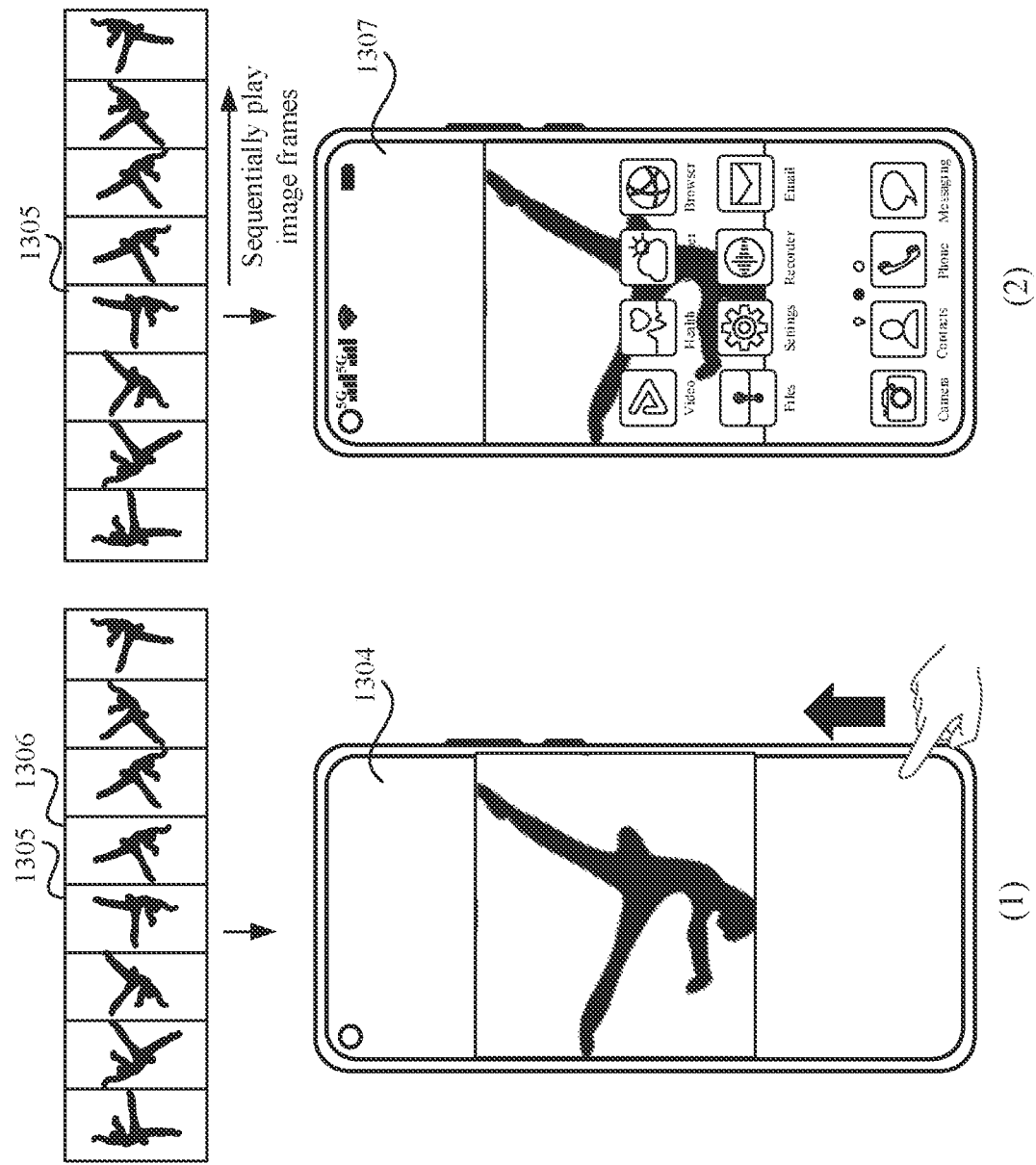

Based on the two unfolding manners described above, for example, a manner of resumable play shown in FIG. 13b can be understood as that when playing of the transition animation in full screen in the lock screen mode is interrupted, and the mobile phone enters the desktop mode, the remaining image frames of the transition animation and image frames of a transition animation on the desktop continue to be played in full screen. For another example, in a manner of resumable play shown in FIG. 13b, the transition animation in the lock screen mode is interrupted in the gradual unfolding process. To better describe the scenario of resumable play, the following uses a specific example for description. Referring to FIG. 13c, for example, a key frame of the transition animation in the lock screen mode is the image frame 1306. When a field of view box on the lock screen 1304 is gradually unfolded to an extent shown in (1) of FIG. 13c, part of the image frame 1305 is displayed in the field of view box. The user can unlock the mobile phone through sliding unlock, face unlock, or the like. For example, the mobile phone enters the desktop mode in response to the received user operation. Referring to (2) of FIG. 13c, for example, the mobile phone displays a desktop 1307. The image frame 1305 and subsequent image frames continue to be played on the desktop 1307. For example, because the gradual unfolding of the field of view box is interrupted, the field of view box will continue to be unfolded gradually on the desktop 1307 and move to a center of the screen, and the remaining image frames starting from the image frame 1305 continue to be played in the field of view box. For example, when the field of view box is unfolded to full screen on the desktop 1307, the image frame 1306, that is, the key frame of the original lock screen mode, is displayed in the field of view box. The transition animation in the desktop mode, that is, from the image frame 1306 to the last image frame, can continue to be played on the desktop 1307 in full screen.

Figure 13D:
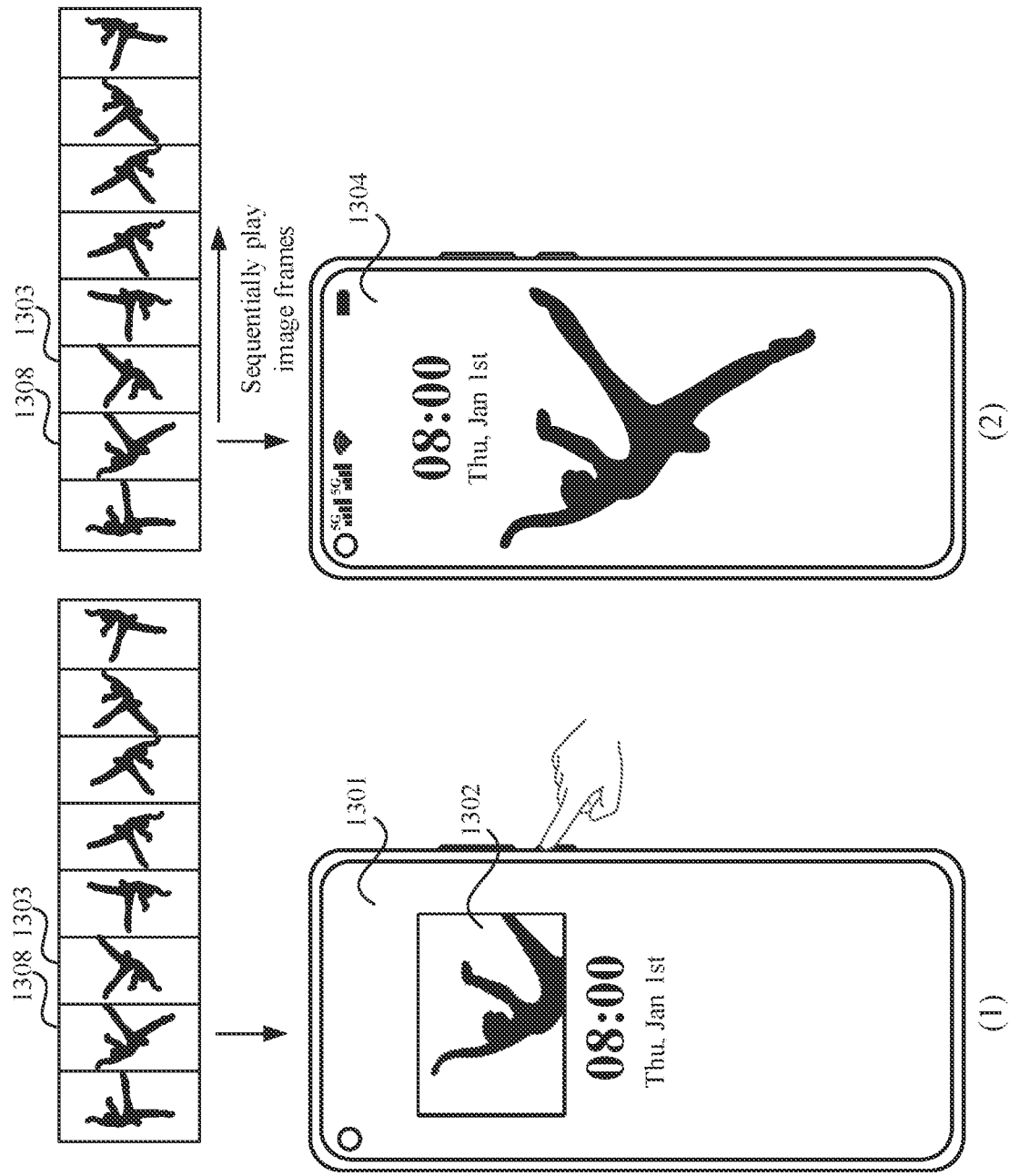

Referring to FIG. 13d, for example, while the transition animation in the screen off mode is being played in the transition animation display box 1302 on the screen off screen 1301, the user may press the power on/off button. In other words, the scenario shown in FIG. 13d is a scenario in which the transition animation in the screen off mode continues to be played after being interrupted. The mobile phone enters the desktop mode in response to the received user operation. Referring to (2) of FIG. 13d, for example, the remaining image frames of the transition animation in the screen off mode starting from an image frame, for example, the image frame 1308, at which the transition animation in the screen off mode is interrupted, as well as the image frames of the transition animation in the lock screen mode continue to be played on the lock screen 1304. For a manner in which the image frame is displayed on the lock screen 1304, refer to any display mode in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b.

It should be noted that, the manner of resumable play listed in this embodiment of this application is only an illustrative example. In other embodiments, there may be other scenarios of resumable play. For example, while the transition animation in the screen off mode is being played on the screen off screen, the mobile phone enters a lock screen in response to a received user operation. The remaining image frames of the transition animation in the screen off mode starting from an image frame that is interrupted on the screen off screen are played on the lock screen. For example, while the remaining image frames are being played on the lock screen, the mobile phone enters a desktop in response to the received user operation. The remaining image frames of the transition animation in the screen off mode starting from the image frame interrupted on the lock screen continue to be played on the desktop. In addition, the transition animation in the lock screen mode and the transition animation in the desktop mode continue to be played on the desktop after the last image frame of the transition animation in the screen off mode is played. In other words, in the manner of resumable play in this embodiment of this application, image frames continue to be played on a switched-to screen, from an interrupted image frame until a key frame corresponding to the current screen.

Figure 14A:
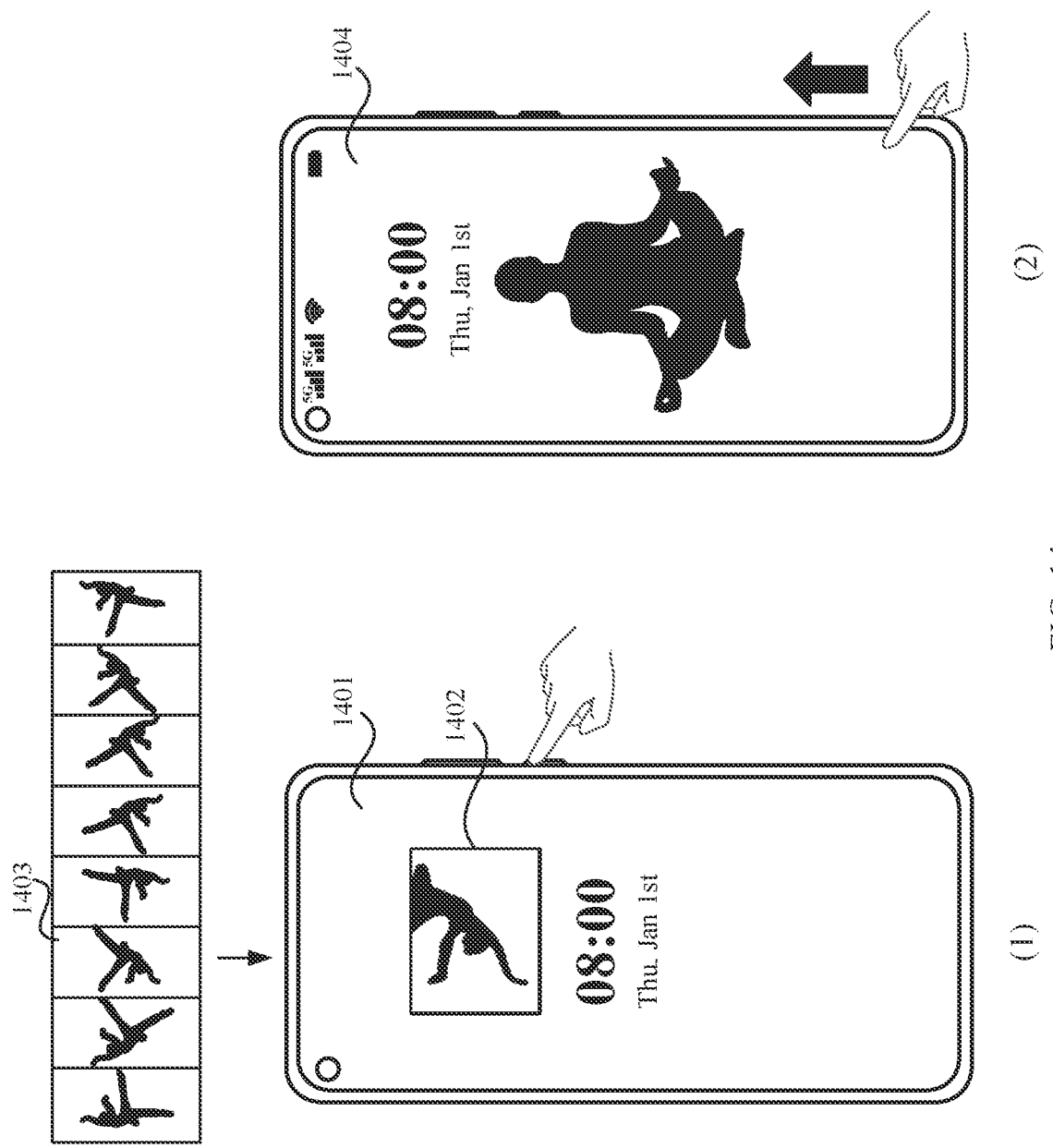
FIG. 14a and FIG. 14b illustrate a display mode of a transition animation from a screen off mode to a lock screen mode, and from the lock screen mode to a desktop mode.
Figure 14B:
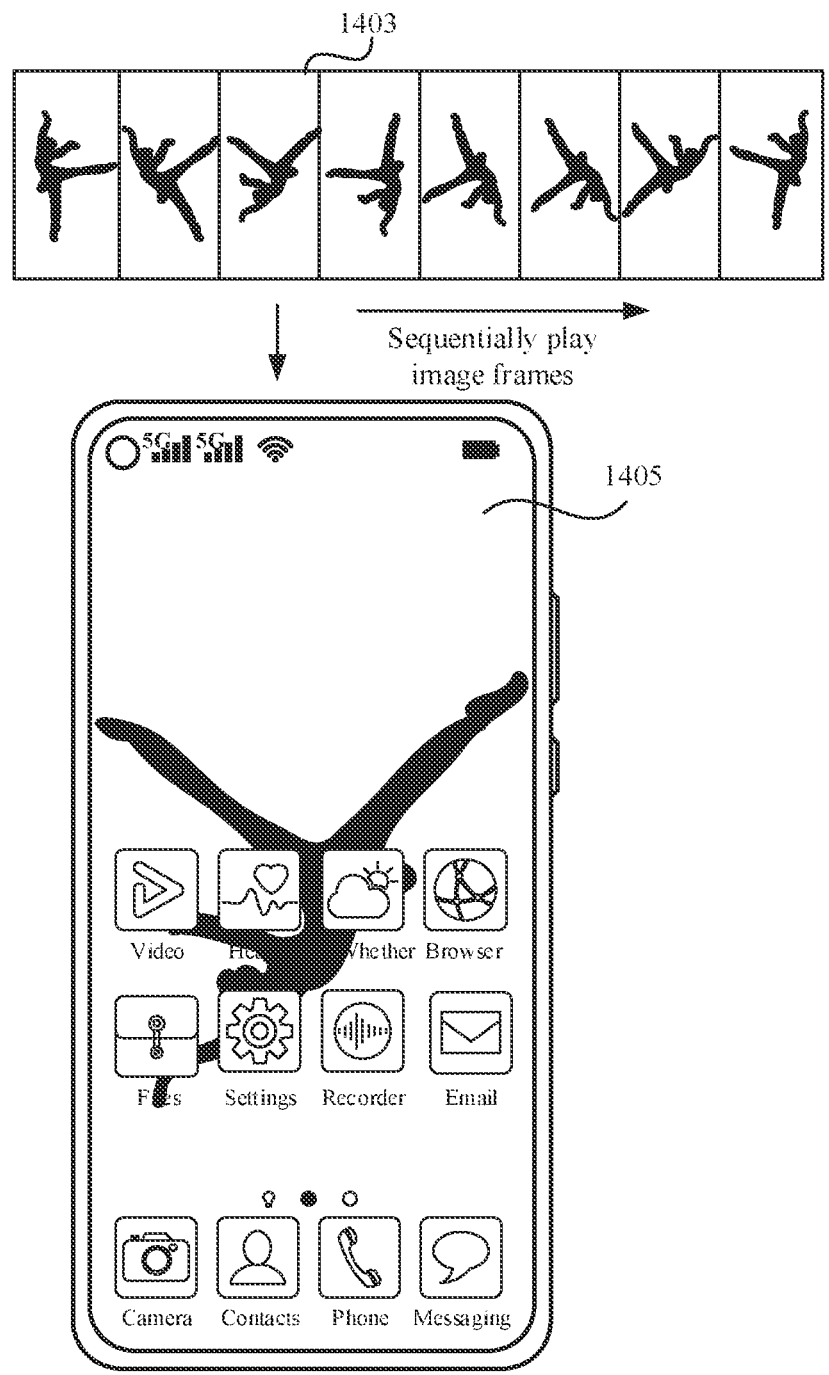

FIG. 14a and FIG. 14b illustrate a display mode of a transition animation from a screen off mode to a lock screen mode, and from the lock screen mode to a desktop mode. Referring to (1) of FIG. 14a, for example, a key frame in the screen off mode, for example, an image frame 1403, is displayed in a transition animation display box 1402 on a screen off screen 1402. For content not described, refer to the foregoing description. Details are not described herein again. For example, a user presses a power on/off button. A mobile phone enters the lock screen mode in response to the received user operation. Referring to (2) of FIG. 14a, for example, in this scenario, the user can preset the transition animation in the lock screen mode as a static wallpaper. The static wallpaper preset by the user is displayed on a lock screen 1404. Optionally, the static wallpaper may be displayed on the lock screen 1404 in any display mode in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For example, the user unlocks the mobile phone through sliding unlock, fingerprint unlock, face unlock, or the like. The mobile phone enters the desktop mode in response to the received user operation. Referring to FIG. 14b, for example, image frames are sequentially played on a desktop 1405, optionally from the key frame in the screen off mode (for example, the image frame 1403) to a key frame in the desktop mode. Optionally, for a manner in which the image frame 1403 is displayed on the desktop 1405, refer to any display mode in FIG. 5a to FIG. 5d, FIG. 6a to FIG. 6d, FIG. 7a and FIG. 7b, FIG. 8a and FIG. 8b, FIG. 9a to FIG. 9c, and FIG. 10a and FIG. 10b. For other content not described, refer to the foregoing description. Details are not described herein again. It should be noted that, in other embodiments, in response to a received user operation, a mobile phone can set a transition animation in a screen off mode as a static wallpaper, or set a transition animation in a desktop mode as a static wallpaper. This is not limited in this application.

Figure 15:
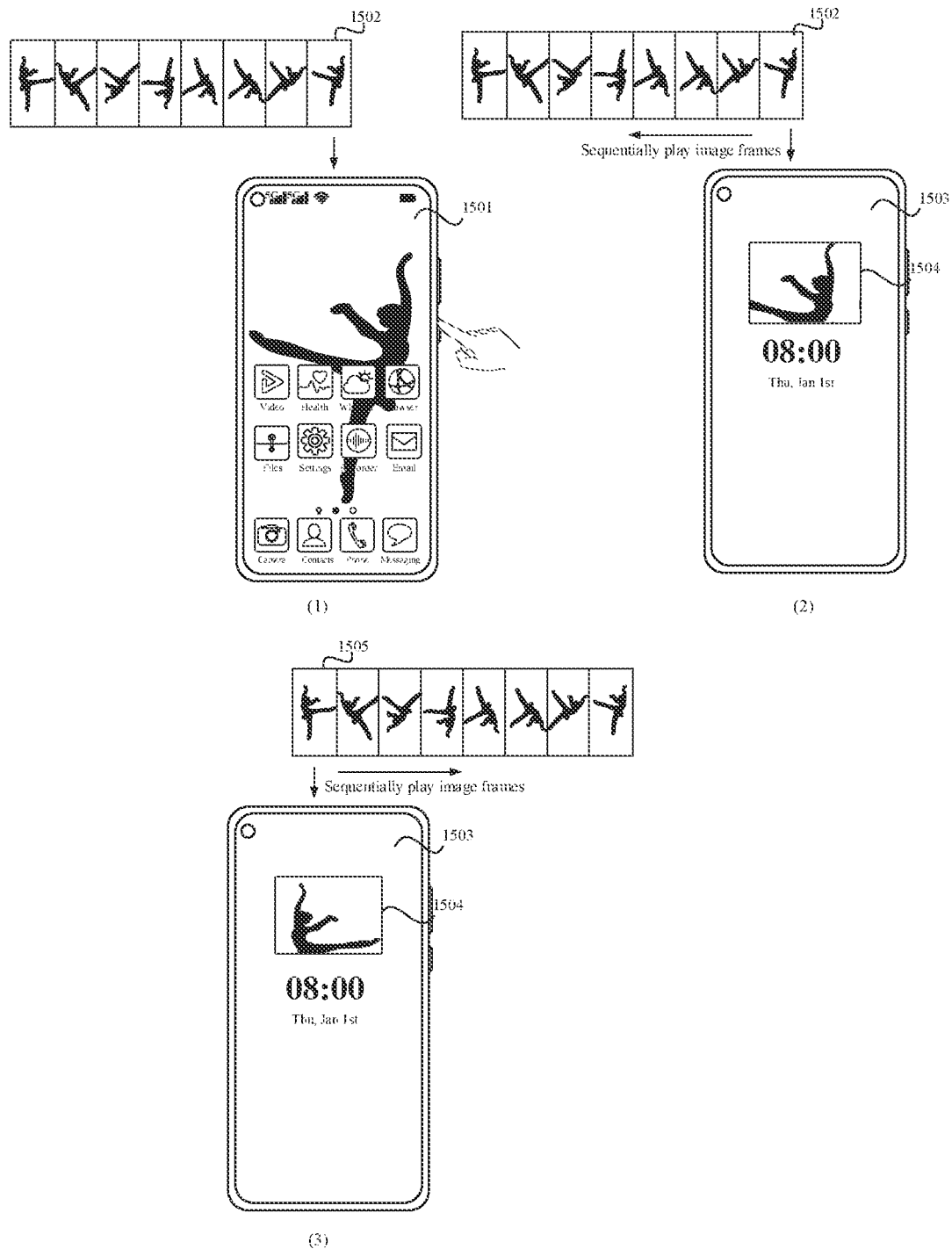
FIG. 15 illustrates a display mode of a transition animation from a desktop mode to a screen off mode.

FIG. 15 illustrates a display mode of a transition animation from a desktop mode to a screen off mode. Referring to (1) of FIG. 15, for example, the last frame of a transition animation in the desktop mode (that is, a key frame in the desktop mode), for example, an image frame 1502, is displayed on a desktop 1501. A user may press a power on/off button. A mobile phone enters the screen off mode in response to the received user operation. Referring to (2) of FIG. 15, for example, a screen off screen 1503 includes a transition animation display box 1504. For specific descriptions, refer to the foregoing description. Details are not described herein again. For example, starting from the image frame 1502, image frames in a video segment are sequentially played in reverse order in the transition animation display box 1504 until the initial image frame is played. Referring to (3) of FIG. 15, for example, a transition animation played in the transition animation display box 1504 is played in reverse order from a key frame in the desktop mode to an image frame 1505. Then, image frames starting from the image frame 1505 are sequentially played in the transition animation display box 1504 until a key frame in the screen off mode is played. For other descriptions, refer to the foregoing description. Details are not described herein again. Optionally, after the image frame 1505 is played in the transition animation display box 1504, a screen may be blacked out first, and then a transition animation in the screen off mode continues to be played.

Figure 16:
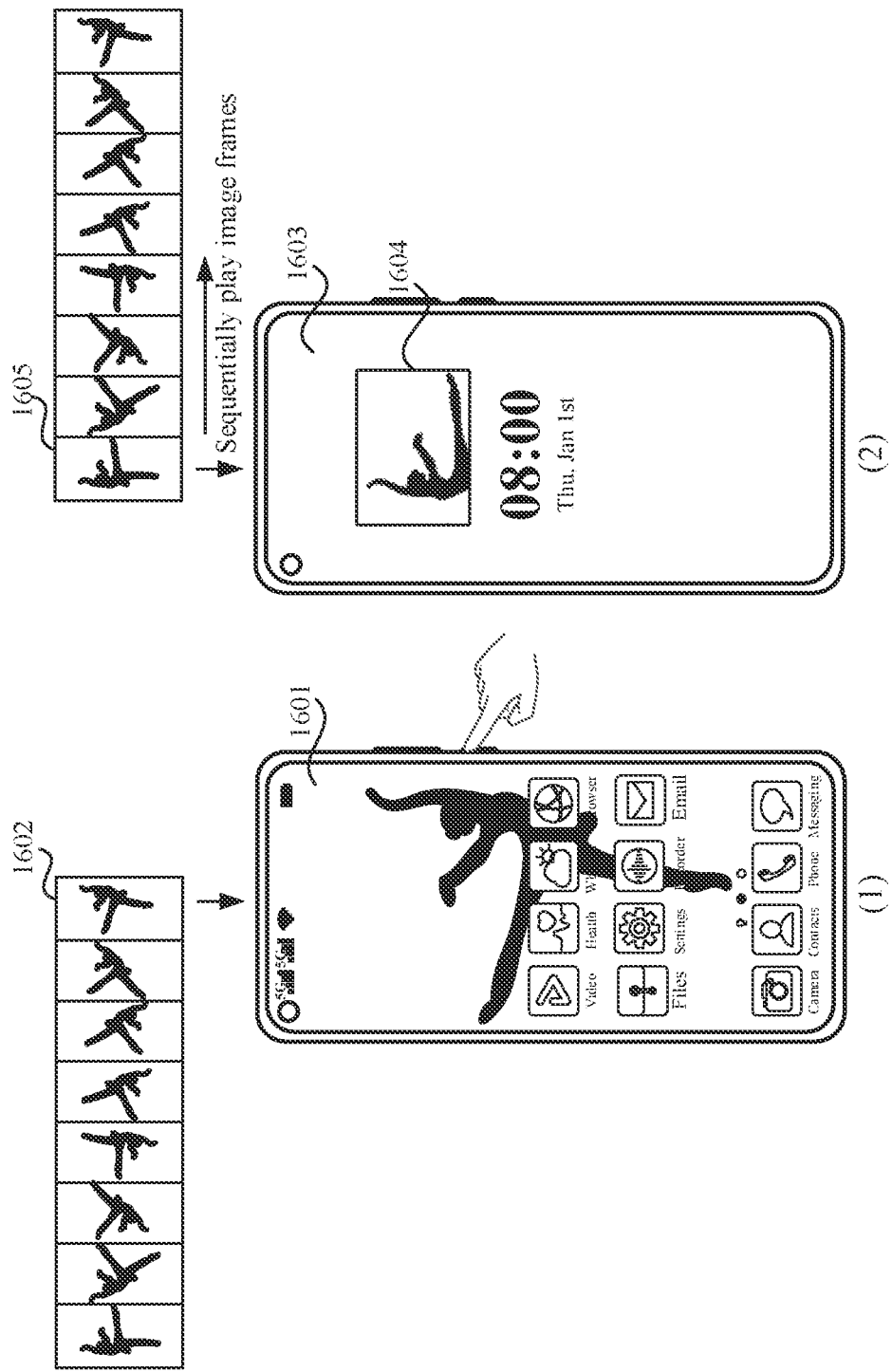
FIG. 16 illustrates a display mode of a transition animation from a desktop mode to a screen off mode.

FIG. 16 illustrates a display mode of a transition animation from a desktop mode to a screen off mode. Referring to (1) of FIG. 16, for example, the last frame of a transition animation in the desktop mode (that is, a key frame in the desktop mode), for example, an image frame 1602, is displayed on a desktop 1601. If no user operation is received within a specified period of time (for example, 10 s, which can be set according to a user requirement and is not limited in this application), a mobile phone enters the screen off mode. Optionally, a picture displayed on the desktop 1601 can gradually disappear until a screen is black. Referring to (2) of FIG. 16, for example, starting from the initial image frame of a transition animation in the screen off mode (for example, an image frame 1605), image frames of the transition animation in the screen off mode are sequentially played in a transition animation display box 1604 on a screen offscreen 1603 until a key frame in the screen off mode is played.

Figure 17:
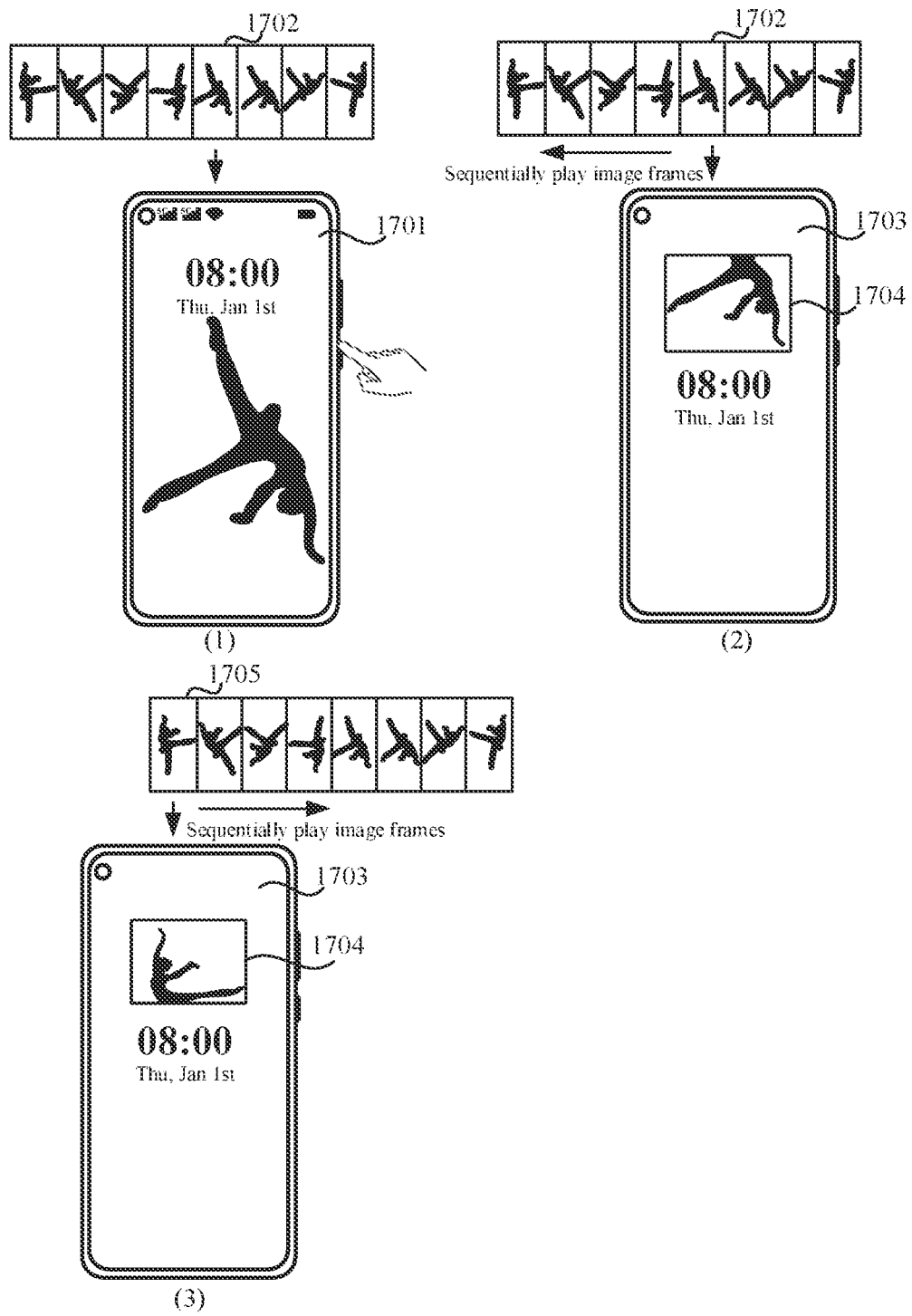
FIG. 17 illustrates a display mode of a transition animation from a lock screen mode to a screen off mode.

FIG. 17 illustrates a display mode of a transition animation from a lock screen mode to a screen off mode. Referring to (1) of FIG. 17, for example, the last frame of a transition animation in the lock screen mode (that is, a key frame in the lock screen mode), for example, an image frame 1702, is displayed on a lock screen 1701. A user may press a power on/off button. A mobile phone enters the screen off mode in response to the received user operation. Referring to (2) of FIG. 17, for example, a screen off screen 1703 includes a transition animation display box 1704. For specific descriptions, refer to the foregoing description. Details are not described herein again. For example, starting from the image frame 1702, image frames in a video segment are sequentially played in reverse order in the transition animation display box 1704 until the initial image frame is played. Referring to (3) of FIG. 17, for example, a transition animation played in the transition animation display box 1704 is played in reverse order from a key frame in the lock screen mode to an image frame 1705. Then, image frames starting from the image frame 1705 are sequentially played in the transition animation display box 1704 until a key frame in the screen off mode is played. For other descriptions, refer to the foregoing description. Details are not described herein again. Optionally, after the image frame 1705 is played in the transition animation display box 1704, a screen may be blacked out first, and then a transition animation in the screen off mode continues to be played.

Figure 18:
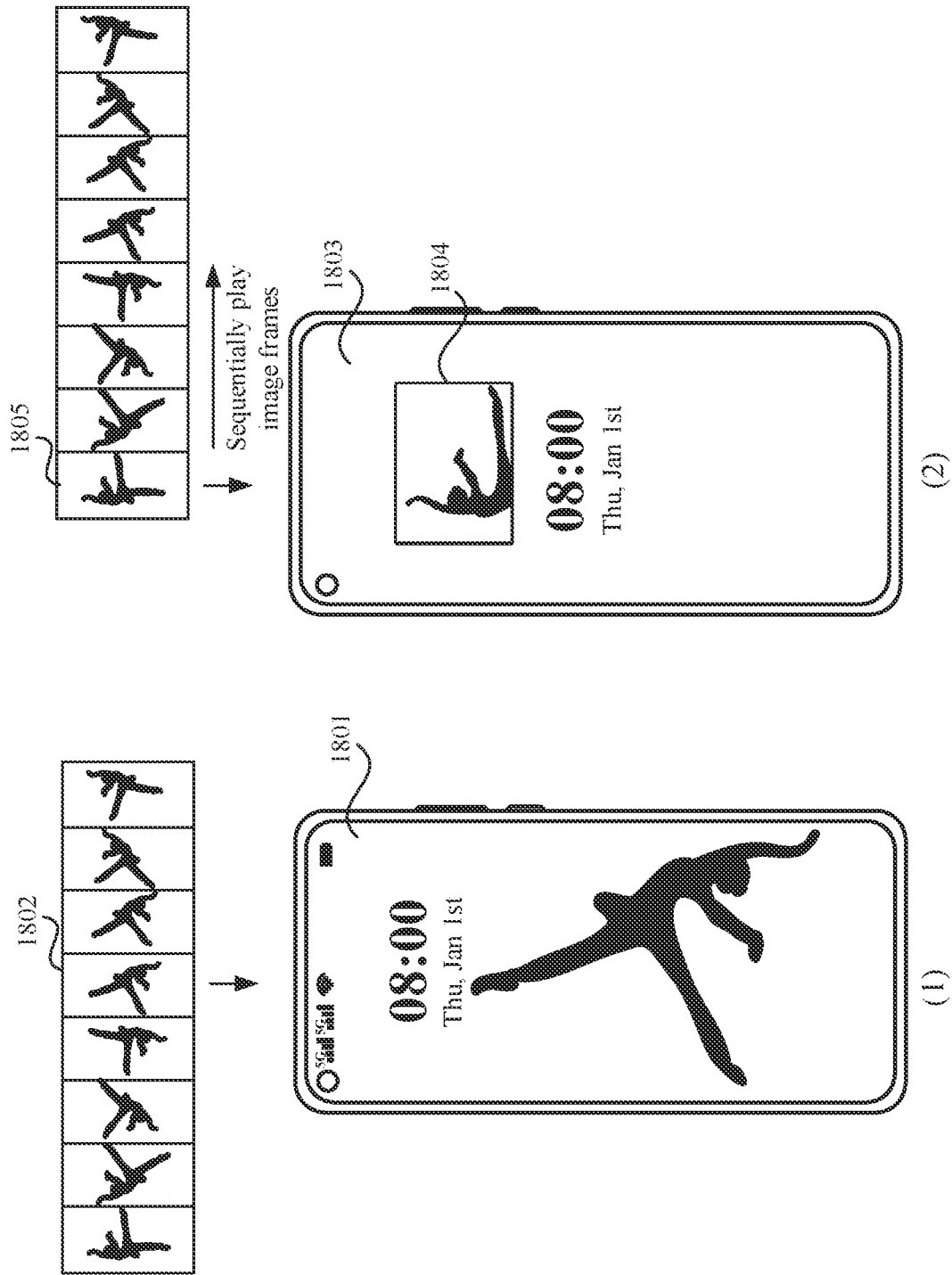
FIG. 18 illustrates a display mode of a transition animation from a lock screen mode to a screen off mode.

FIG. 18 illustrates a display mode of a transition animation from a lock screen mode to a screen off mode. Referring to (1) of FIG. 18, for example, the last frame of a transition animation in the lock screen mode (that is, a key frame in the lock screen mode), for example, an image frame 1802, is displayed on a lock screen 1801. If no user operation is received within a specified period of time (for example, 10 s, which can be set according to a user requirement and is not limited in this application), a mobile phone enters the screen off mode. Optionally, a picture displayed on the lock screen 1801 can gradually disappear until the screen is black Referring to (2) of FIG. 18, for example, starting from the initial image frame of a transition animation in the screen off mode (for example, an image frame 1805), image frames of the transition animation in the screen off mode are sequentially played in a transition animation display box 1804 on a screen off screen 1803 until a key frame in the screen off mode is played.

Figure 19:
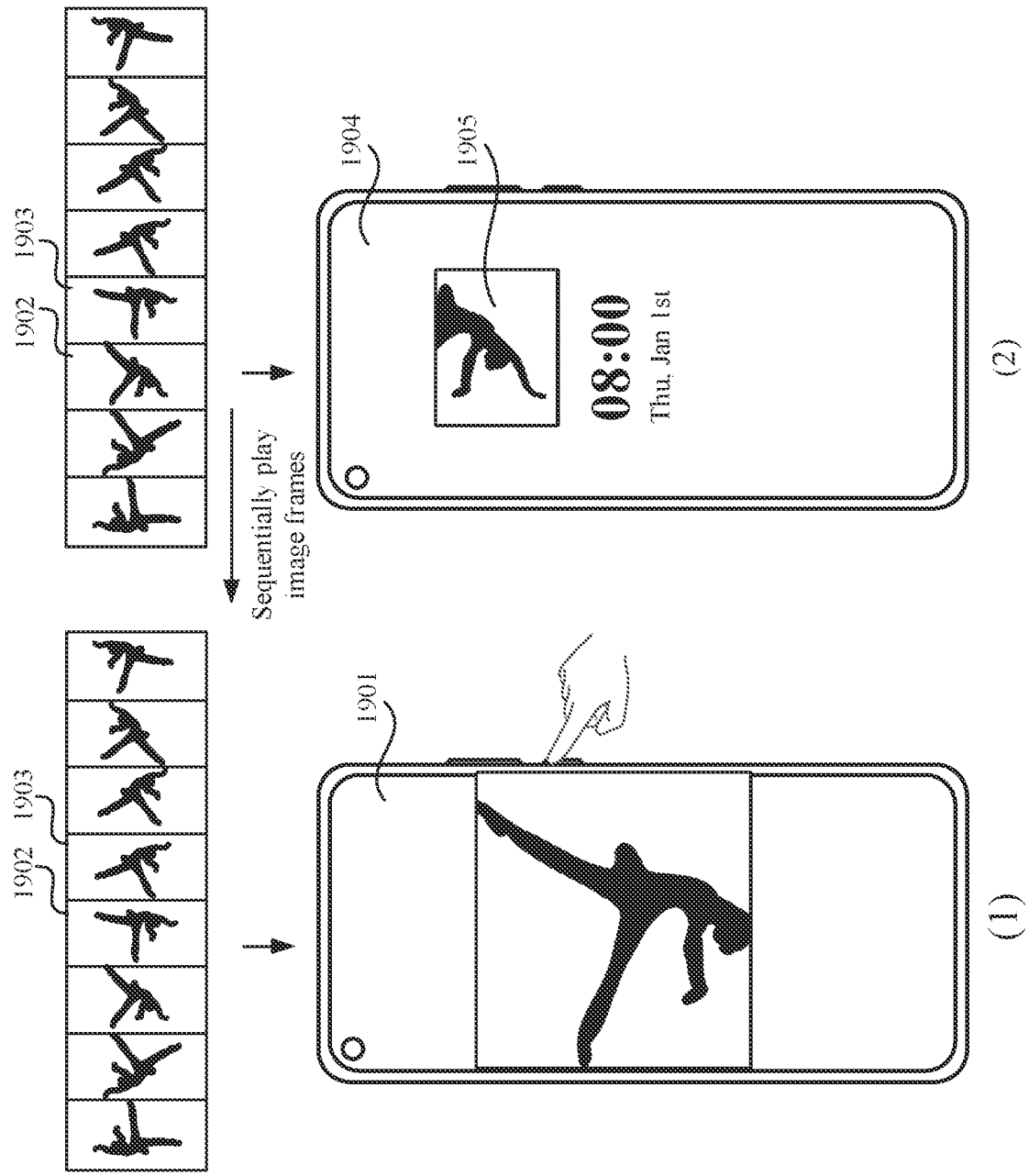
FIG. 19 illustrates a display mode of a transition animation from a lock screen mode to a screen off mode.

In a possible implementation, if a user presses a power on/off button while the transition animation in the lock screen mode is being played, that is, the transition animation in the lock screen mode is interrupted, a mobile phone enters the screen off mode in response to the received user operation. For example, image frames are played in reverse order in the transition animation display box on the screen off screen, from an image frame displayed when the lock screen mode is interrupted to the initial image frame in a video segment. Then, the transition animation in the screen off mode starting from the initial image frame is played in the transition animation display box on the screen off screen. It should be noted that, as mentioned above, when the transition animation in the lock screen mode is interrupted, the transition animation played on the lock screen may be displayed in full screen, or may be displayed in a gradual unfolding manner. For example, FIG. 19 illustrates a scenario in which a transition animation played on a lock screen is interrupted in a gradual unfolding process. Referring to FIG. 19, for example, in a gradual unfolding process of a field of view box on a lock screen 1901, a mobile phone receives an operation of pressing a power on/off button by a user. For example, part of an image frame 1902 is currently played on the lock screen 1901, and a key frame in the lock screen mode is an image frame 1903. For example, the mobile phone enters the screen off mode in response to the received user operation. For example, image frames in a video segment are played in reverse order in a transition animation display box 1905 on a screen off screen 1904, from the image frame 1902 to the initial image frame. Then, starting from the initial image frame, image frames of a transition animation in the screen off mode are sequentially played in the transition animation display box 1905 on the screen off screen 1904. For content not described, refer to the foregoing description. Details are not described herein again.

In another possible implementation, if a user presses a power on/off button while a transition animation in a desktop mode is being played, that is, the transition animation in the desktop mode is interrupted, a mobile phone enters the screen off mode in response to the received user operation. For example, image frames in a video segment are played in reverse order in the transition animation display box on the screen off screen, from an image frame displayed when the desktop mode is interrupted to the initial image frame. Then, starting from the initial image frame, the transition animation in the screen off mode is played in the transition animation display box on the screen offscreen.

It may be understood that, to implement the foregoing functions, the electronic device includes corresponding hardware and/or software modules for performing each function. With reference to algorithm steps in the examples described in the embodiments disclosed in this specification, this application can be implemented by hardware or a combination of hardware and computer software. Whether a specific function is performed by hardware or by computer software-driven hardware depends on particular applications and design constraints of the technical solutions. A person skilled in the art may use, with reference to the embodiments, different methods to implement the described functions for each particular application, but it should not be considered that the implementation goes beyond the scope of this application.

Figure 20:
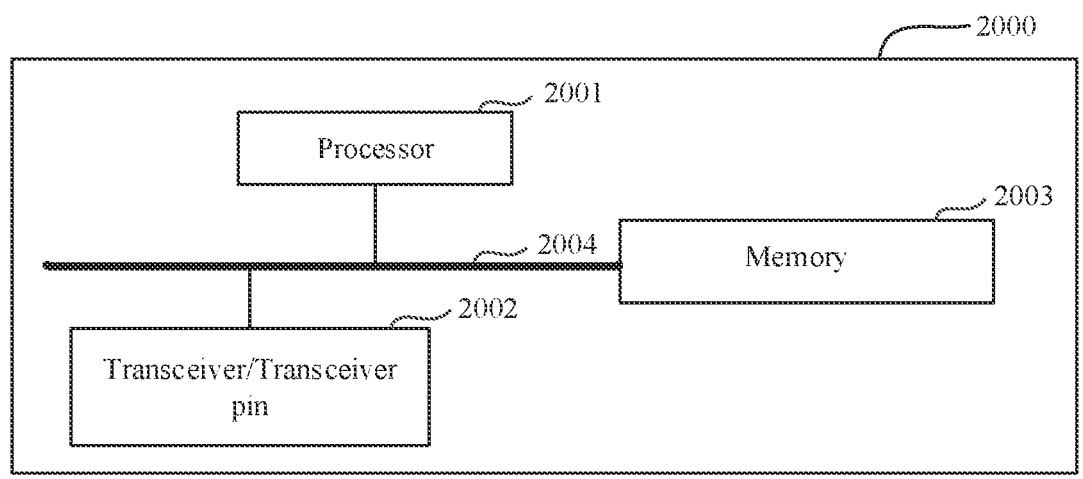
FIG. 20 illustrates a schematic structural diagram of an apparatus.

In an example, FIG. 20 is a schematic block diagram of an apparatus 2000 according to an embodiment of this application. The apparatus 2000 may include a processor 2001 and a transceiver/transceiver pin 2002. Optionally, the apparatus 2000 further includes a memory 2003.

Components of the apparatus 2000 are coupled together through a bus 2004. In addition to a data bus, the bus 2004 further includes a power bus, a control bus, and a status signal bus. However, for clear description, various types of buses in the figure are referred to as the bus 2004.

Optionally, the memory 2003 may be configured to store instructions in the foregoing method embodiments. The processor 2001 may be configured to execute the instructions in the memory 2003, control a receive pin to receive a signal, and control a transmit pin to transmit a signal.

The apparatus 2000 may be the electronic device in the foregoing method embodiments or a chip of the electronic device.

All related content of each step in the foregoing method embodiments may be cited in function descriptions of a corresponding function module. Details are not described herein again.

An embodiment further provides a computer storage medium. The computer storage medium stores computer instructions. When the computer instructions are run on an electronic device, the electronic device is caused to perform the foregoing related method steps to implement the display method in the foregoing embodiments.

An embodiment further provides a computer program product. When the computer program product is run on a computer, the computer is caused to perform the foregoing related steps to implement the display method in the foregoing embodiments.

In addition, an embodiment of this application further provides an apparatus. The apparatus may be specifically a chip, a component, or a module, and the apparatus may include a processor and a memory that are connected to each other. The memory is configured to store computer-executable instructions. When the apparatus is running, the processor may execute the computer-executable instructions stored in the memory, so that the chip performs the display method in the foregoing method embodiments.

The electronic device, computer storage medium, computer program product, and chip provided in the embodiments are all configured to perform the corresponding method provided above. Therefore, for beneficial effects that can be achieved by the electronic device, computer storage medium, computer program product, and chip, refer to the beneficial effects of the corresponding method provided above. Details are not described herein again.

Based on the description of the foregoing embodiments, a person skilled in the art may understand that, for convenience and brevity of description, division into the foregoing functional modules is merely an example for illustration. In actual application, the foregoing functions may be allocated to different functional modules and implemented as required. That is, an inner structure of an apparatus is divided into different functional modules to implement all or some of the functions described above.

In the several embodiments provided in this application, it should be understood that the disclosed apparatus and method may be implemented in other manners. For example, the apparatus embodiment described above is merely an example for illustration. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be indirect couplings or communication connections through some interfaces, apparatuses or units, and may be implemented in electronic, mechanical, or other forms.

The units described as separate parts may or may not be physically separate, and parts displayed as units may be one or more physical units, and may be located in one place or distributed in different places. Some or all of the units may be selected based on an actual requirement to achieve objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

Any content in the embodiments of this application and any content in one embodiment can be freely combined. Any combination of the foregoing content is within the scope of this application.

When the integrated unit is implemented in the form of a software functional unit and sold or used as an independent product, the integrated unit may be stored in a readable storage medium. Based on such an understanding, the technical solutions of the embodiments of this application essentially, or the part thereof contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes any medium that can store program code, such as a USB flash drive, a removable hard disk, a read-only memory (read only memory, ROM), a random access memory (random access memory, RAM), a magnetic disk, or an optical disc.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

Methods or algorithm steps described in combination with the content disclosed in this embodiment of this application may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to the processor, enabling the processor to read information from the storage medium or write information into the storage medium. Certainly, the storage medium may be a component of the processor. The processor and the storage medium may be located in an ASIC.

A person skilled in the art should be aware that in the foregoing one or more examples, the functions described in the embodiments of this application may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or dedicated computer.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. An electronic device, comprising:
a memory configured to store program instructions; and
a processor coupled to the memory and configured to execute the program instructions to cause the electronic device to:
display a first screen on a display of the electronic device in response to a received first user operation, and play a first transition animation on the first screen, wherein the first screen comprises a first display box, and the first transition animation is played in the first display box;
switch from the first screen to a second screen on the display of the electronic device in response to a received second user operation when a first image frame of the first transition animation is played on the first display box, wherein the second screen comprises a second display box, wherein a size of the second display box is the same as a size of the first display box, and wherein a position of the second display box on the display is the same as a position of the first display box on the display; and
play all image frames between the first image frame and a last image frame of the first transition animation on the second display box while in a process of gradually enlarging and moving the second display box to the screen center of the display of the electronic device,
wherein the first image frame is any image frame between an initial image frame of the first transition animation and the last image frame of the first transition animation.

2. The electronic device of claim 1, wherein the program instructions, when executed by the processor, cause the electronic device to:
switch from the second screen to a third screen on the display of the electronic device in response to a received third user operation when a second image frame between the first image frame and the last image frame of the first transition animation is played on the second screen; and
play all image frames between the second image frame and the last image frame of the first transition animation on the third screen, wherein the second image frame is any image frame between the first image frame and the last image frame of the first transition animation.

3. The electronic device of claim 2, wherein the program instructions, when executed by the processor, cause the electronic device to continue to play a second transition animation and a third transition animation when the last image frame of the first transition animation is played on the third screen.

4. The electronic device of claim 3, wherein the first transition animation, the second transition animation, and the third transition animation are continuous image frames.

5. The electronic device of claim 3, wherein the program instructions, when executed by the processor, cause the electronic device to:
display the third screen on the display of the electronic device in response to a received fourth user operation when a third image frame of the second transition animation is played on the second screen; and
play the third image frame to the last image frame of the second transition animation on the third screen, and continue to play the third transition animation after playing the last image frame of the second transition animation.

6. The electronic device of claim 2, wherein the first screen is a screen off screen, the second screen is a lock screen, and the third screen is a desktop.

7. The electronic device of claim 1, wherein the program instructions, when executed by the processor, cause the electronic device to continue to play a second transition animation on the second screen when the last image frame of the first transition animation is played on the second screen.

8. The electronic device of claim 1, wherein the first screen is a screen off screen, and the second screen is a desktop.

9. The electronic device of claim 8, wherein the first screen further comprises one or more pieces of screen-off text information, and wherein all parts on the first screen except the text information and a playing first sub-video are black.

10. The electronic device of claim 1, wherein the first screen is a lock screen, and the second screen is a desktop.

11. The electronic device of claim 1, wherein the program instructions, when executed by the processor, cause the electronic device to:
switch from the second screen to a third screen on the display of the electronic device in response to a received fifth user operation while the second display box is enlarged to a first size and moves to a first position on the display, and while a fourth image frame between the first image frame and the last image frame of the first transition animation is played in the second display box, wherein the third screen comprises a third display box, wherein a size of the third display box is the first size, and wherein the third display box is at the first position on the display; and gradually enlarge and move the third display box to the screen center of the display, wherein all image frames between the fourth image frame and the last image frame of the first transition animation, a second transition animation, and a third transition animation are played in the third display box while the third display box is gradually enlarged and moved to the screen center of the display of the electronic device.

12. The electronic device of claim 11, wherein the first transition animation, the second transition animation, and the third transition animation are continuous image frames.

13. A display method, comprising:

displaying, by an electronic device, a first screen on a display of the electronic device in response to a received first user operation, and playing a first transition animation on the first screen, wherein the first screen comprises a first display box, and the first transition animation is played in the first display box;

switching, by the electronic device, from the first screen to a second screen on the display of the electronic device in response to a received second user operation when a first image frame of the first transition animation is played on the first display box, wherein the second screen comprises a second display box, wherein a size of the second display box is the same as a size of the first display box, and wherein a position of the second display box on the display is the same as a position of the first display box on the display; and playing all image frames between the first image frame and a last image frame of the first transition animation on the second display box while in a process of gradually enlarging and moving the second display box to the screen center of the display of the electronic device, wherein the first image frame is any image frame between an initial image frame of the first transition animation and the last image frame of the first transition animation.

14. The method of claim 13, further comprising:

switching from the second screen to a third screen on the display of the electronic device in response to a received third user operation when a second image frame between the first image frame and the last image frame of the first transition animation is played on the second screen; and playing all image frames between the second image frame and the last image frame of the first transition animation on the third screen, wherein the second image frame is any image frame between the first image frame and the last image frame of the first transition animation.

15. The method of claim 14, wherein the first screen is a screen off screen, the second screen is a lock screen, and the third screen is a desktop.

16. The method of claim 13, wherein the first screen is a screen off screen, and the second screen is a desktop.

17. The method of claim 13, wherein the first screen is a lock screen, and the second screen is a desktop.

18. The method of claim 13, further comprising:

switching from the second screen to a third screen on the display of the electronic device in response to a received fifth user operation while the second display box is enlarged to a first size and moves to a first position on the display, and while a fourth image frame between the first image frame and the last image frame of the first transition animation is played in the second display box, wherein the third screen comprises a third display box, a wherein size of the third display box is the first size, and the third display box is at the first position on the display; and gradually enlarging and moving the third display box to the screen center of the display, wherein all image frames between the fourth image frame and the last image frame of the first transition animation, a second transition animation, and a third transition animation are played in the third display box while the third display box is gradually enlarged and moved to the screen center of the display of the electronic device.

19. The method of claim 18, wherein the first transition animation, the second transition animation, and the third transition animation are continuous image frames.

20. A non-transitory, computer-readable storage medium containing instructions that, when executed by a processor of an electronic device, cause the electronic device to:

display a first screen on a display of the electronic device in response to a received first user operation, and play a first transition animation on the first screen, wherein the first screen comprises a first display box, and the first transition animation is played in the first display box;

switch from the first screen to a second screen on the display of the electronic device in response to a received second user operation when a first image frame of the first transition animation is played on the first display box, wherein the second screen comprises a second display box, wherein a size of the second display box is the same as a size of the first display box, and wherein a position of the second display box on the display is the same as a position of the first display box on the display; and play all image frames between the first image frame and a last image frame of the first transition animation on the second display box while in a process of gradually enlarging and moving the second display box to the screen center of the display of the electronic device, wherein the first image frame is any image frame between an initial image frame of the first transition animation and the last image frame of the first transition animation.

* * * * *